(12) United States Patent
Allen et al.

(10) Patent No.: US 9,029,498 B2
(45) Date of Patent: May 12, 2015

(54) POLYCARBONATE POLYOL COMPOSITIONS

(75) Inventors: Scott D. Allen, Ithaca, NY (US); Armin Michel, Geleen (NL)

(73) Assignees: Novomer, Inc., Ithaca, NY (US); DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/988,804

(22) PCT Filed: Nov. 23, 2011

(86) PCT No.: PCT/US2011/062034
§ 371 (c)(1),
(2), (4) Date: Jul. 24, 2013

(87) PCT Pub. No.: WO2012/071505
PCT Pub. Date: May 31, 2012

(65) Prior Publication Data
US 2013/0303724 A1  Nov. 14, 2013

Related U.S. Application Data

(60) Provisional application No. 61/416,642, filed on Nov. 23, 2010.

(51) Int. Cl.
| | | |
|---|---|---|
| C08G 64/00 | (2006.01) | |
| C08G 64/02 | (2006.01) | |
| C08G 18/73 | (2006.01) | |
| C08G 64/18 | (2006.01) | |
| C09D 175/04 | (2006.01) | |
| C08G 18/44 | (2006.01) | |
| C08G 63/02 | (2006.01) | |

(52) U.S. Cl.
CPC ............ *C08G 64/0208* (2013.01); *C08G 18/73* (2013.01); *C08G 64/183* (2013.01); *C09D 175/04* (2013.01); *C08G 18/44* (2013.01)

(58) Field of Classification Search
USPC ........................ 528/370; 427/35.8; 428/385.5
See application file for complete search history.

(56) References Cited

U.S. PATENT DOCUMENTS

| | | |
|---|---|---|
| 6,870,004 B1 | 3/2005 | Nguyen et al. |
| 7,304,172 B2 | 12/2007 | Coates et al. |
| 7,399,822 B2 | 7/2008 | Coates et al. |
| 8,247,520 B2 | 8/2012 | Allen et al. |
| 8,470,956 B2 | 6/2013 | Allen et al. |
| 8,604,155 B2 | 12/2013 | Allen et al. |
| 8,921,508 B2 | 12/2014 | Allen et al. |
| 2009/0299032 A1 | 12/2009 | Allen |
| 2010/0256329 A1 | 10/2010 | Nozaki et al. |
| 2013/0337204 A1 | 12/2013 | Michel et al. |

FOREIGN PATENT DOCUMENTS

| | | |
|---|---|---|
| CN | 101412809 | 4/2009 |
| CN | 101020747 | 6/2009 |
| WO | WO-2008136591 A1 | 11/2008 |
| WO | WO-2008/150033 A1 | 12/2008 |
| WO | WO-2009137540 A1 | 11/2009 |
| WO | WO-2010/022388 A2 | 2/2010 |
| WO | WO-2010/028362 A1 | 3/2010 |
| WO | WO-2010/033703 A1 | 3/2010 |
| WO | WO-2010/033705 A1 | 3/2010 |
| WO | WO-2010/062703 A1 | 6/2010 |
| WO | WO-2010/075232 A1 | 7/2010 |

OTHER PUBLICATIONS

International Search Report of PCT/US2011/062034, mailed Apr. 2, 2012.
Written Opinion of PCT/US2011/062034, mailed Apr. 2, 2012.
Wilen, S. H. et al., Strategies in Optical Resolutions, Tetrahedron, 33(21): 2725-2736 (1977).

*Primary Examiner* — Terressa Boykin
(74) *Attorney, Agent, or Firm* — Choate, Hall & Stewart LLP; Charles E. Lyon; John P. Rearick

(57) ABSTRACT

The present invention provides polycarbonate polyol compositions with improved characteristics. Such polycarbonate polyol compositions are useful in thermosetting applications for the production of coatings for consumer products.

44 Claims, 56 Drawing Sheets

POLYCARBONATE POLYOL COMPOSITIONS

The present application is a national phase application under 35 U.S.C. §371 of PCT International Application No. PCT/US11/62034, filed Nov. 23, 2011, which claims priority to U.S. provisional application serial number 61/416,642, filed Nov. 23, 2010, the entire contents of which are hereby incorporated herein by reference.

BACKGROUND

Aliphatic polycarbonates (APCs) have utility as polyol building blocks for the construction of co-polymers such as plastics, adhesives, polymeric coatings and surfactants among others. Such polycarbonates may be made from renewable feedstocks (e.g., carbon dioxide) to prepare sustainably sourced coatings for use in various consumer applications.

To have utility in these applications, it is preferable that polycarbonate polymer chain ends terminate with hydroxyl groups. Other desirable characteristics for these polycarbonate polyols include relatively low molecular weight oligomers (e.g., having an average molecular weight number ($M_n$) between about 500 and about 15,000 g/mol), a narrowly defined molecular weight distribution (e.g., a polydispersity index les than 2), and for certain applications, minimal ether linkages in the polycarbonate chain. Strategies have been developed, with some success, to achieve hydroxyl-terminated polycarbonates that have one or more of these desired characteristics. However, in many cases it can be difficult to determine a priori which combination of polycarbonate polyol characteristics is optimal for a given application. Against this backdrop, the present invention provides new insights and strategies for the provision of improved polycarbonate polyol compositions.

SUMMARY OF THE INVENTION

The present invention encompasses the recognition that significant improvements can be made in the usefulness of polycarbonate polyols for certain thermosetting applications through the optimization of one or more polymer characteristics. The present invention provides compositions having such improved characteristics. In particular, the applicant has found that polycarbonate polyol compositions having a glass transition temperature (Tg) from about −20° C. to about 60° C., from about −20° C. to about 50° C., or from about 0° C. to about 30° C., are particularly useful in thermosetting applications. In some embodiments, polycarbonate polyol compositions have a Tg from about −20° C. to about 30° C. In some embodiments, polycarbonate polyol compositions have a Tg from about 0° C. to about 50° C., from about 0° C. to about 50° C., or from about 10° C. to about 40° C.

The present invention provides, among other things, polycarbonate polyol compositions and methods of using such compositions. The present invention also provides methods of making polycarbonate polyol compositions. In some embodiments, provided polycarbonate polyol compositions are poly(propylene carbonate) polyol compositions.

In some embodiments there is provided a thermoset hydroxy functional polycarbonate polyol substantially comprising linear repeat units, the polymer having:
i) from 2 to 10 hydroxy functional groups per mole of polymer;
ii) a hydroxy concentration (also denoted by [OH]) greater than or equal to 99% of the theoretical stoichiometric maximum;
iii) a weight average molecular weight (Mw) of less than or equal to 100 kilodaltons, or ≤50 kilodaltons;
iv) a glass transition temperature (Tg) of from −40° C. to 60° C., or from −10° C. to +50° C.; and
v) a polydispersity of less than 2.

In some embodiments, a provided poly(propylene carbonate) polyol composition is characterized in that the composition has at least 95% —OH end groups, a glass transition temperature (Tg) from about −20° C. to about 60° C., from about −20° C. to about 50° C., or from 0° C. to about 30° C., a polydispersity index (PDI) less than 2, a Mn less than 15 kDa, and greater than 95% carbonate linkages between adjacent monomer units in the polycarbonate chains. In some embodiments, a poly(propylene carbonate) polyol composition has a Tg from about −20° C. to about 30° C. In some embodiments, a polycarbonate polyol composition has a Tg from about 0° C. to about 50° C. or from about 10° C. to about 40° C.

In some embodiments, a provided poly(propylene carbonate) polyol composition comprises polymer chains denoted $P^1$ having the formula T-Y-A-(Y-T)$_n$ wherein:
each -T is a polycarbonate chain having a formula independently selected from the group consisting of:

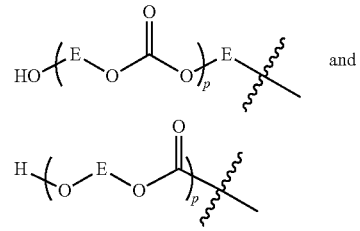

wherein:
E is a $C_3$ unit derived from propylene oxide;
p ranges from about 5 to about 75;
each Y group is independently the bound form of a functional group capable of initiating chain growth of epoxide $CO_2$ copolymers, optionally comprising one or multiple repeating units of a bivalent $C_{2-5}$, straight or branched, saturated hydrocarbon chain, wherein one methylene unit of each hydrocarbon group is replaced with —O—;
-A- is a covalent bond, a heteroatom, or a multivalent moiety; and
n is from 1 to 10 inclusive.

In certain embodiments each Y group is or comprises one or multiple repeating groups of a $C_{1-4}$ ether moiety.

In certain embodiments each Y group is or comprises one or multiple repeating units of ethylene glycol or propylene glycol.

DEFINITIONS

Figure 1:
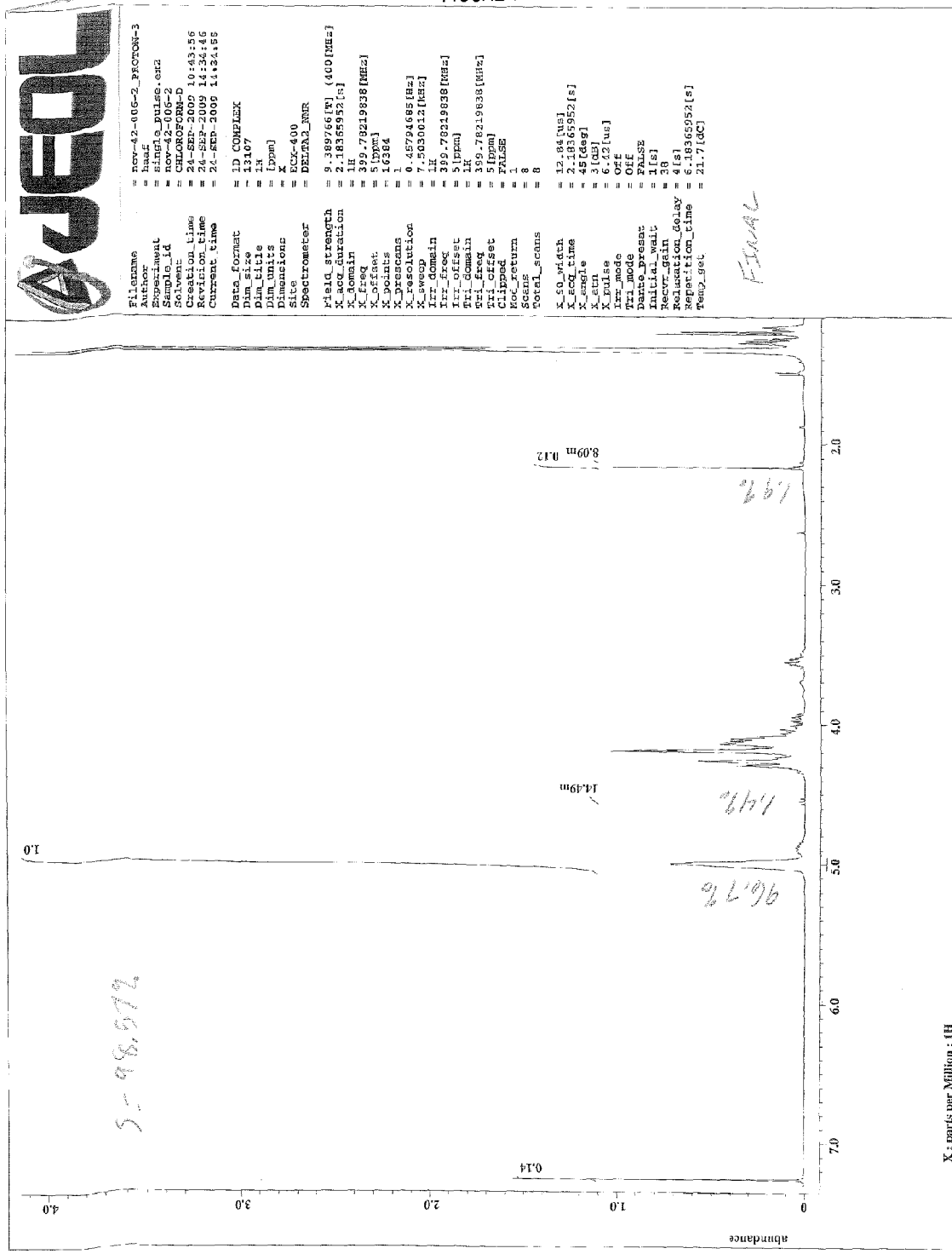
FIG. 1 shows a proton NMR spectrum of polyol PC-1
Figure 2:
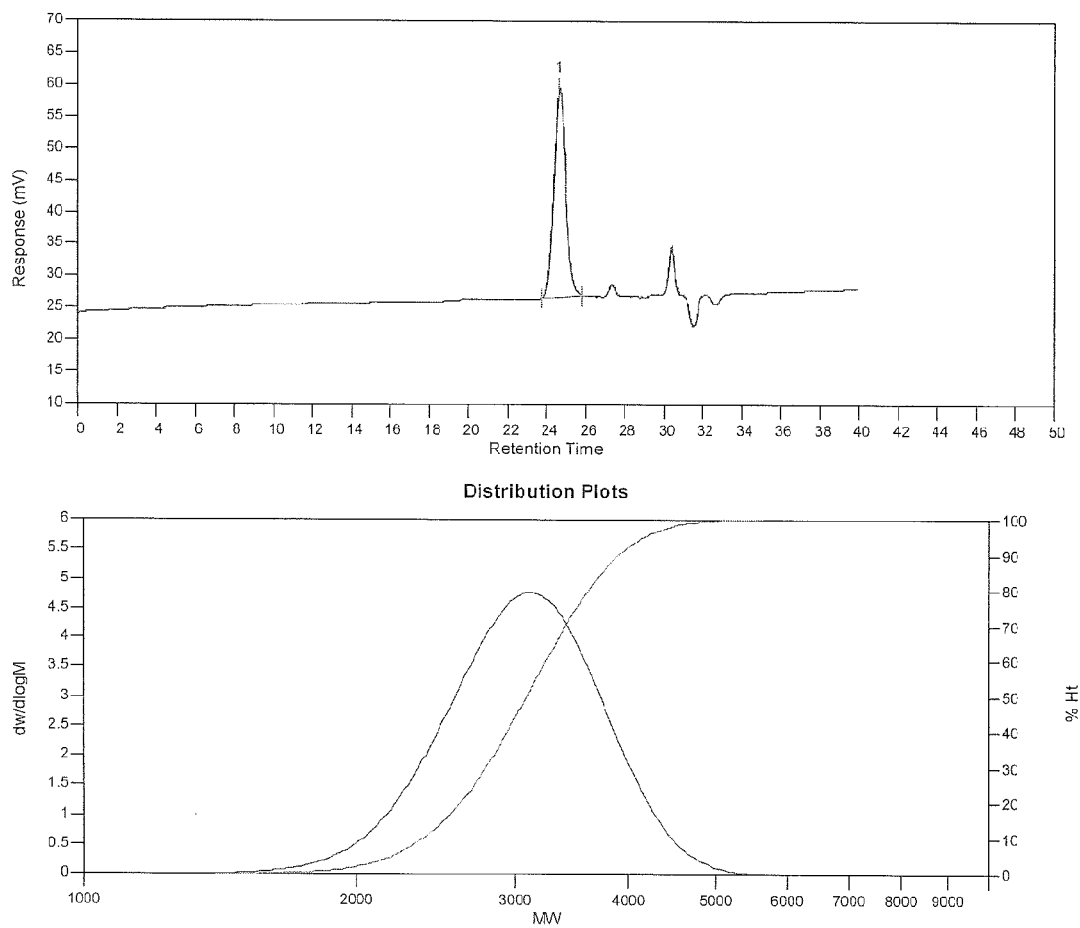
FIG. 2 shows a GPC trace of polyol PC-1
Figure 3:
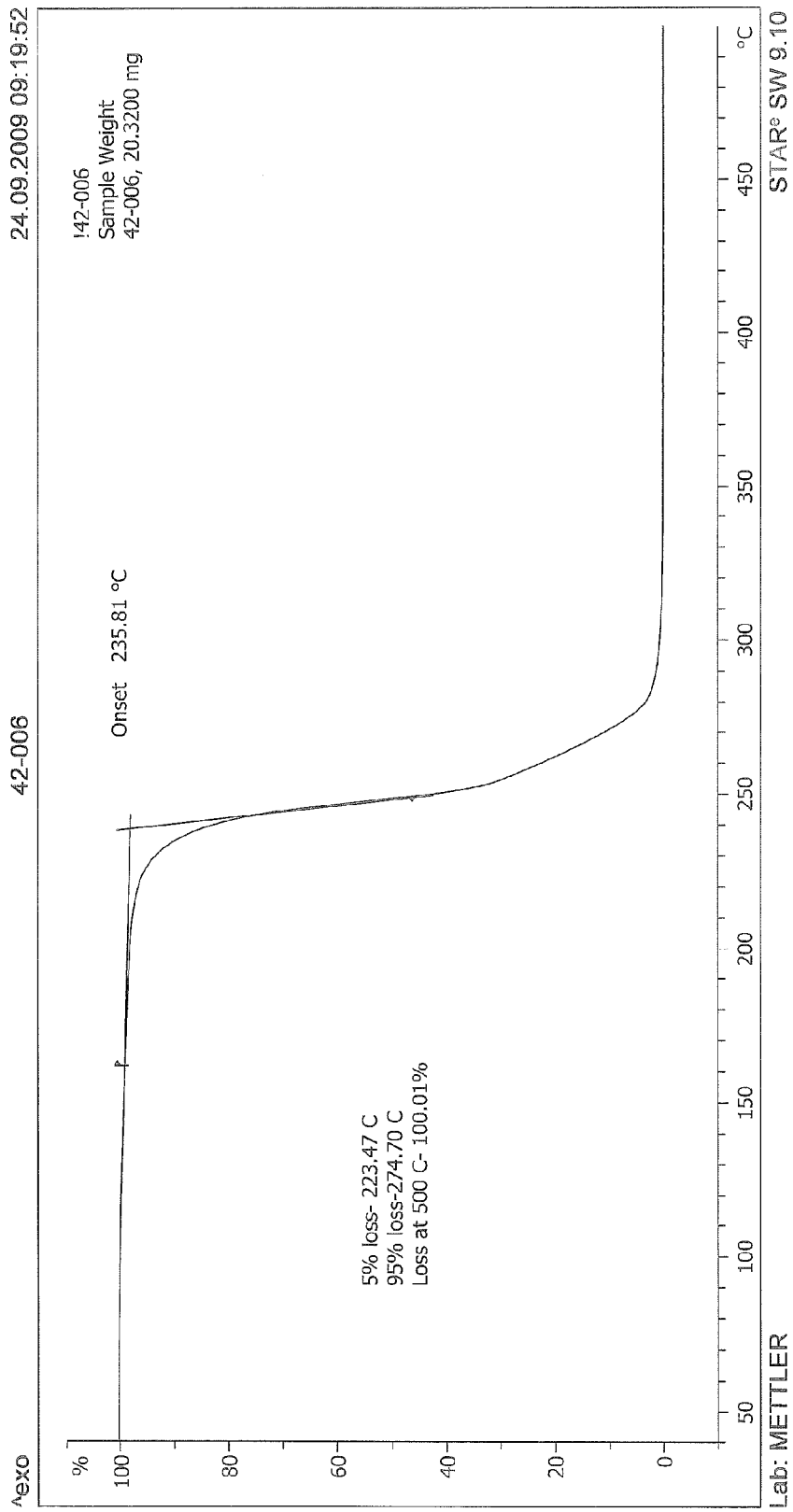
FIG. 3 shows a TGA of polyol PC-1
Figure 4:
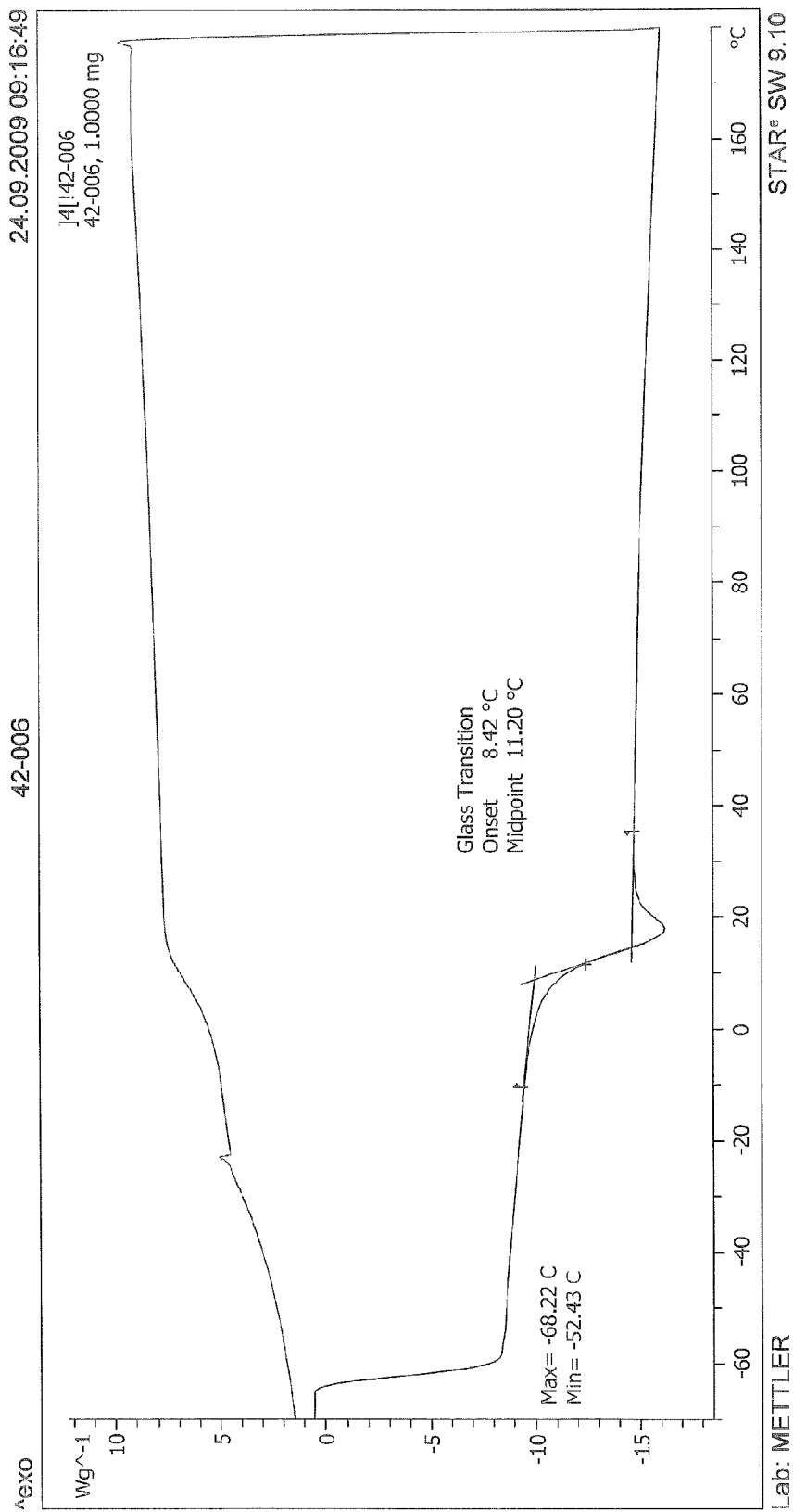
FIG. 4 shows a DSC trace of polyol PC-1
Figure 5:
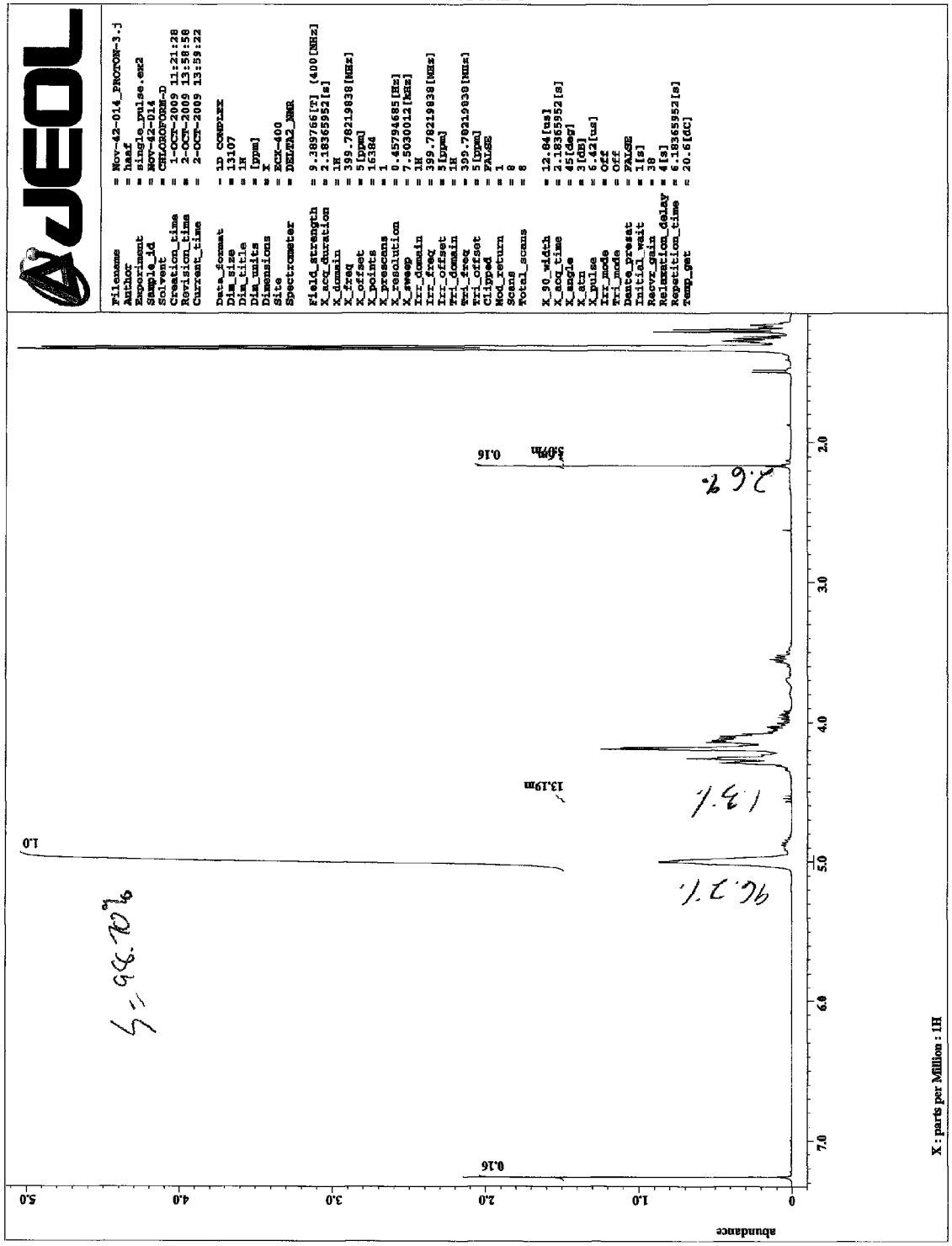
FIG. 5 shows a proton NMR spectrum of polyol PC-2
Figure 6:
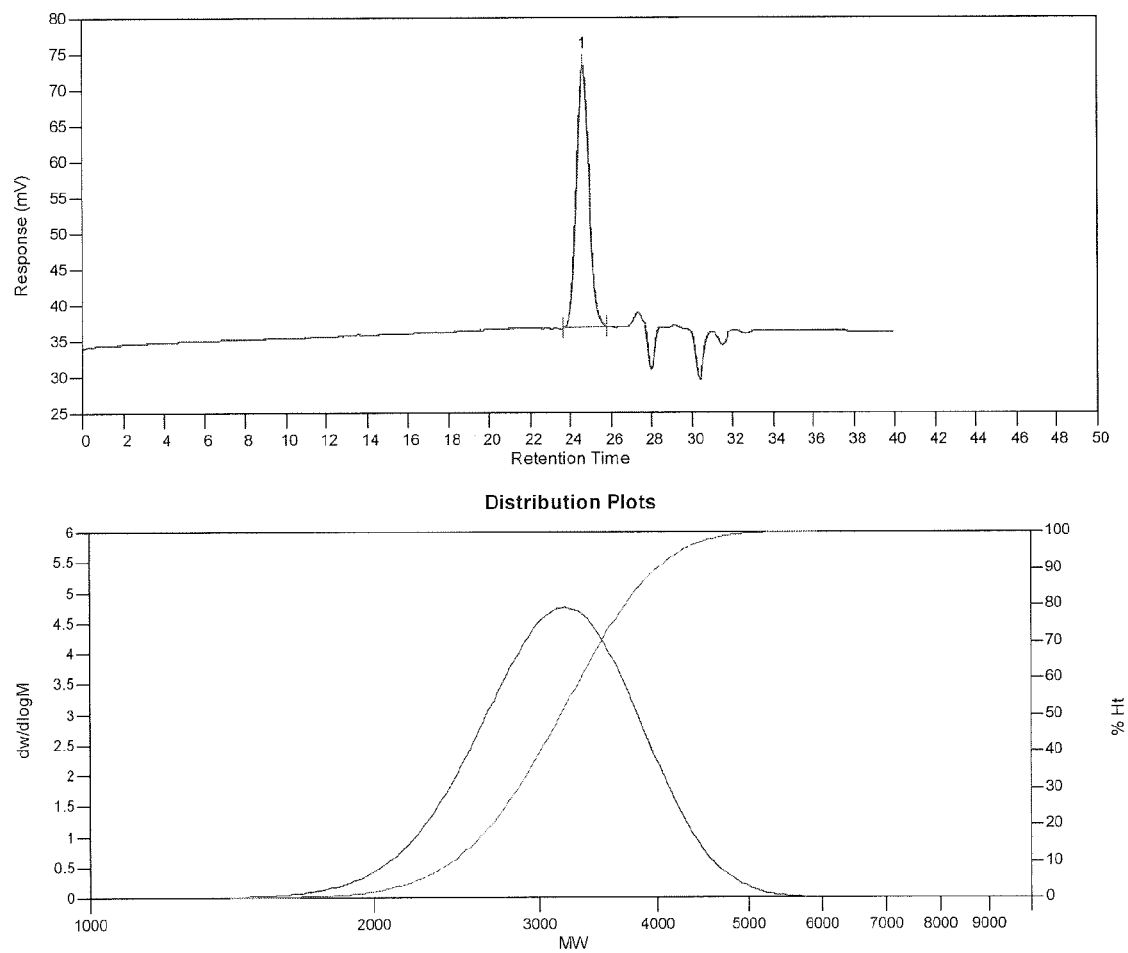
FIG. 6 shows a GPC trace of polyol PC-2
Figure 7:
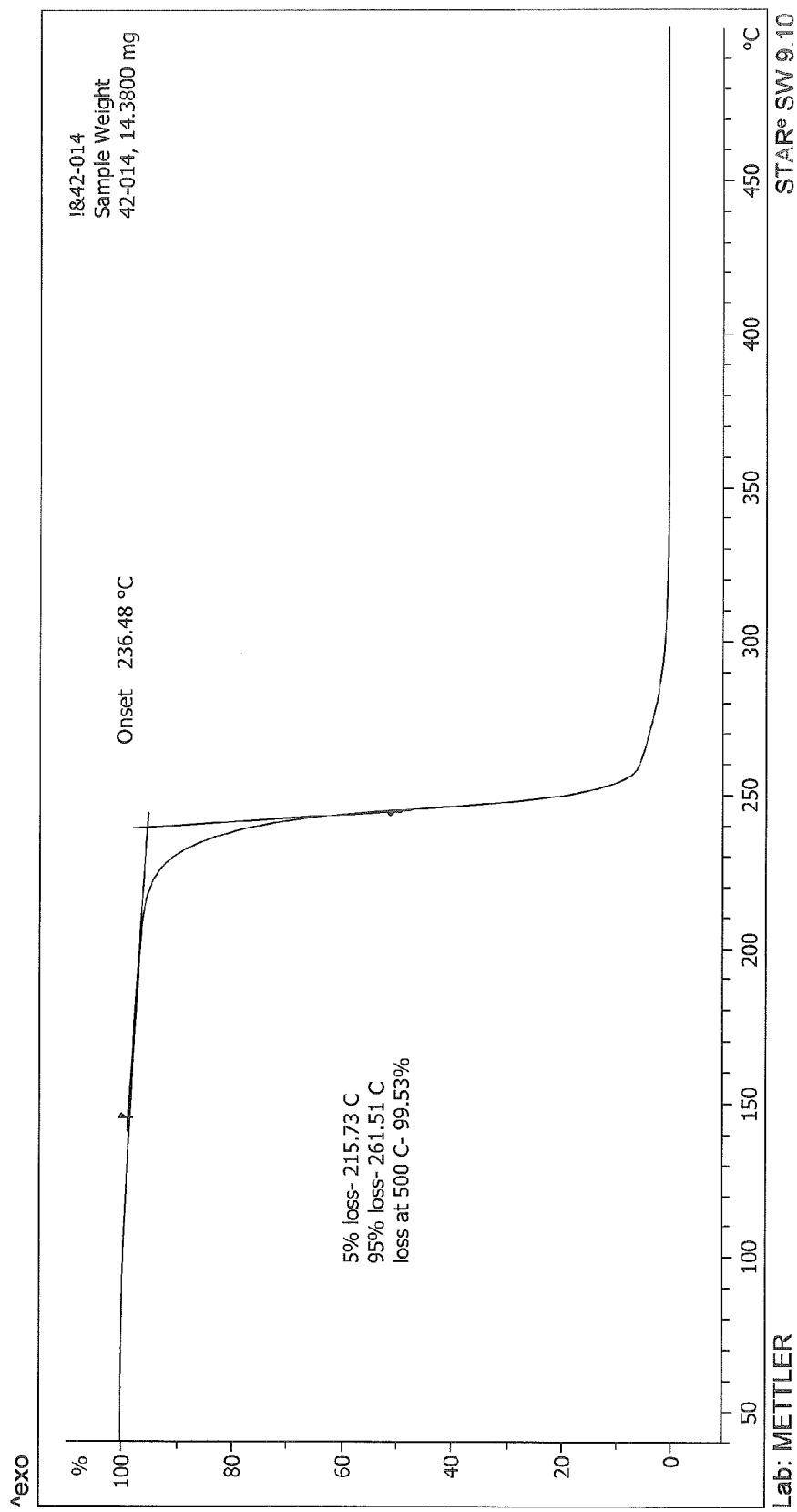
FIG. 7 shows a TGA of polyol PC-2
Figure 8:
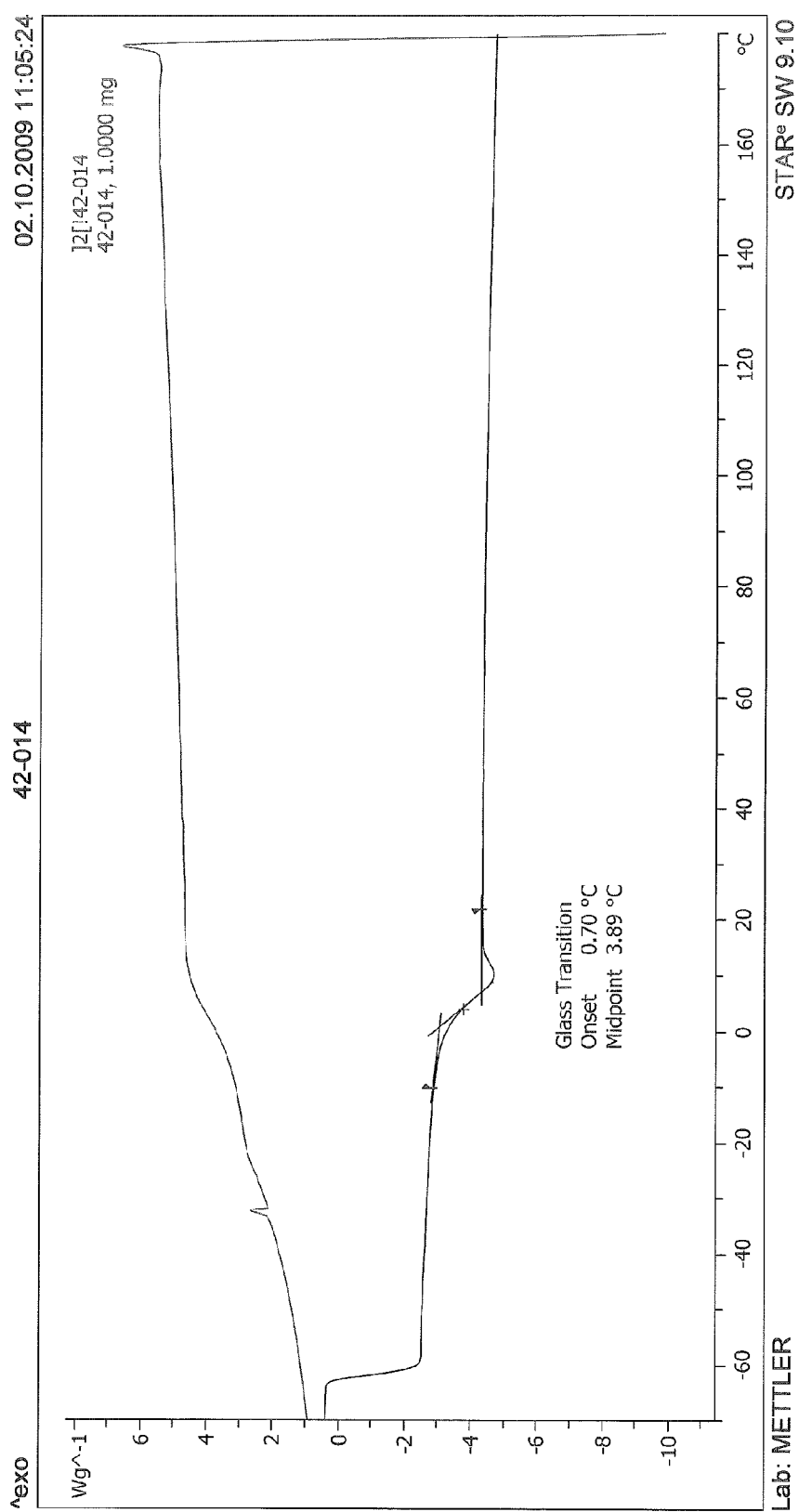
FIG. 8 shows a DSC trace of polyol PC-2
Figure 9:
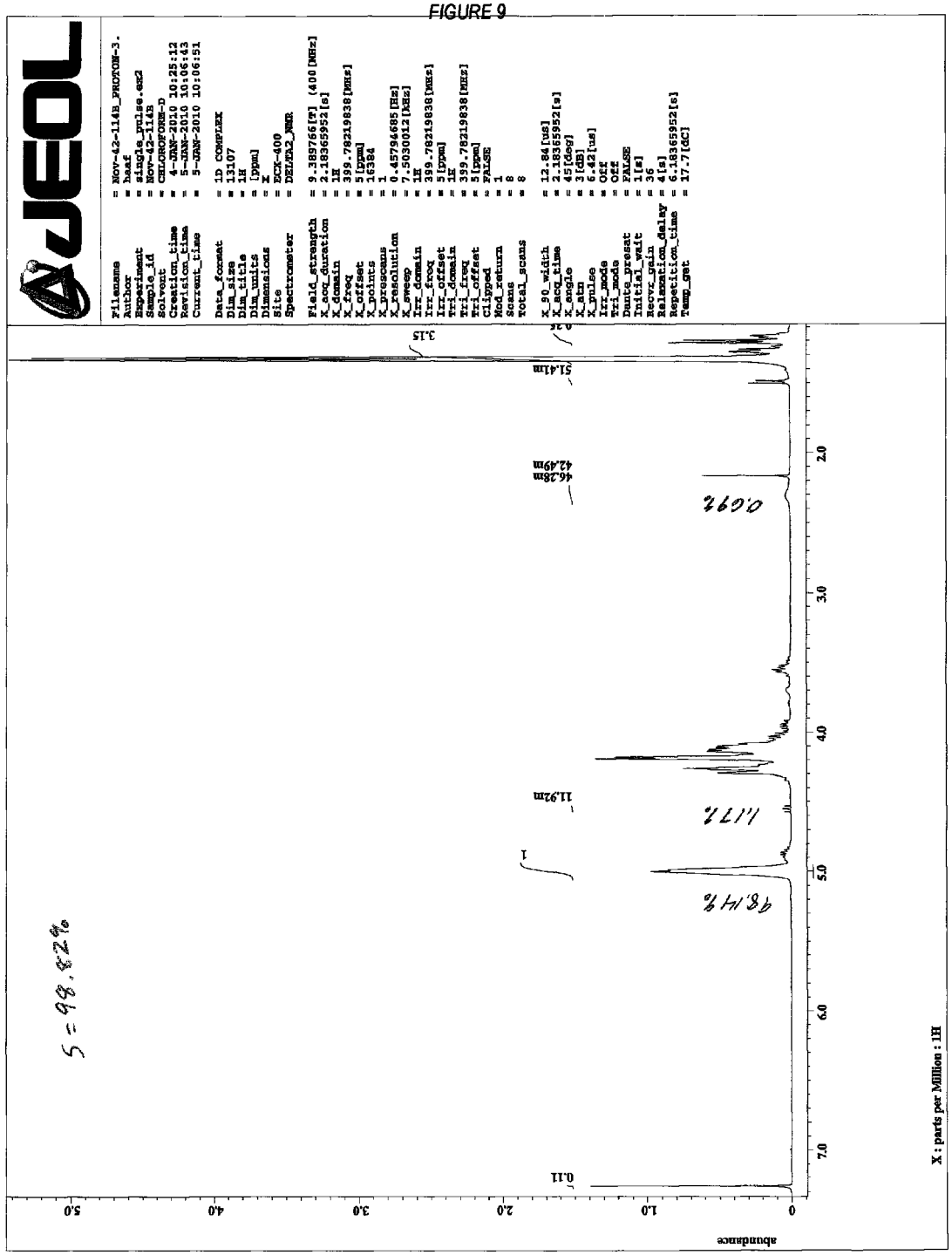
FIG. 9 shows a proton NMR spectrum of polyol PC-3
Figure 10:
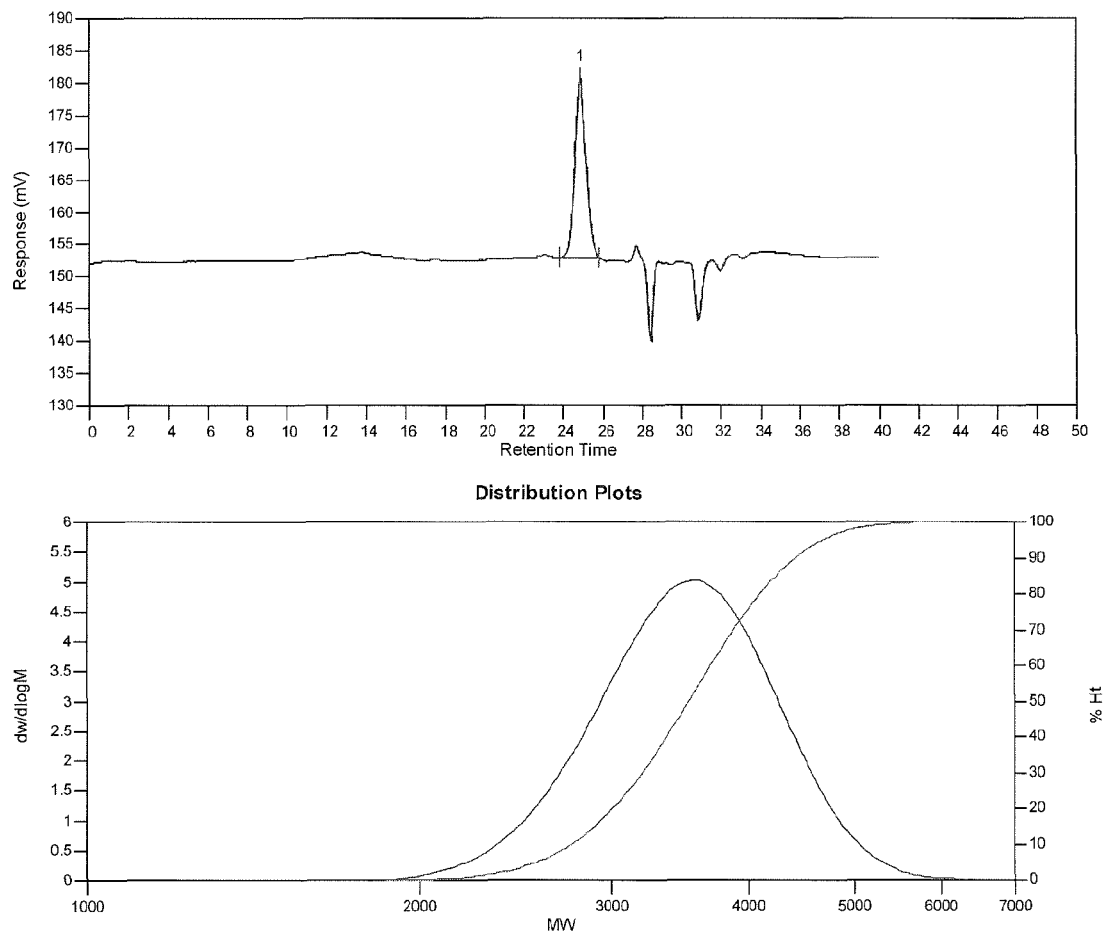
FIG. 10 shows a GPC trace of polyol PC-3
Figure 11:
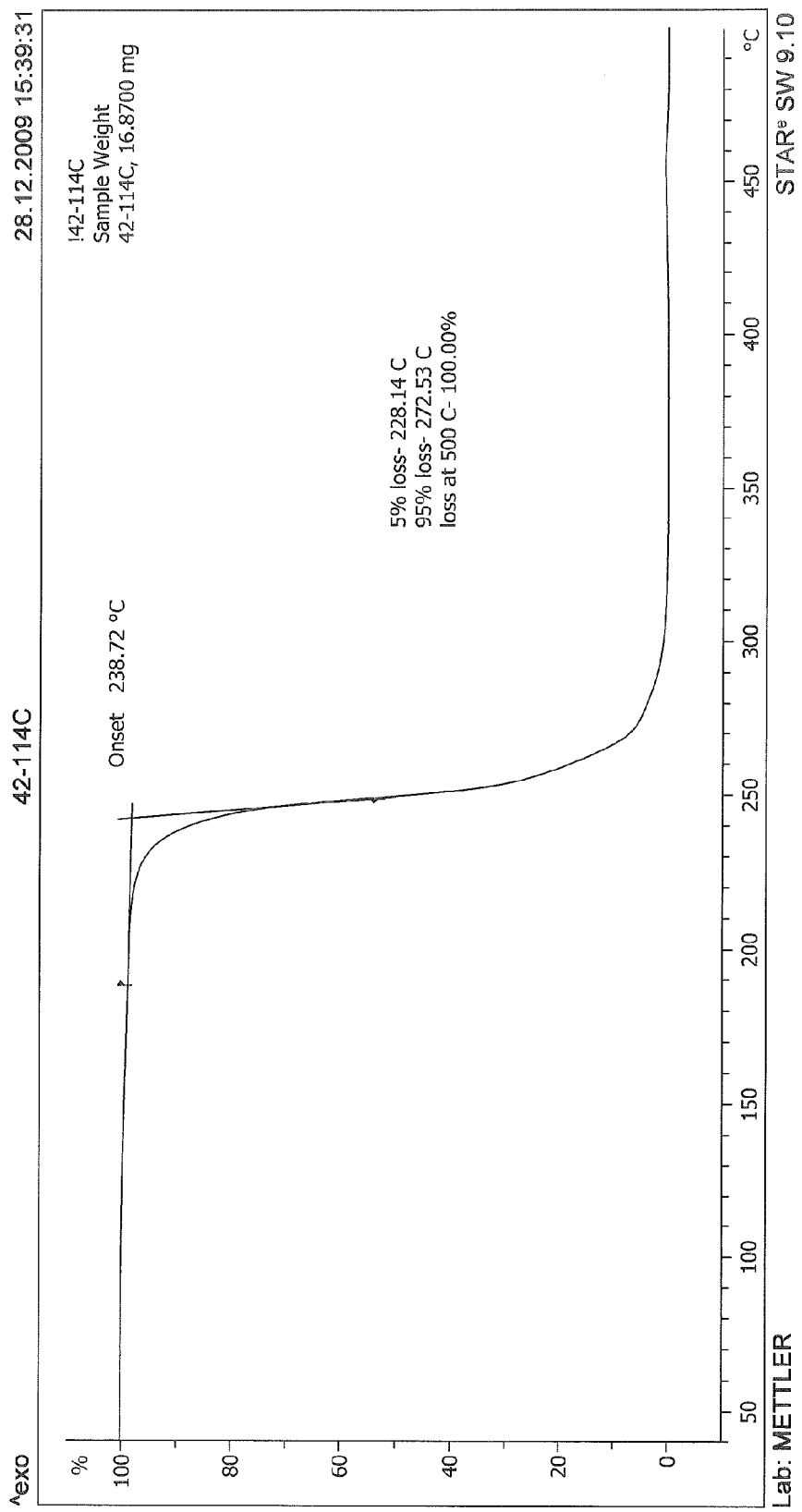
FIG. 11 shows a TGA of polyol PC-3
Figure 12:
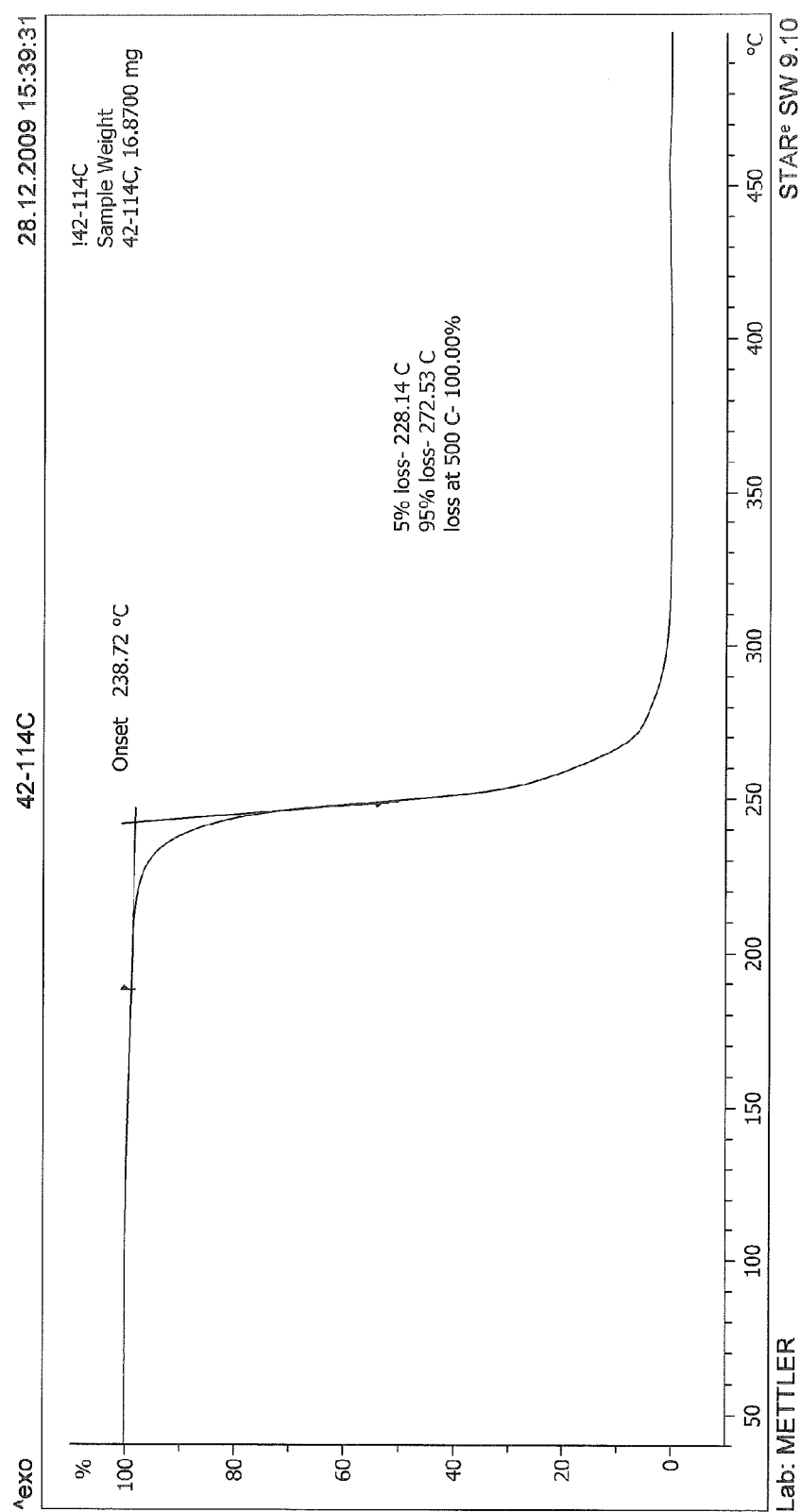
FIG. 12 shows a DSC trace of polyol PC-3
Figure 13:
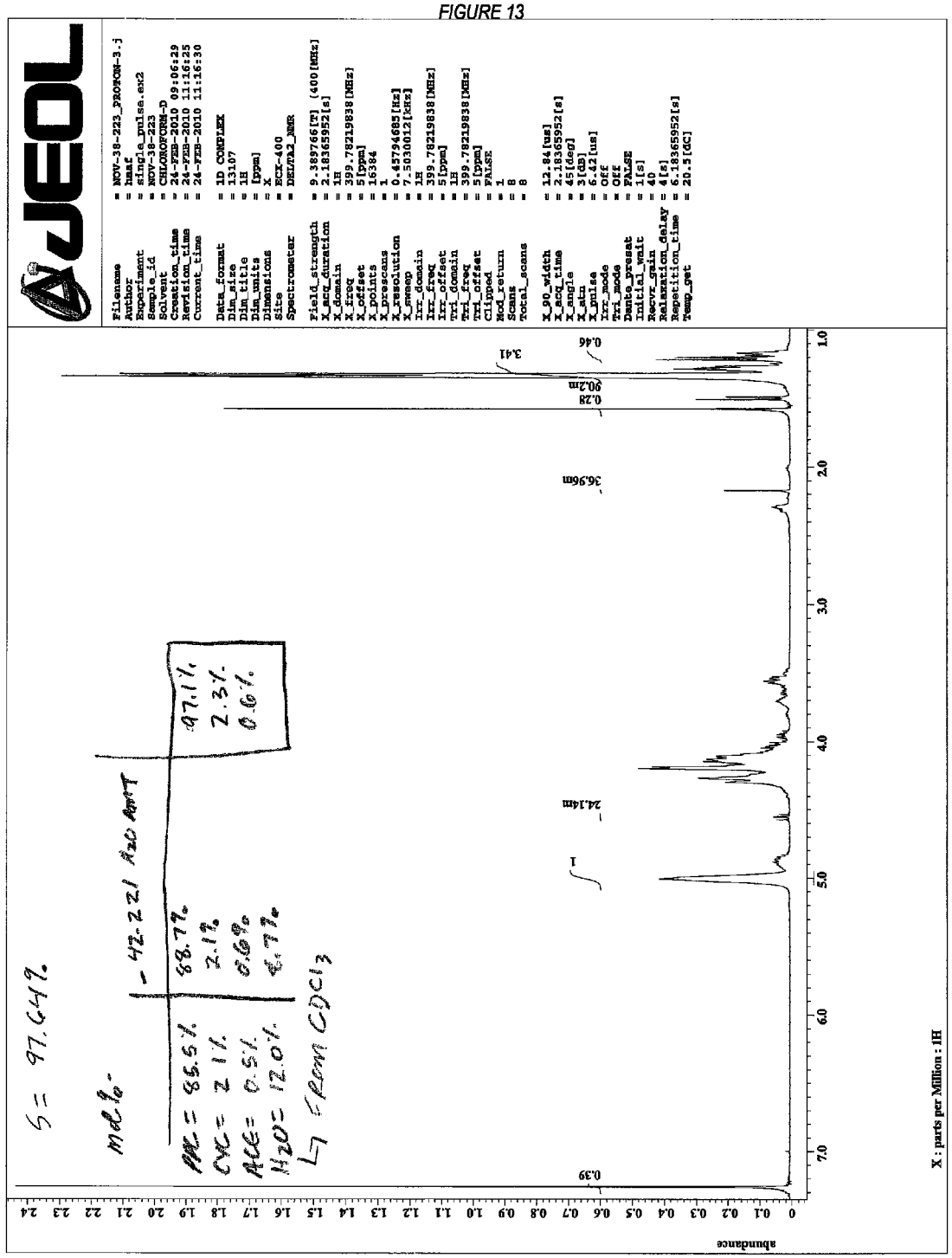
FIG. 13 shows a proton NMR spectrum of polyol PC-4
Figure 14:
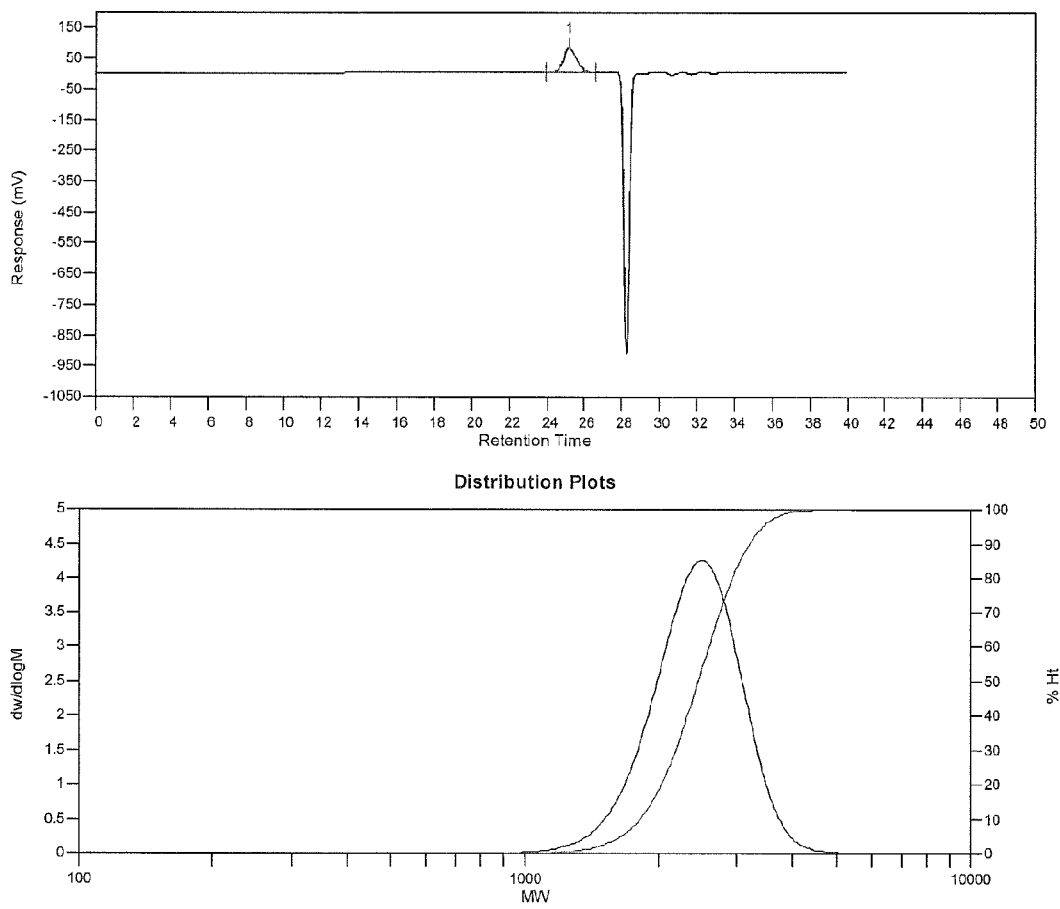
FIG. 14 shows a GPC trace of polyol PC-4
Figure 15:
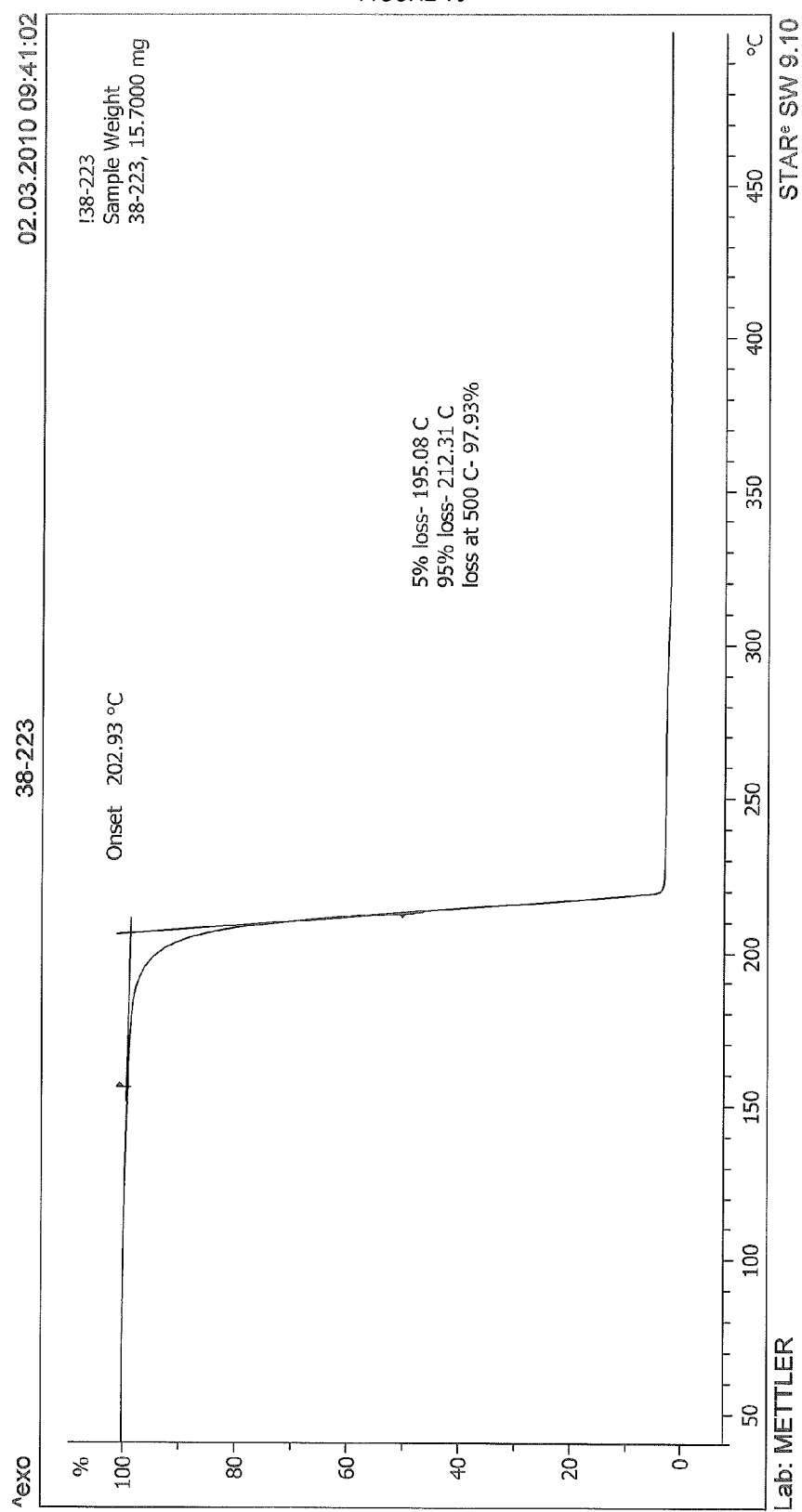
FIG. 15 shows a TGA of polyol PC-4
Figure 16:
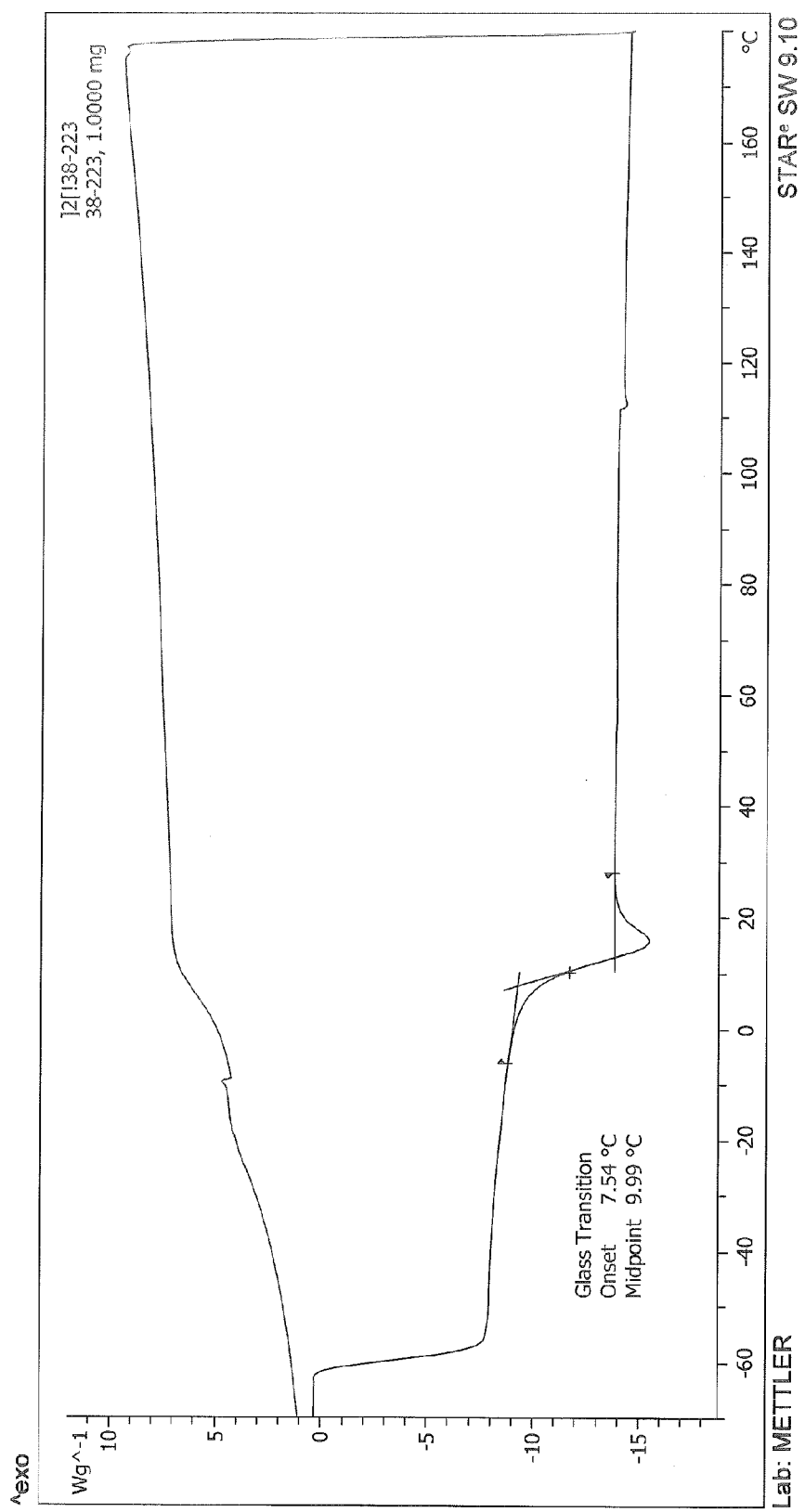
FIG. 16 shows a DSC trace of polyol PC-4
Figure 17:
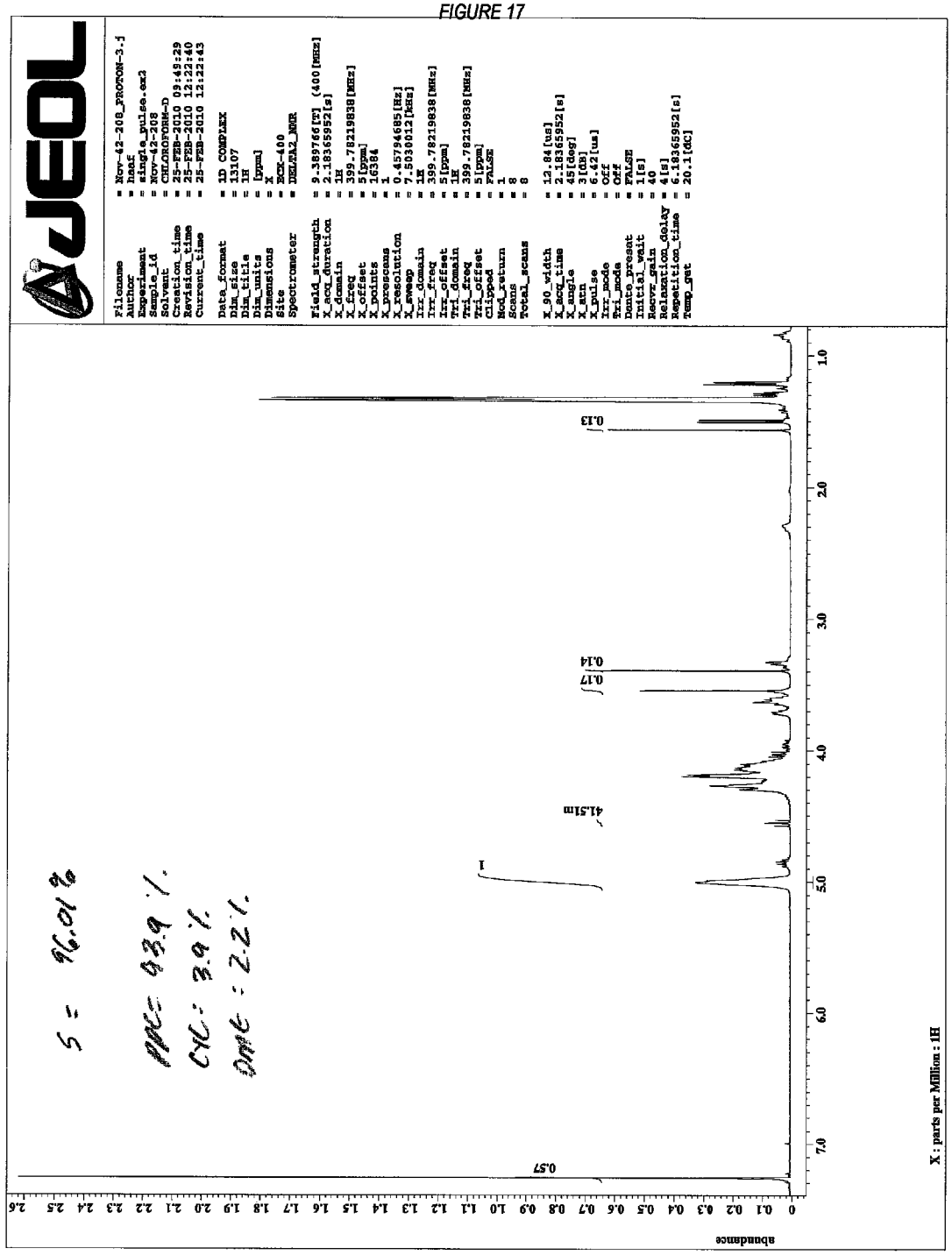
FIG. 17 shows a proton NMR spectrum of polyol PC-5
Figure 18:
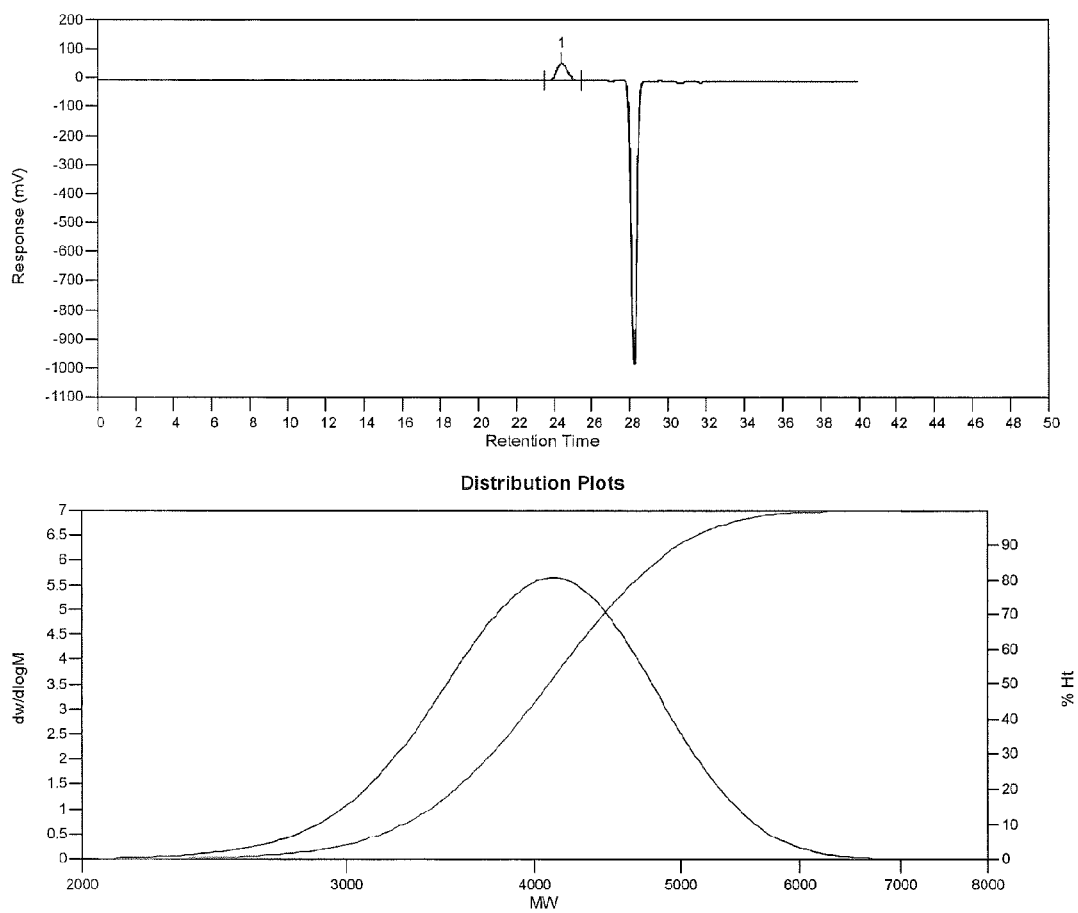
FIG. 18 shows a GPC trace of polyol PC-5
Figure 19:
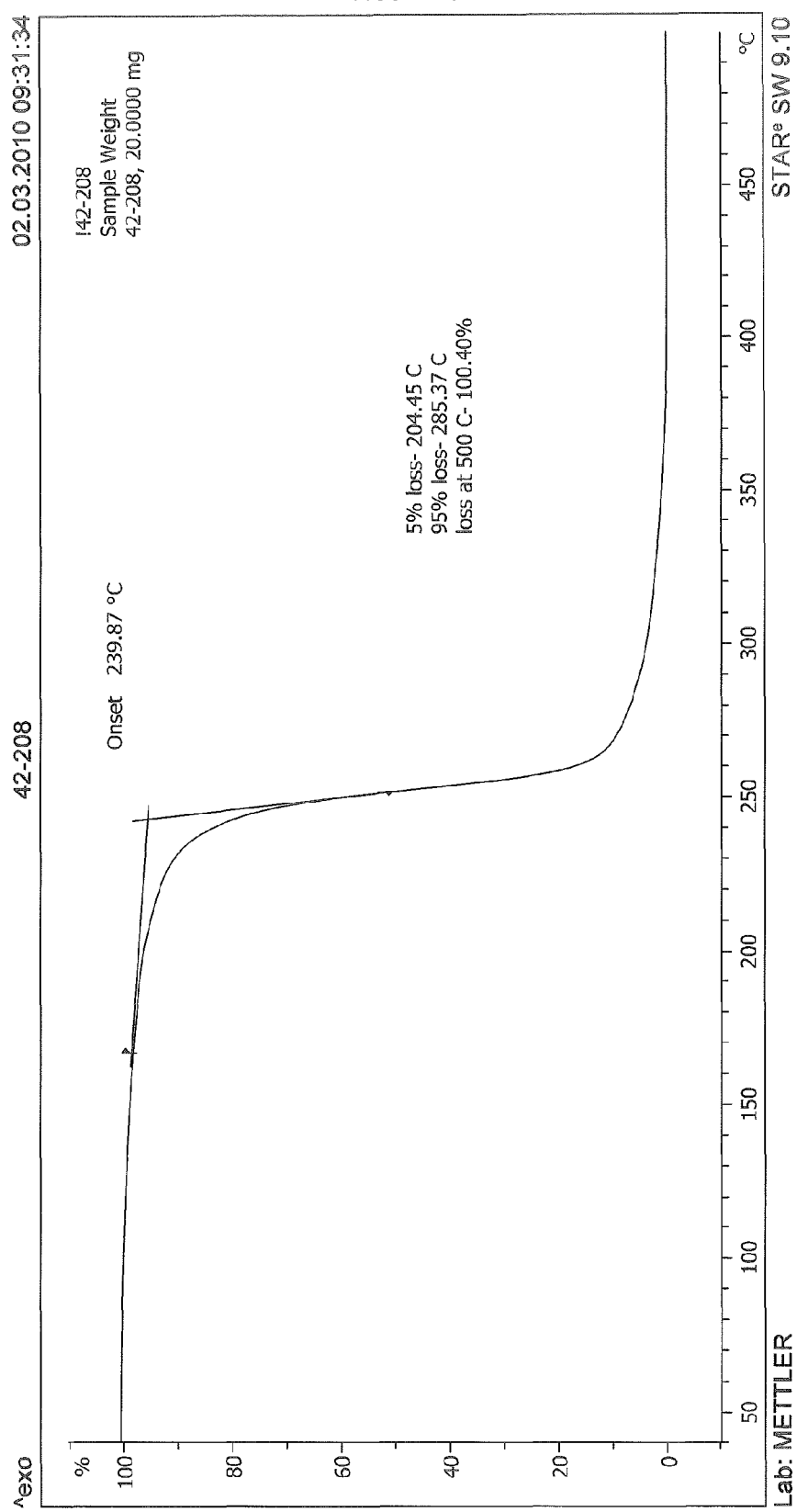
FIG. 19 shows a TGA of polyol PC-5
Figure 20:
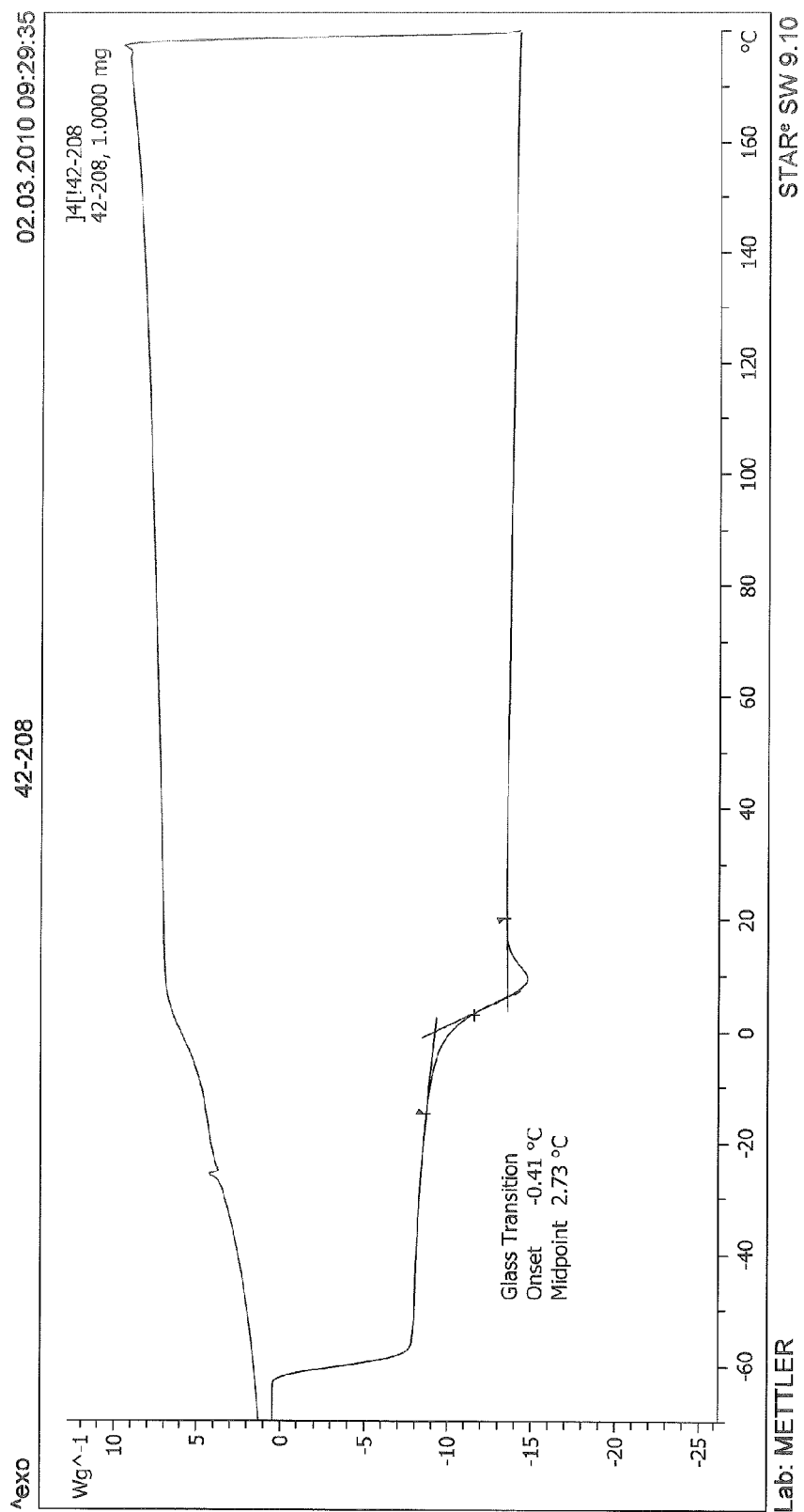
FIG. 20 shows a DSC trace of polyol PC-5
Figure 21:
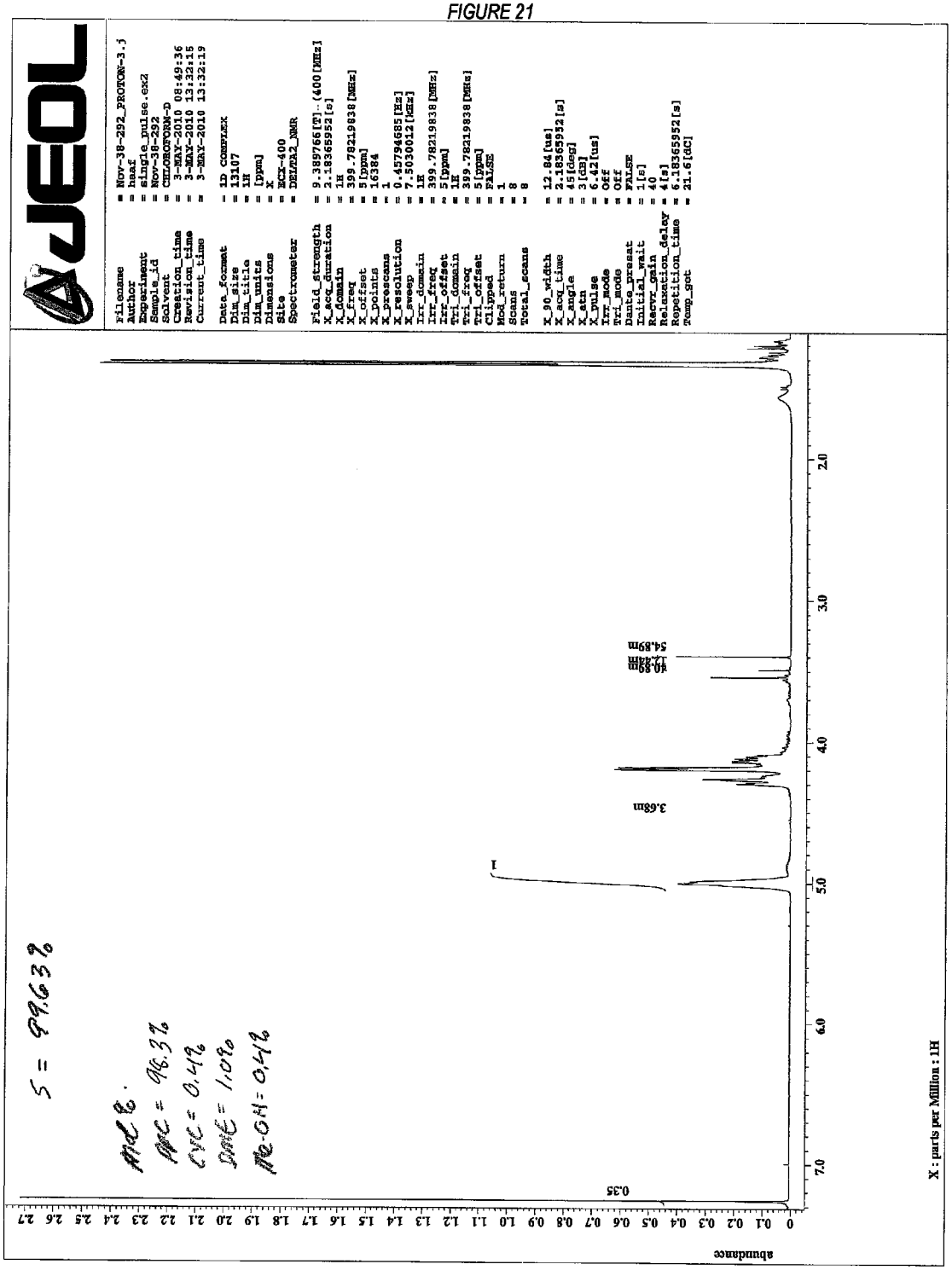
FIG. 21 shows a proton NMR spectrum of polyol PC-6
Figure 22:
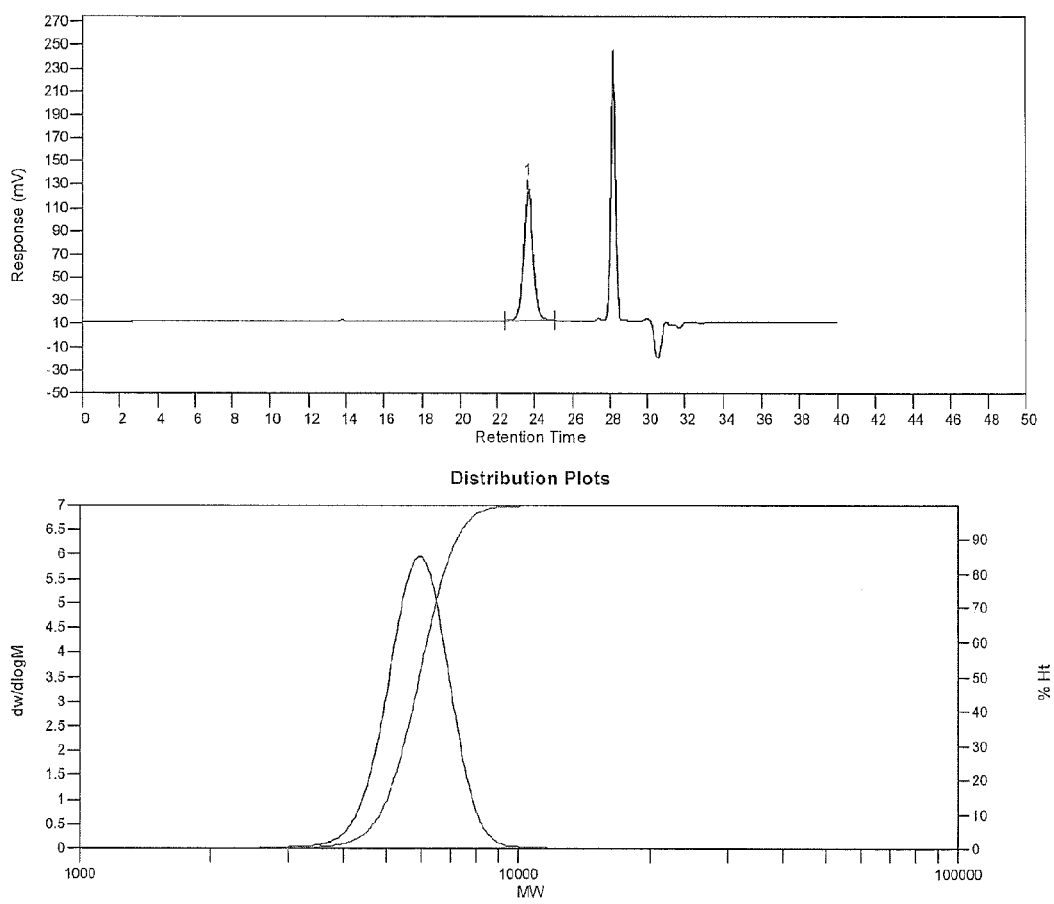
FIG. 22 shows a GPC trace of polyol PC-6
Figure 23:
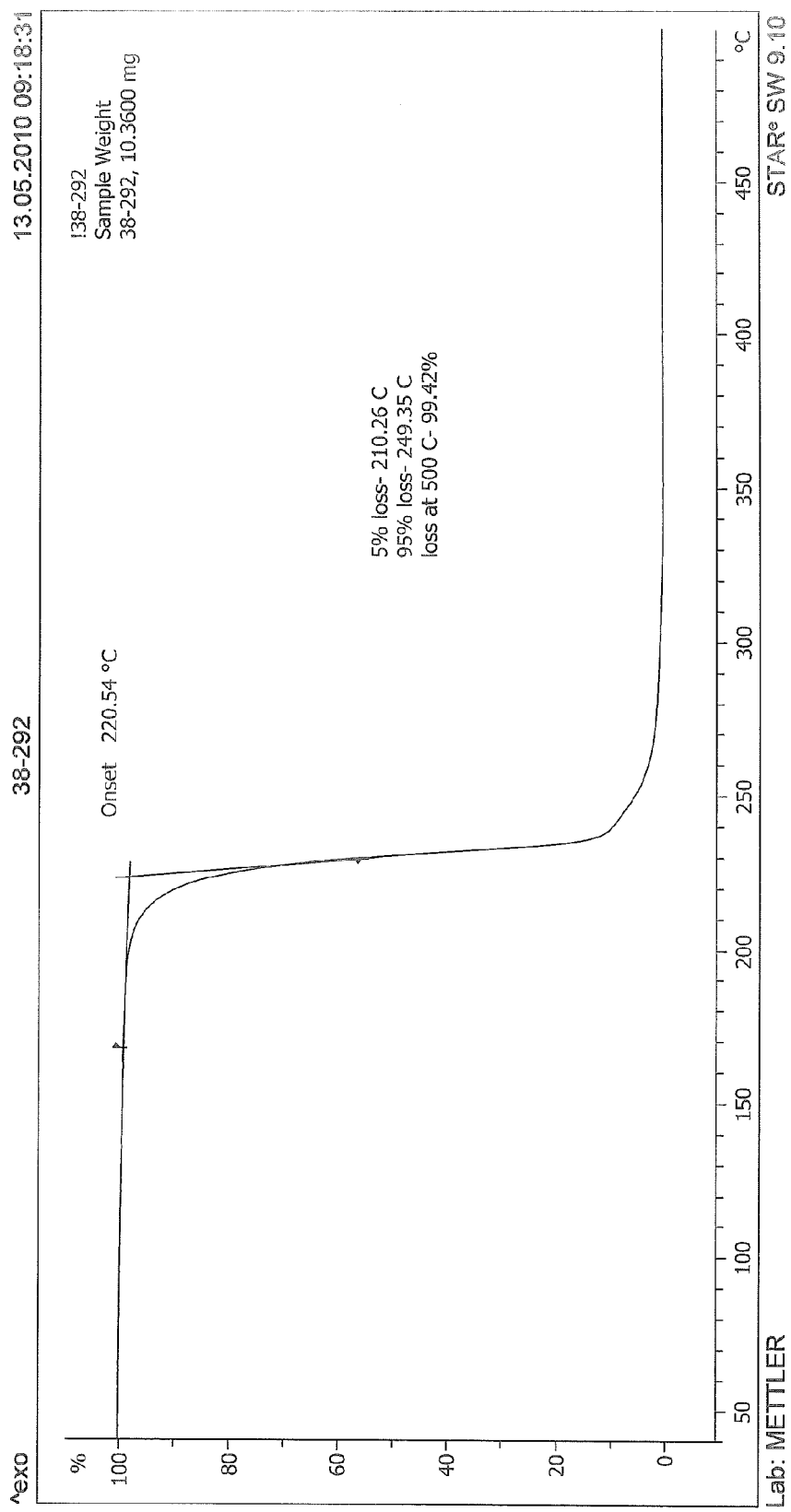
FIG. 23 shows a TGA of polyol PC-6
Figure 24:
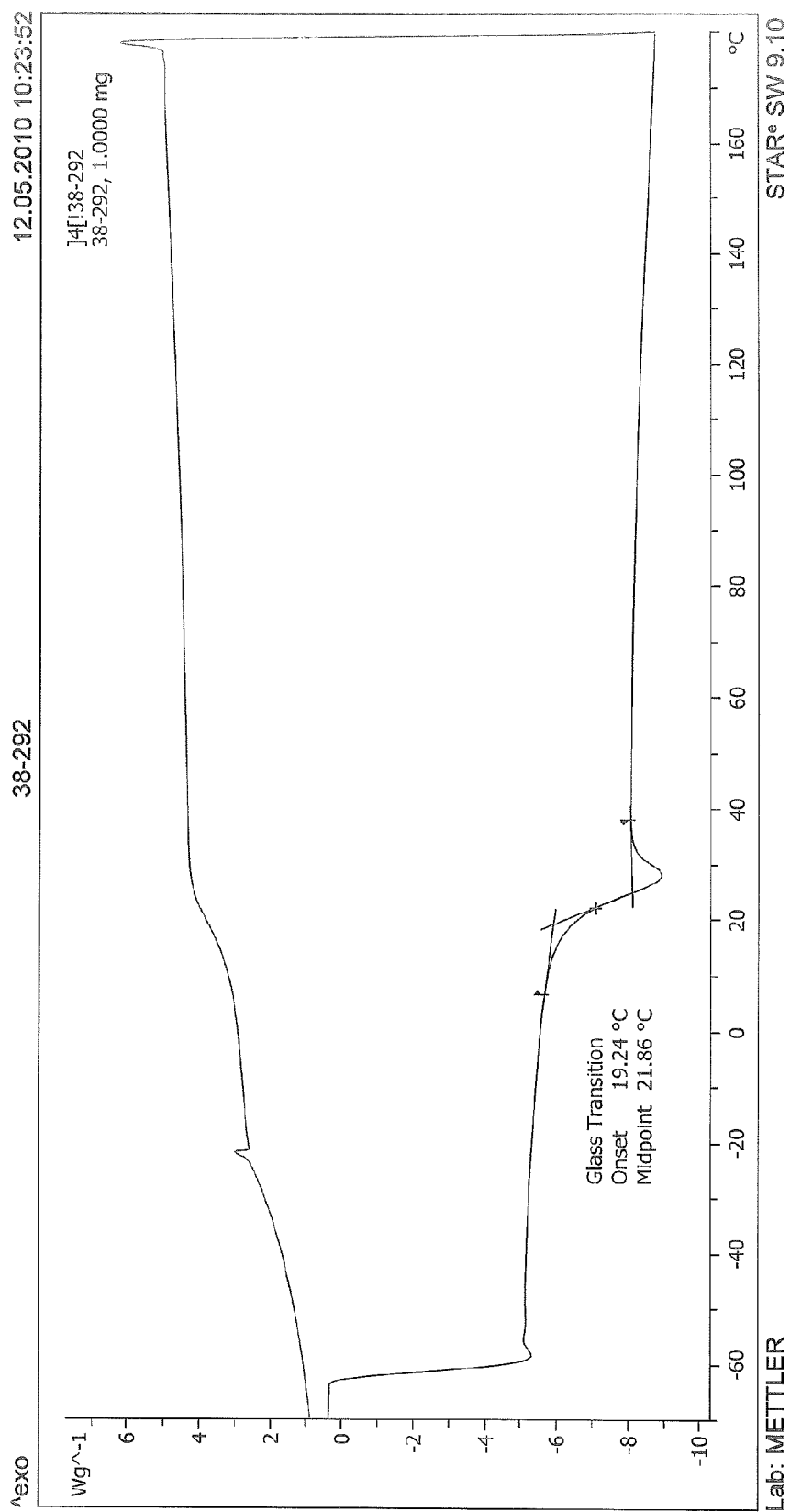
FIG. 24 shows a DSC trace of polyol PC-6
Figure 25:
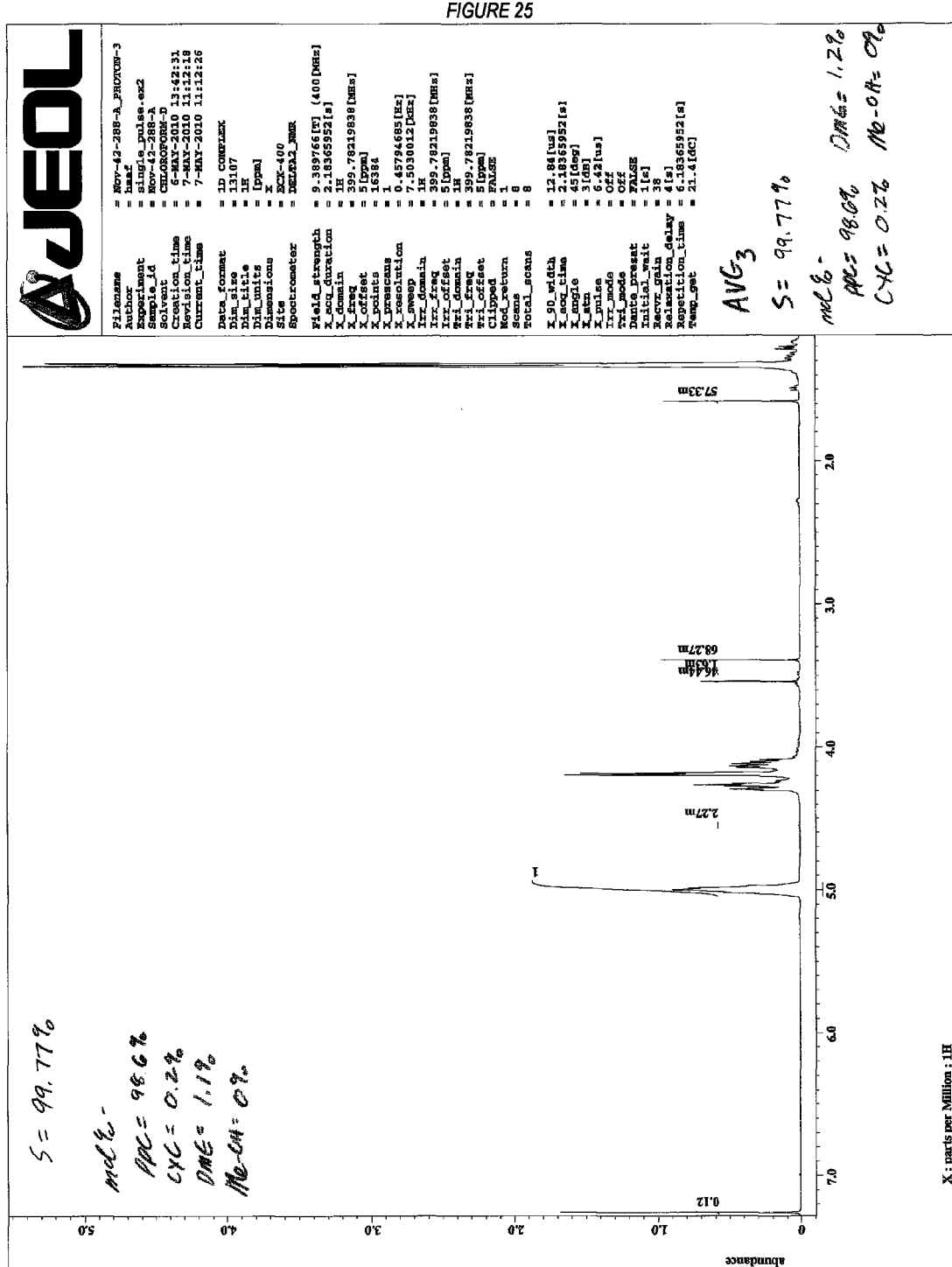
FIG. 25 shows a proton NMR spectrum of polyol PC-7
Figure 26:
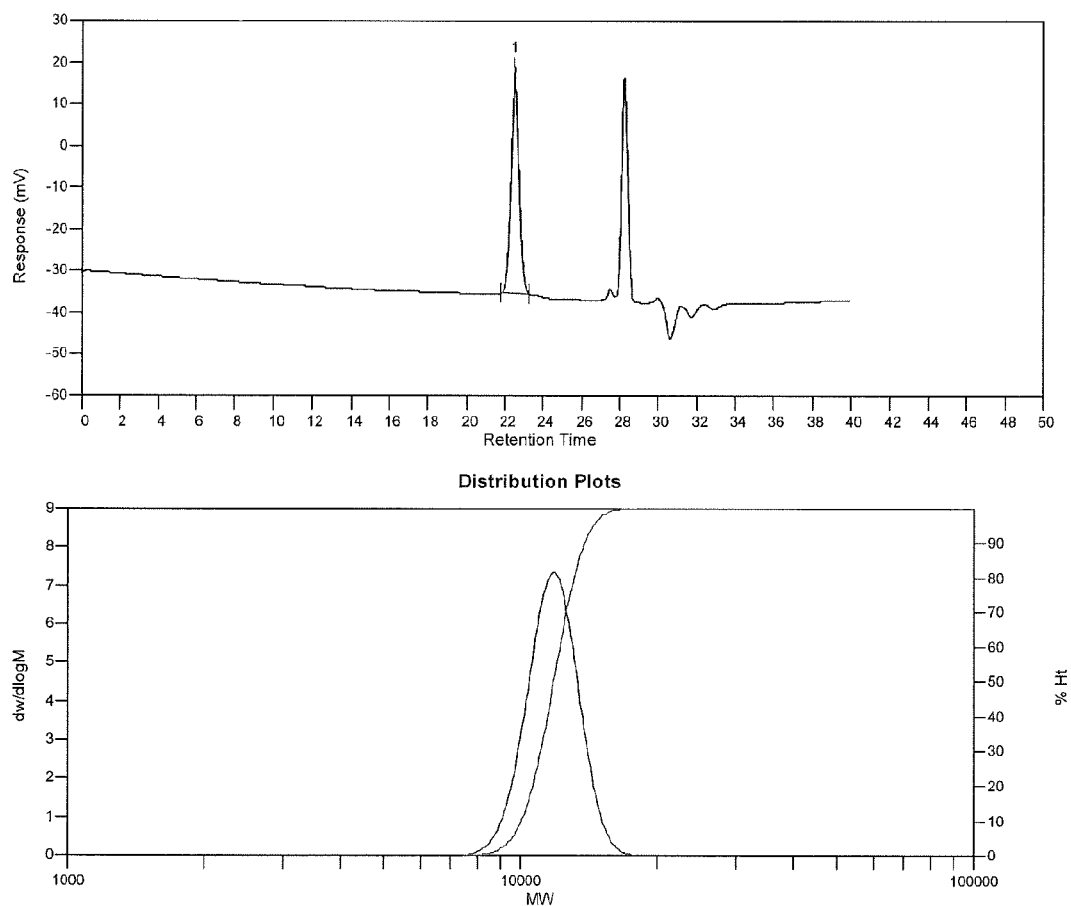
FIG. 26 shows a GPC trace of polyol PC-7
Figure 27:
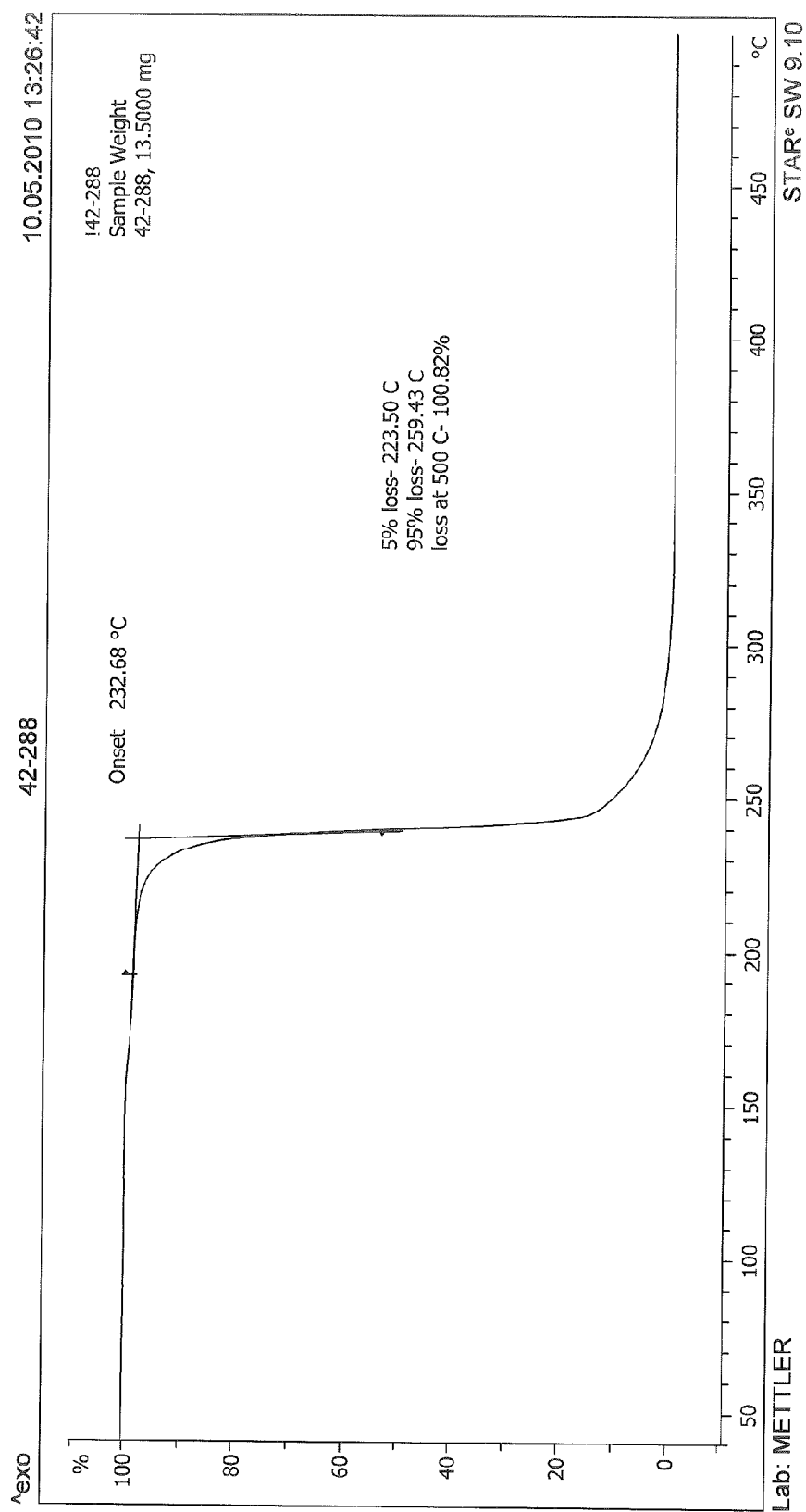
FIG. 27 shows a TGA of polyol PC-7
Figure 28:
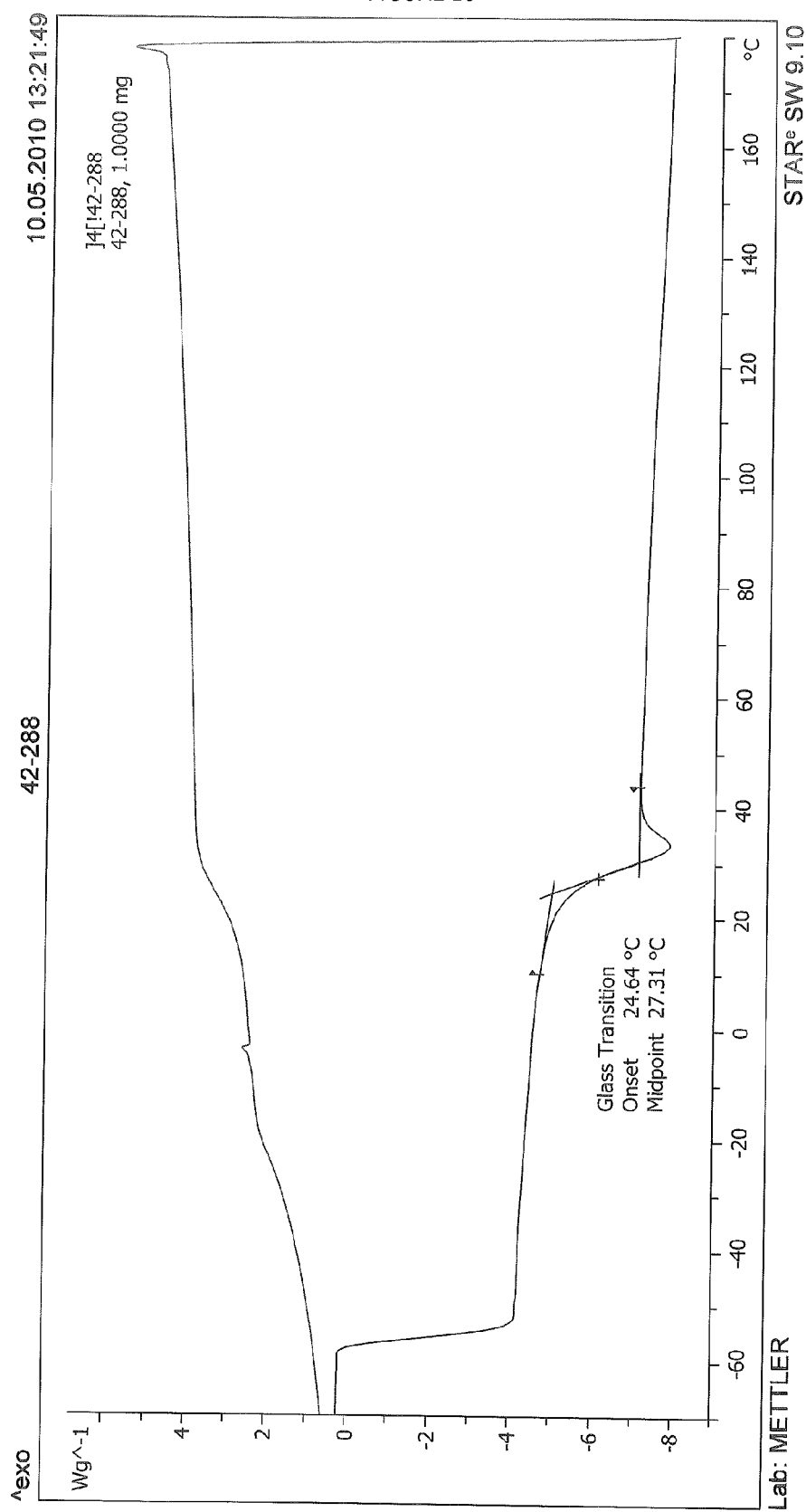
FIG. 28 shows a DSC trace of polyol PC-7
Figure 29:
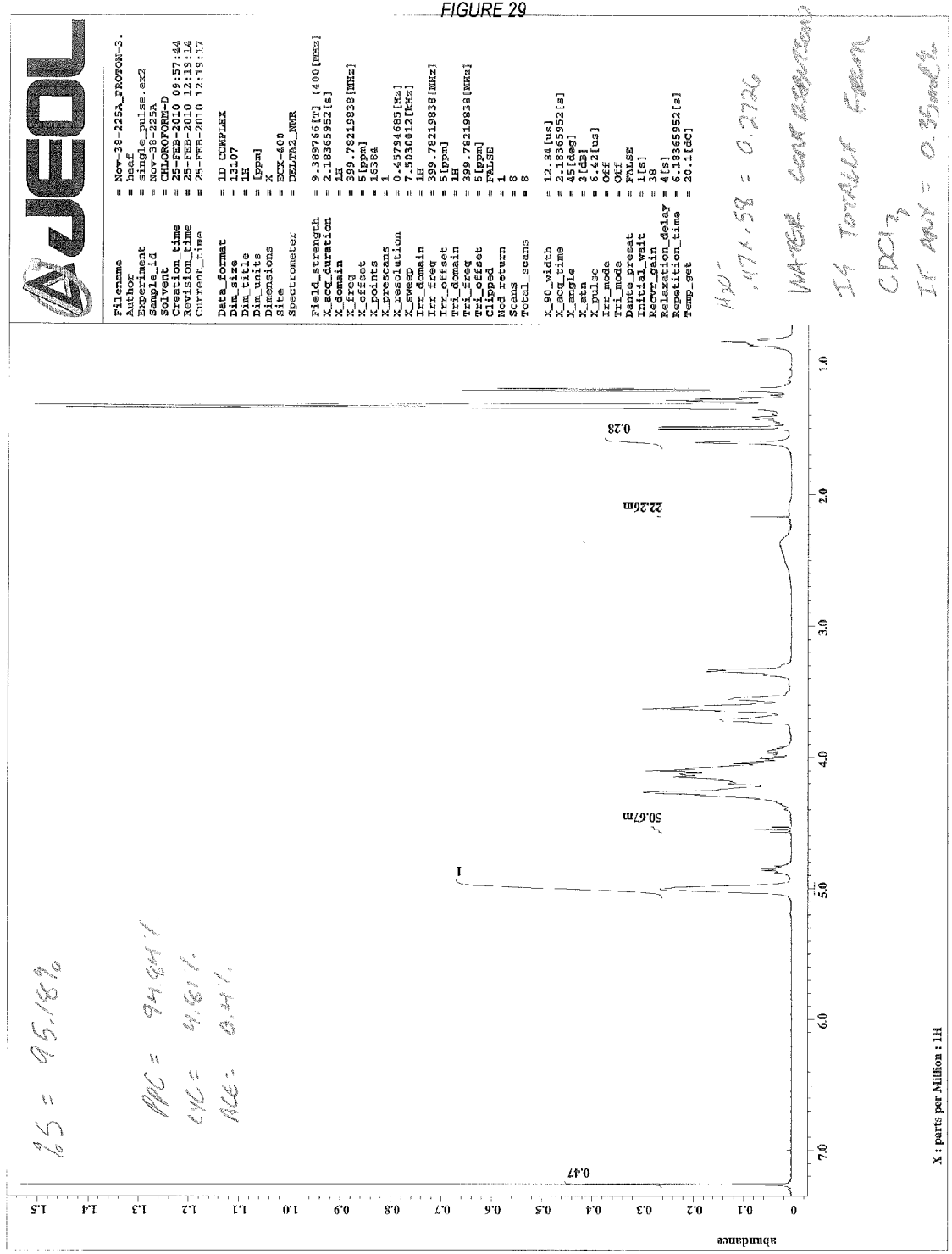
FIG. 29 shows a proton NMR spectrum of polyol PC-8
Figure 30:
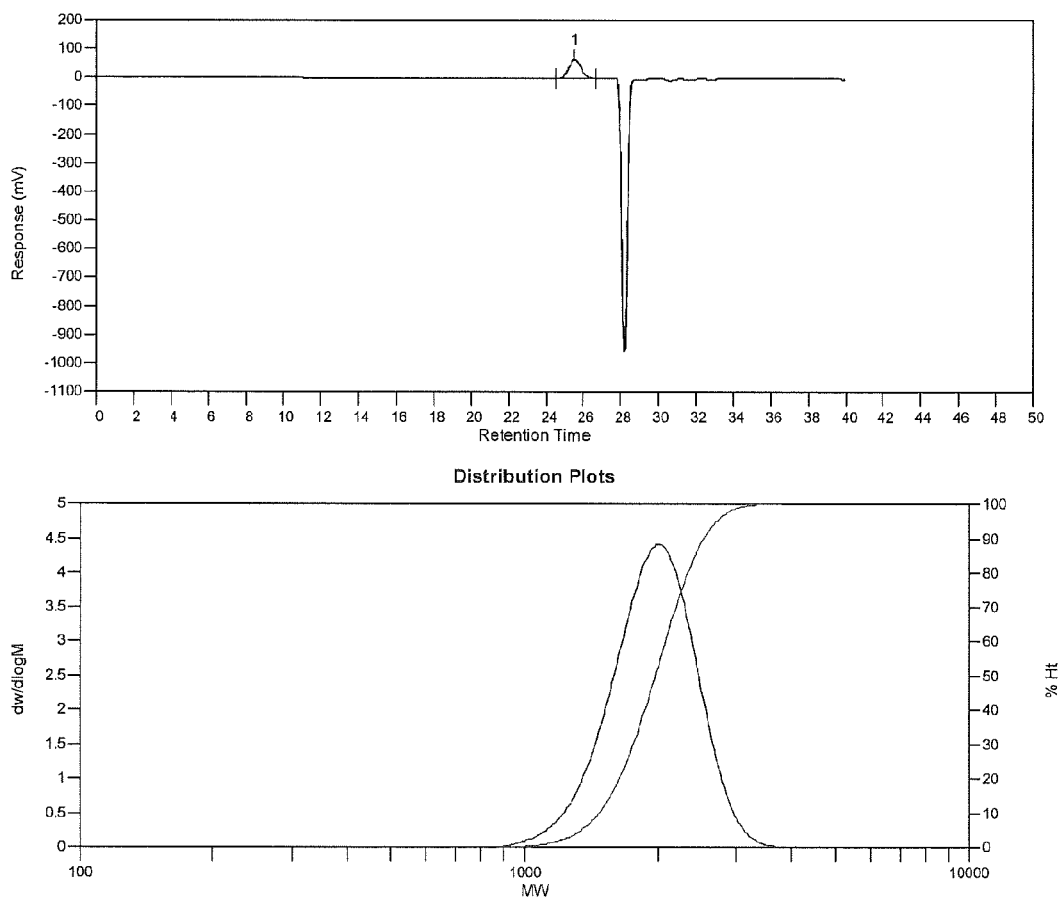
FIG. 30 shows a GPC trace of polyol PC-8
Figure 31:
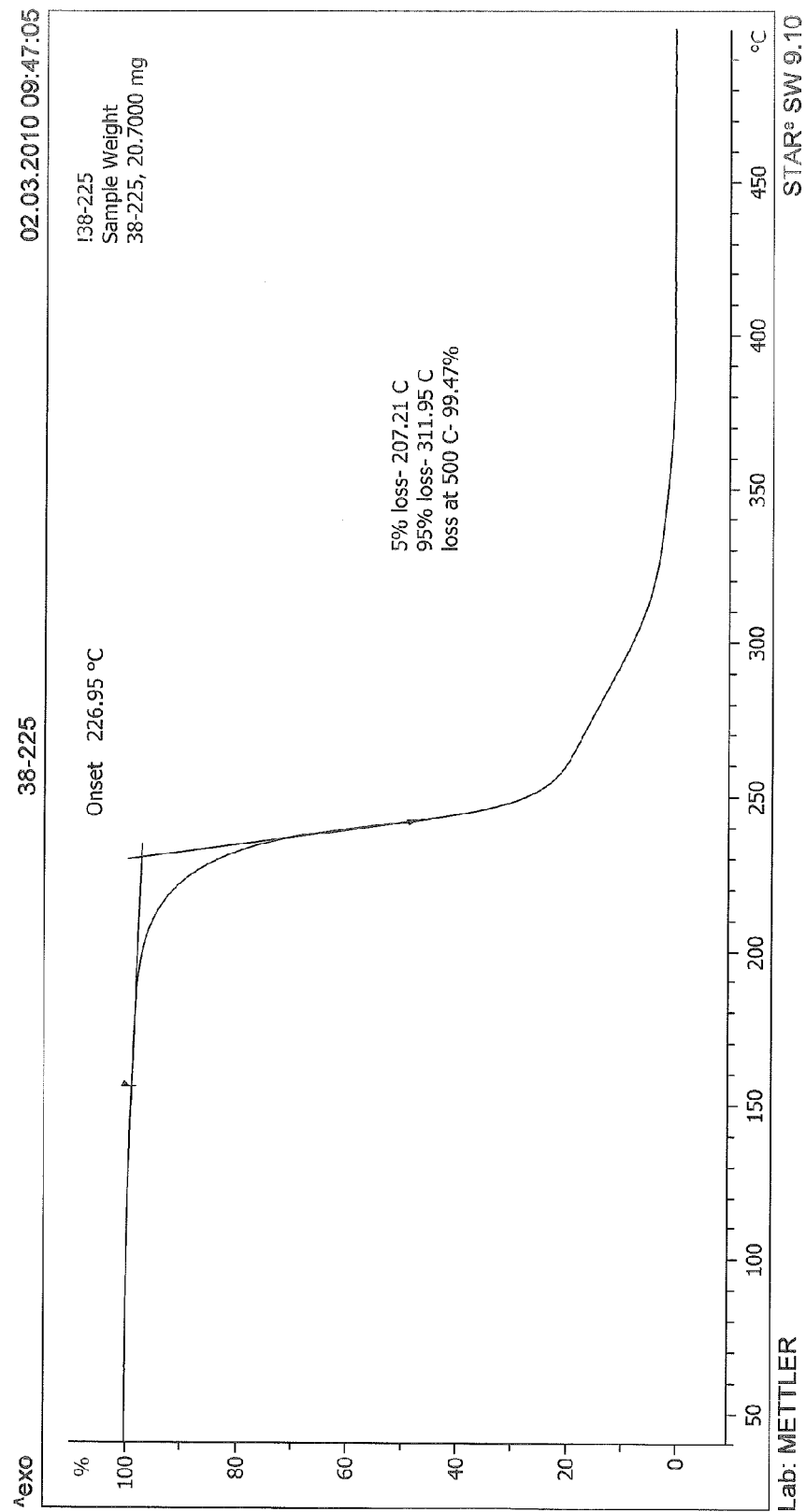
FIG. 31 shows a TGA of polyol PC-8
Figure 32:
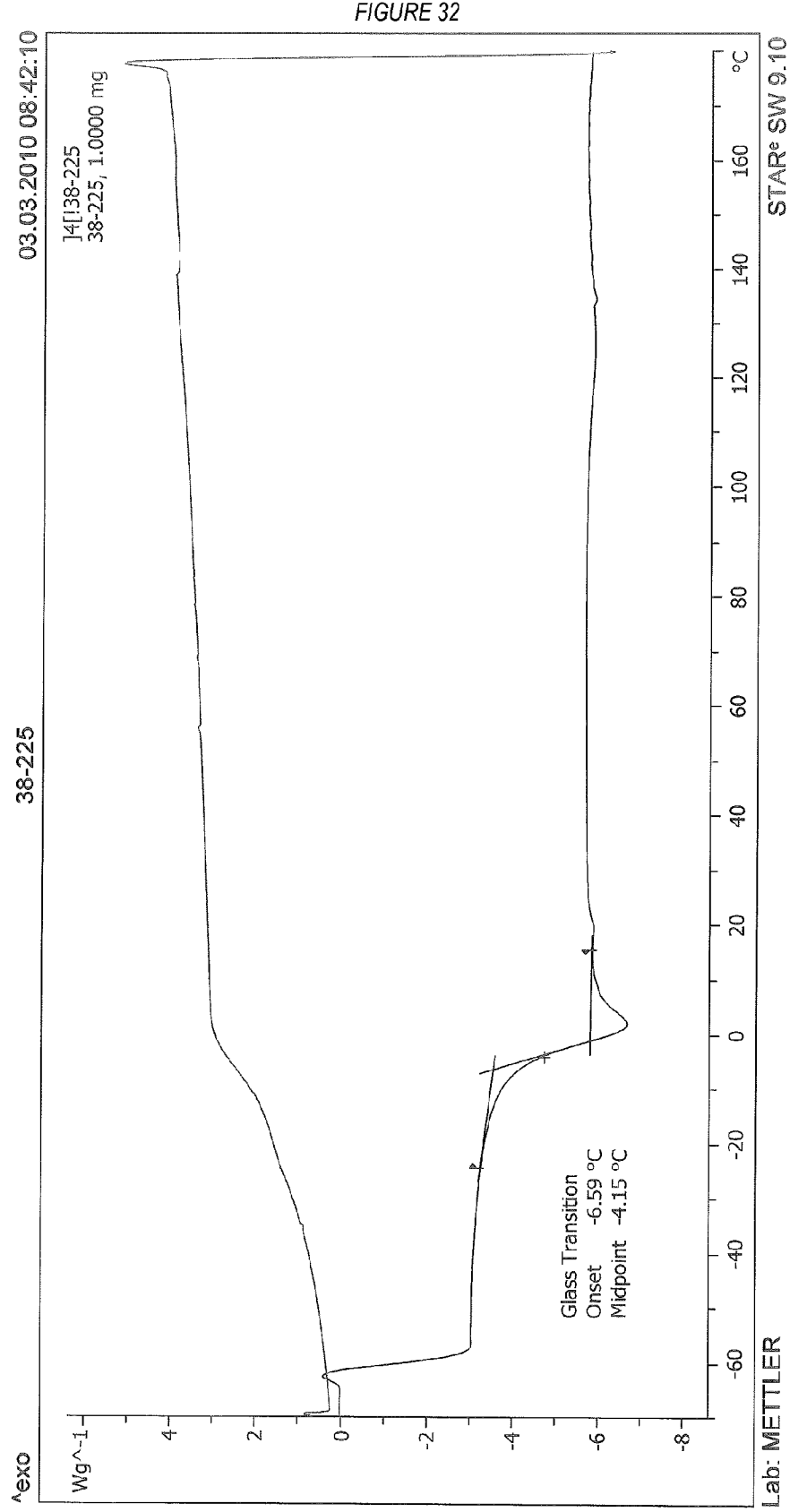
FIG. 32 shows a DSC trace of polyol PC-8
Figure 33:
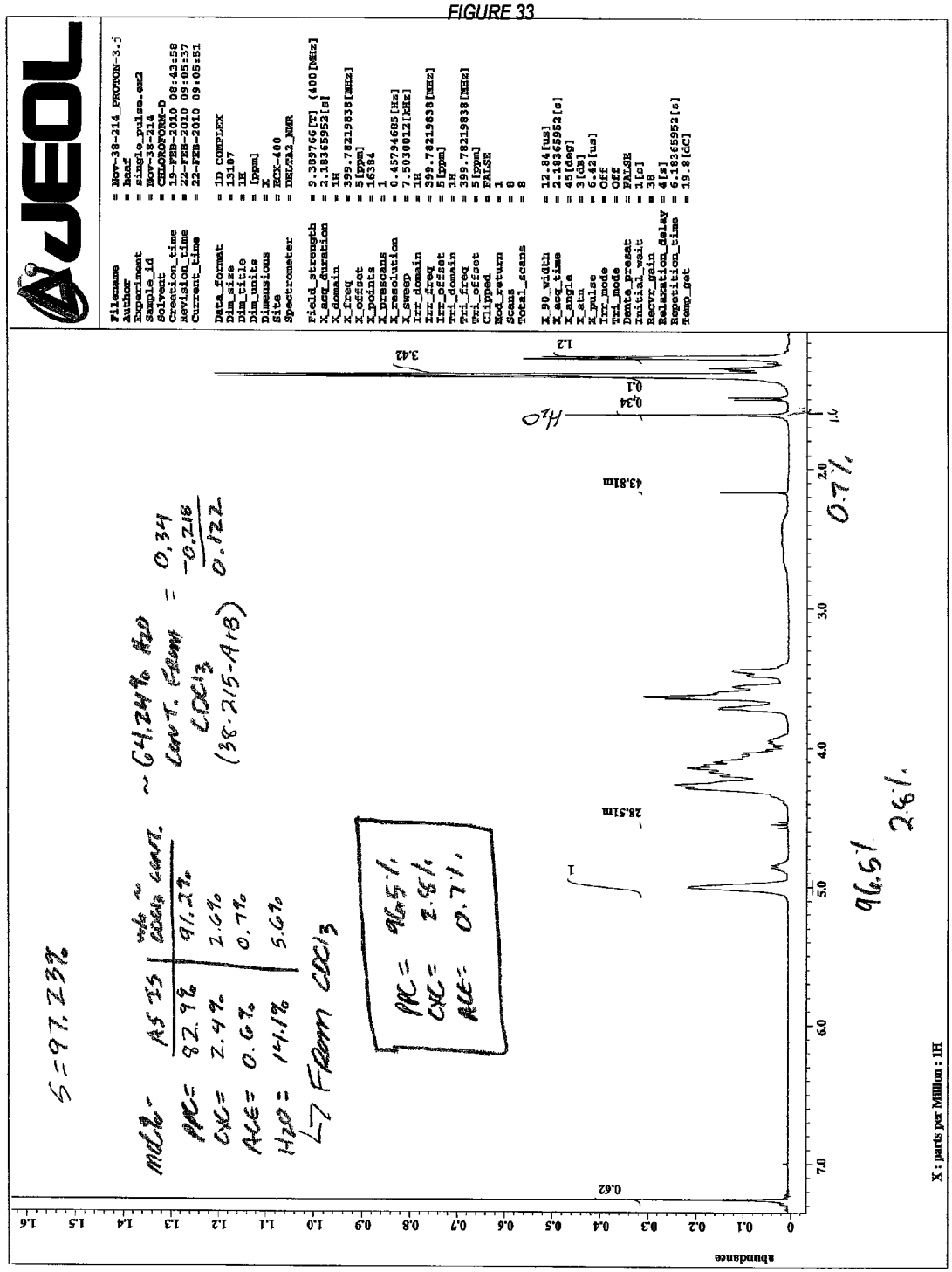
FIG. 33 shows a proton NMR spectrum of polyol PC-9
Figure 34:
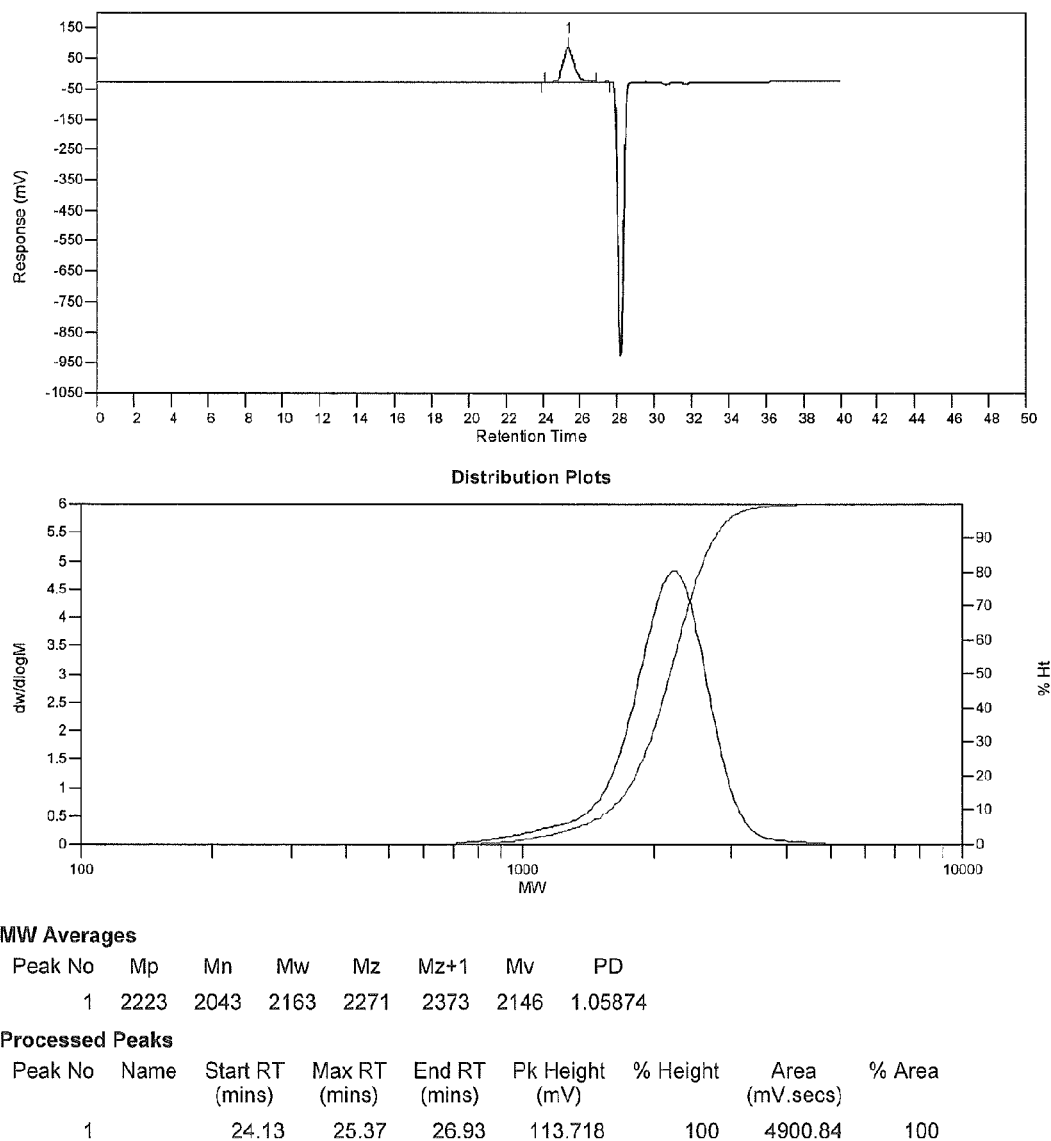
FIG. 34 shows a GPC trace of polyol PC-9
Figure 35:
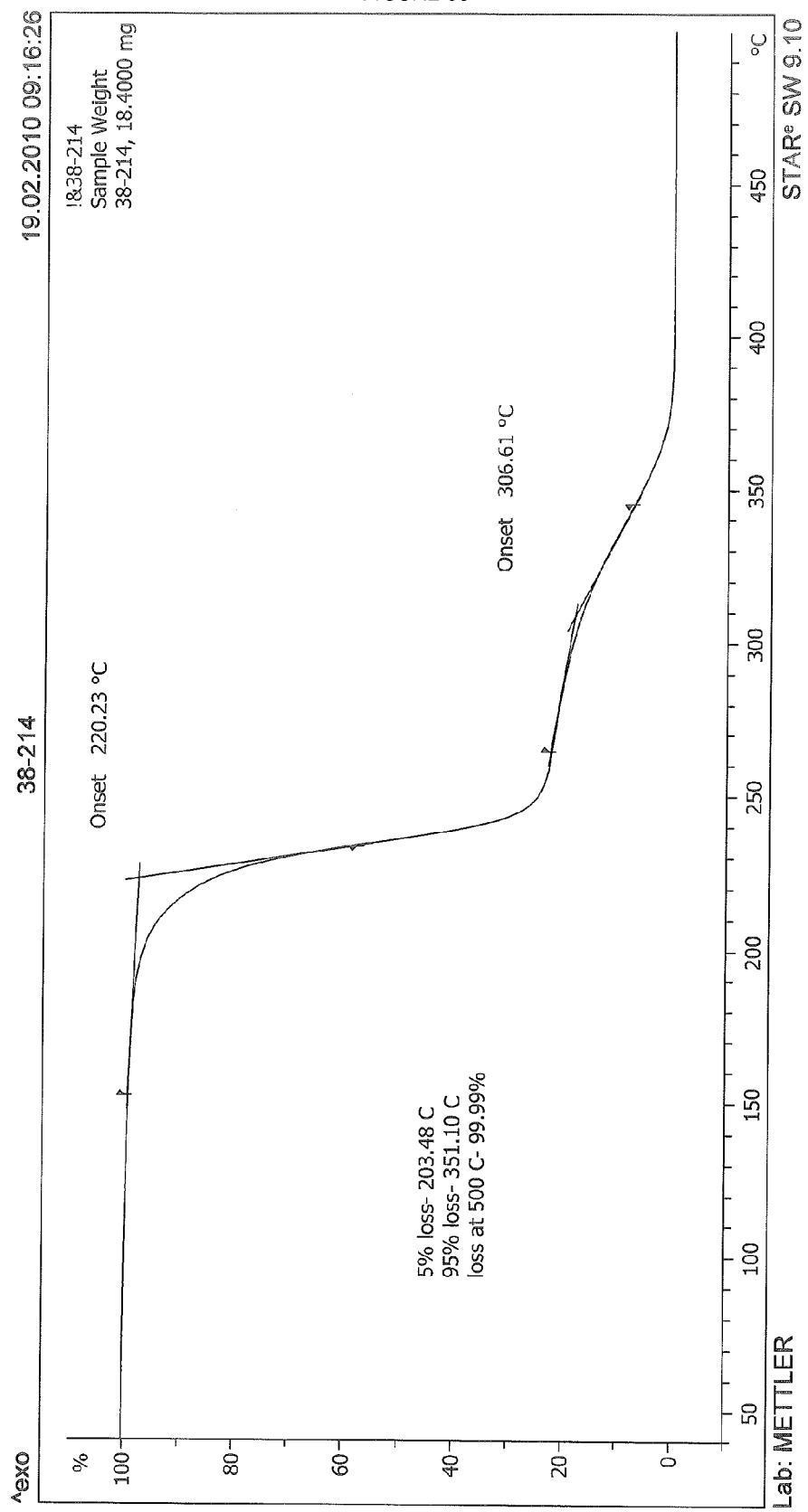
FIG. 35 shows a TGA of polyol PC-9
Figure 36:
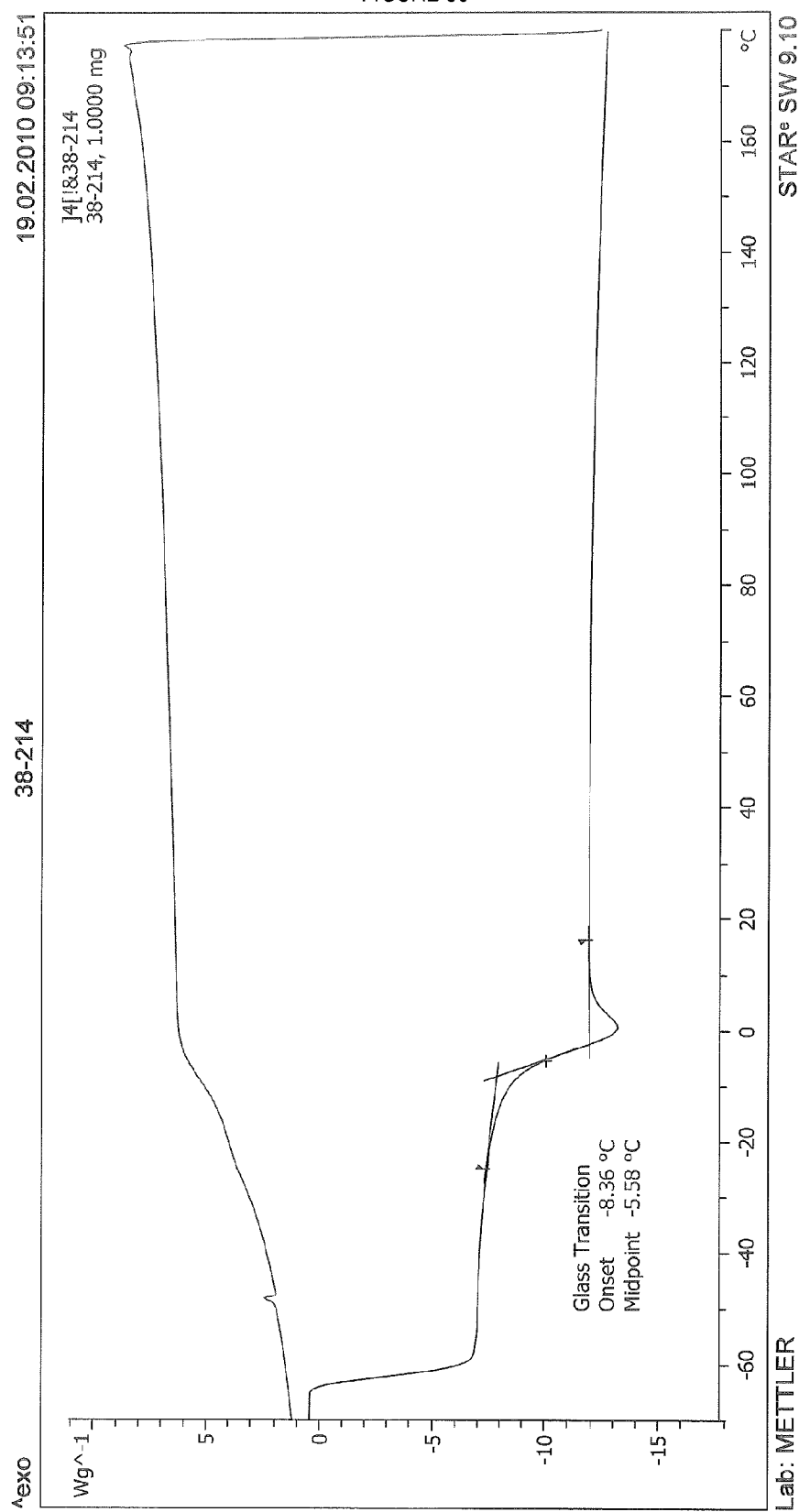
FIG. 36 shows a DSC trace of polyol PC-9
Figure 37:
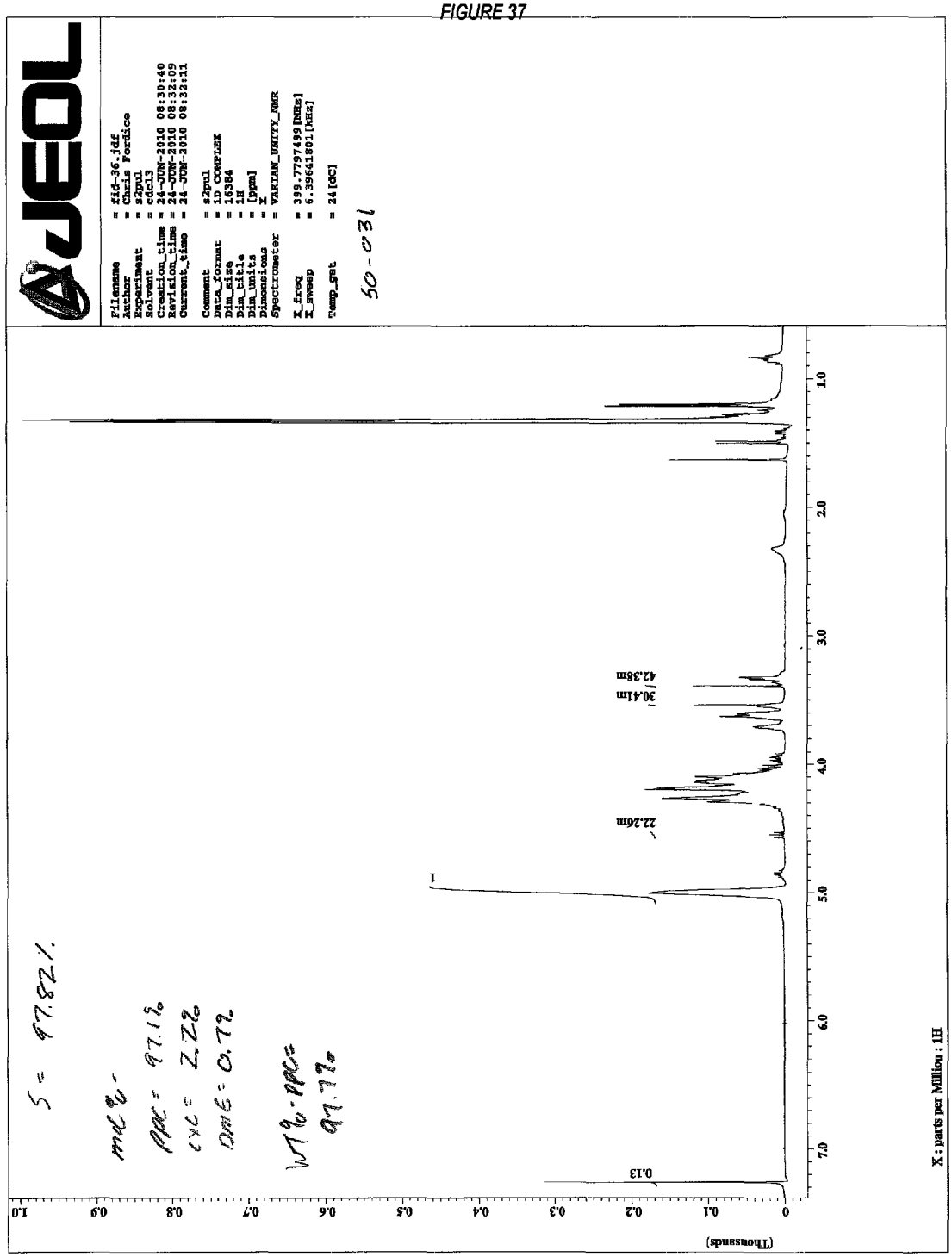
FIG. 37 shows a proton NMR spectrum of polyol PC-10
Figure 38:
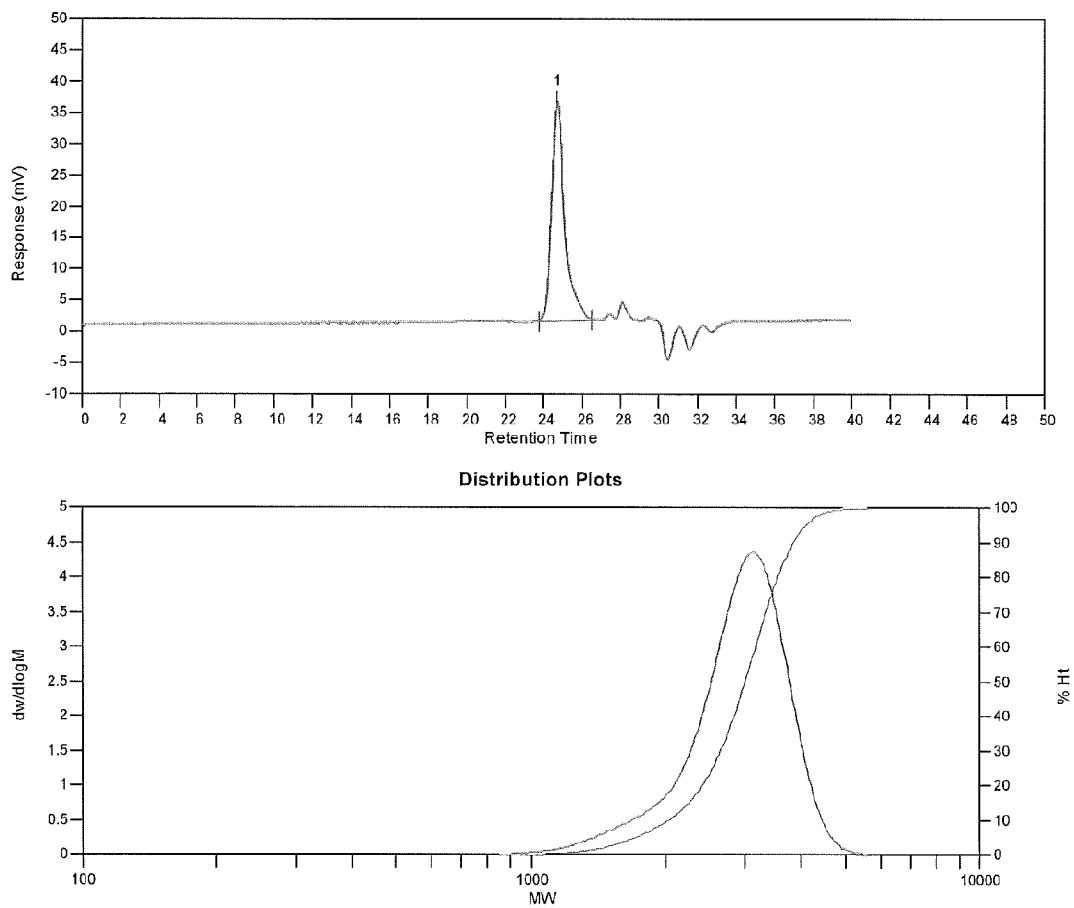
FIG. 38 shows a GPC trace of polyol PC-10
Figure 39:
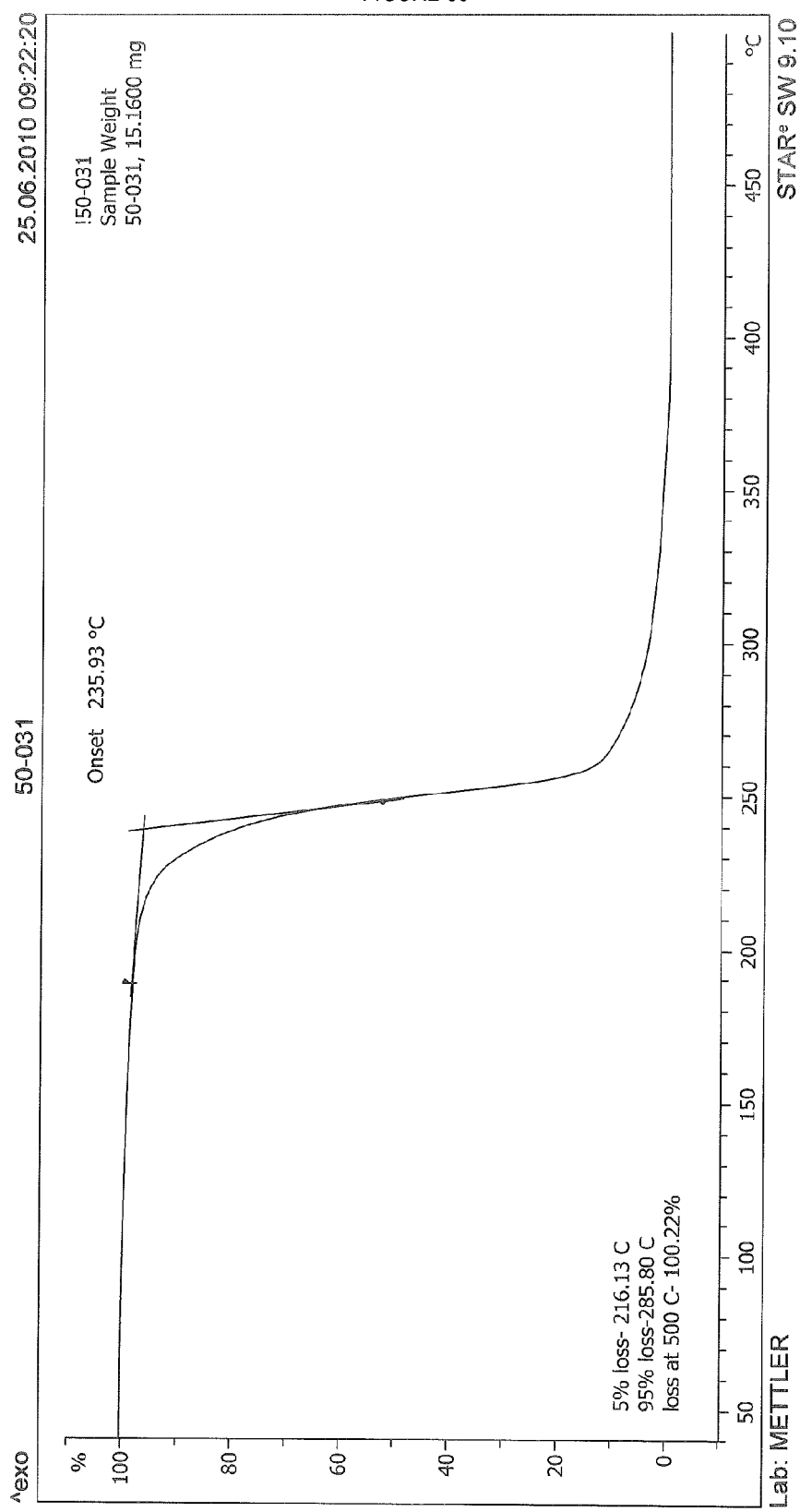
FIG. 39 shows a TGA of polyol PC-10
Figure 40:
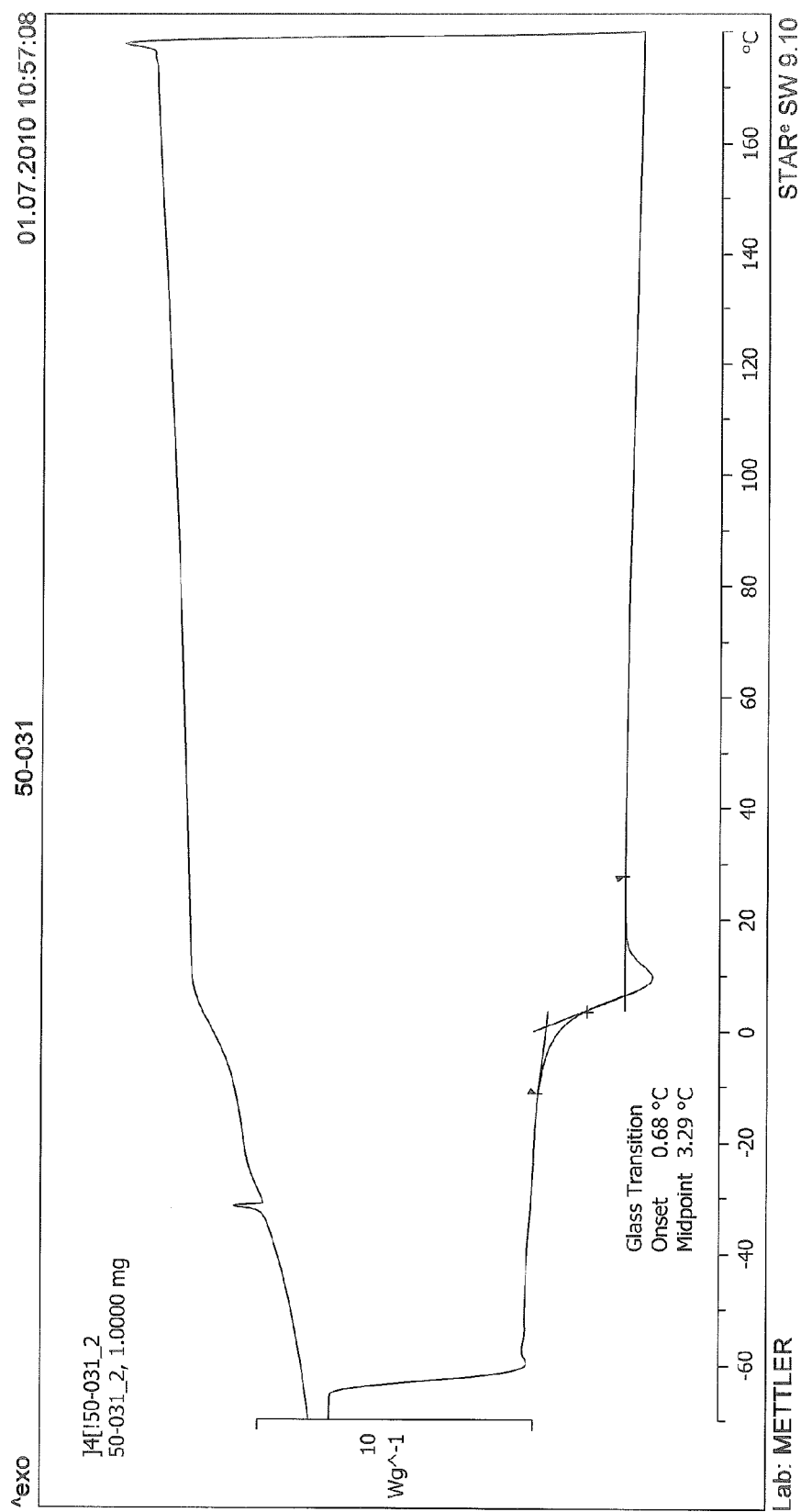
FIG. 40 shows a DSC trace of polyol PC-10
Figure 41:
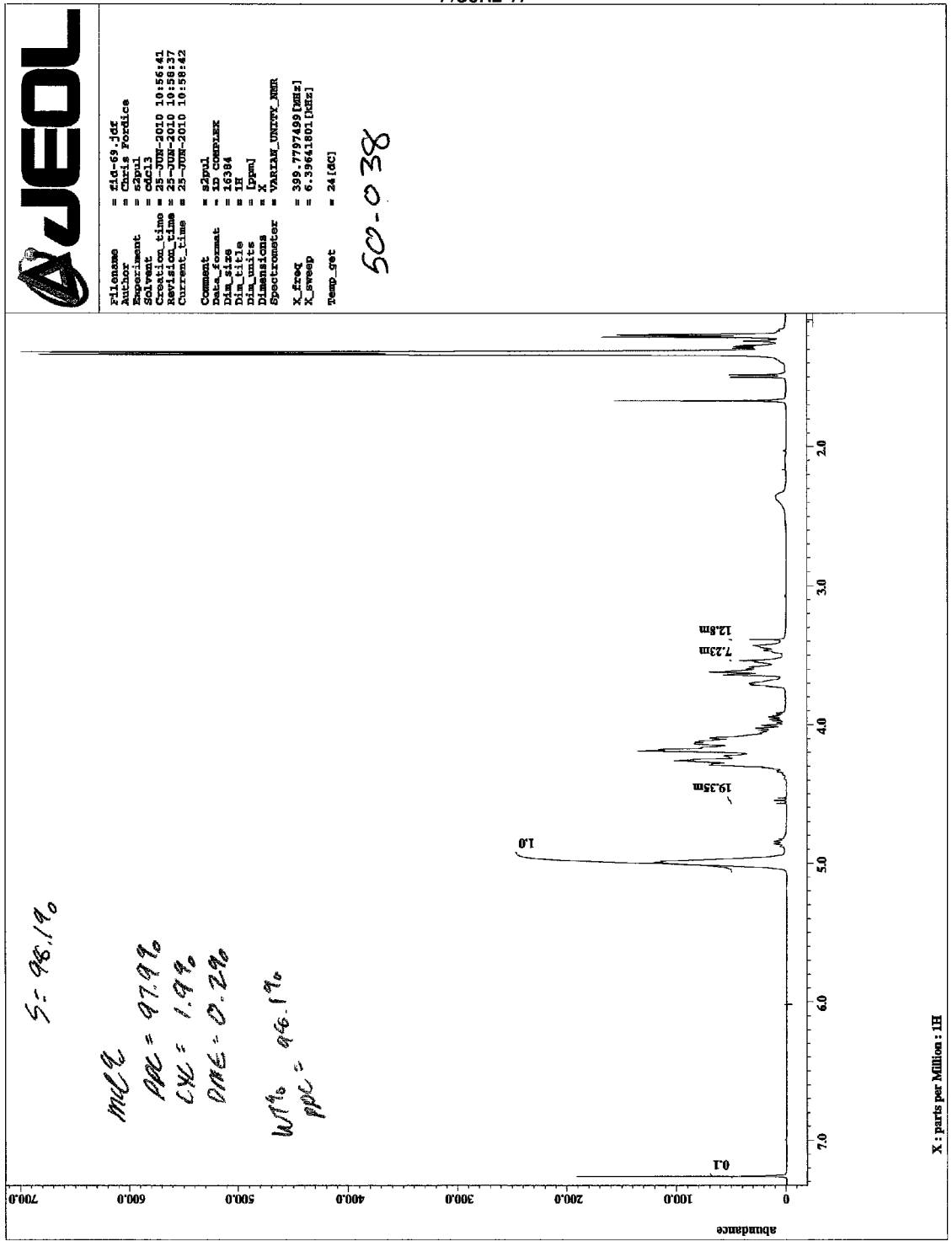
FIG. 41 shows a proton NMR spectrum of polyol PC-11
Figure 42:
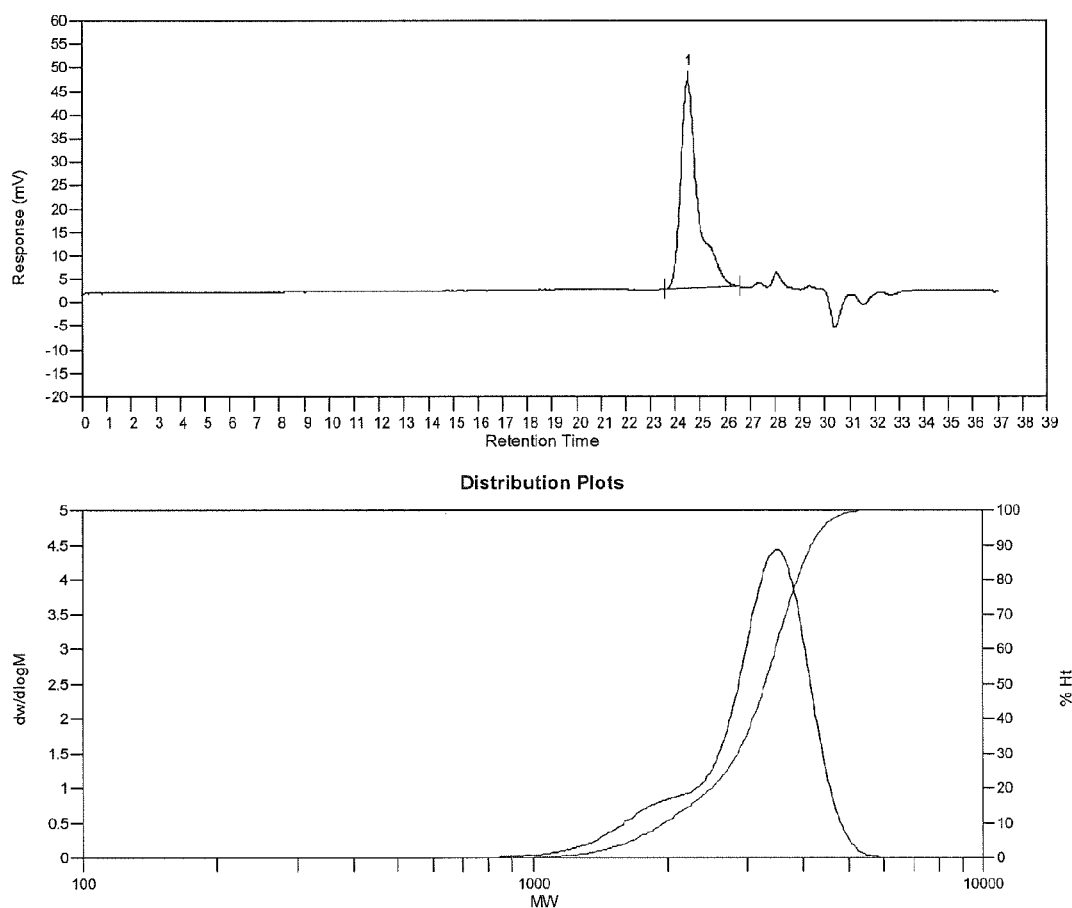
FIG. 42 shows a GPC trace of polyol PC-11
Figure 43:
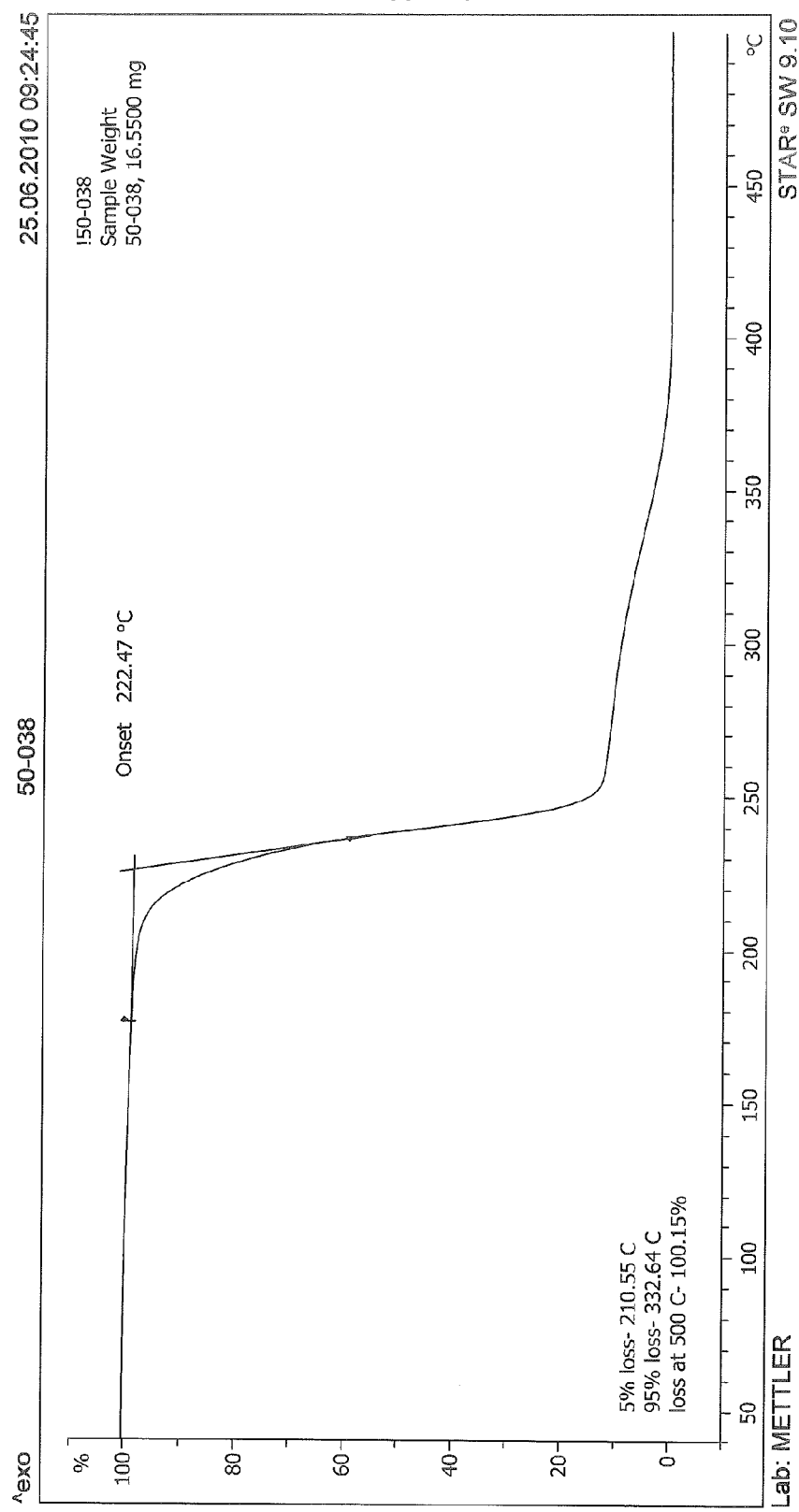
FIG. 43 shows a TGA of polyol PC-11
Figure 44:
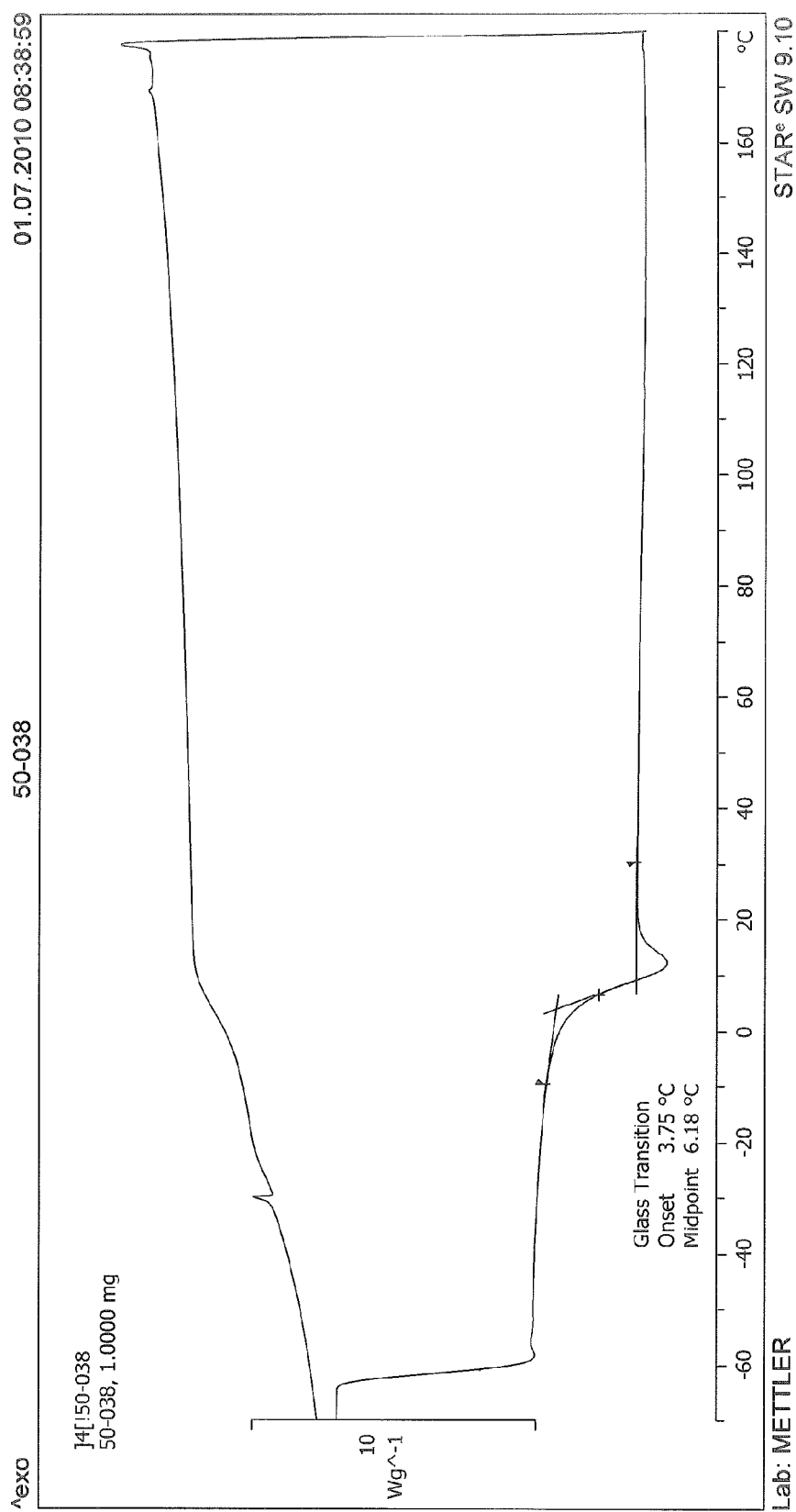
FIG. 44 shows a DSC trace of polyol PC-11
Figure 45:
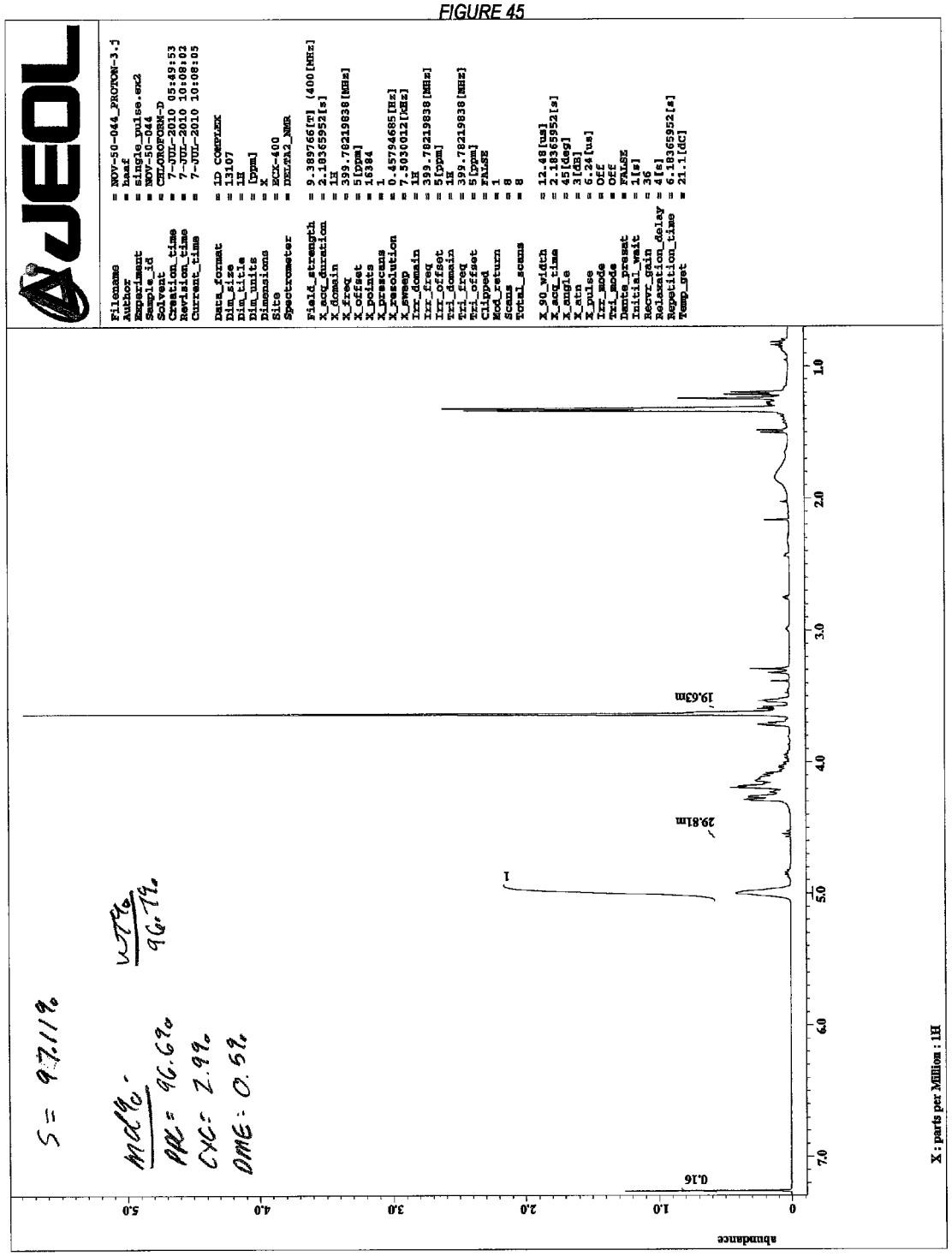
FIG. 45 shows a proton NMR spectrum of polyol PC-12
Figure 46:
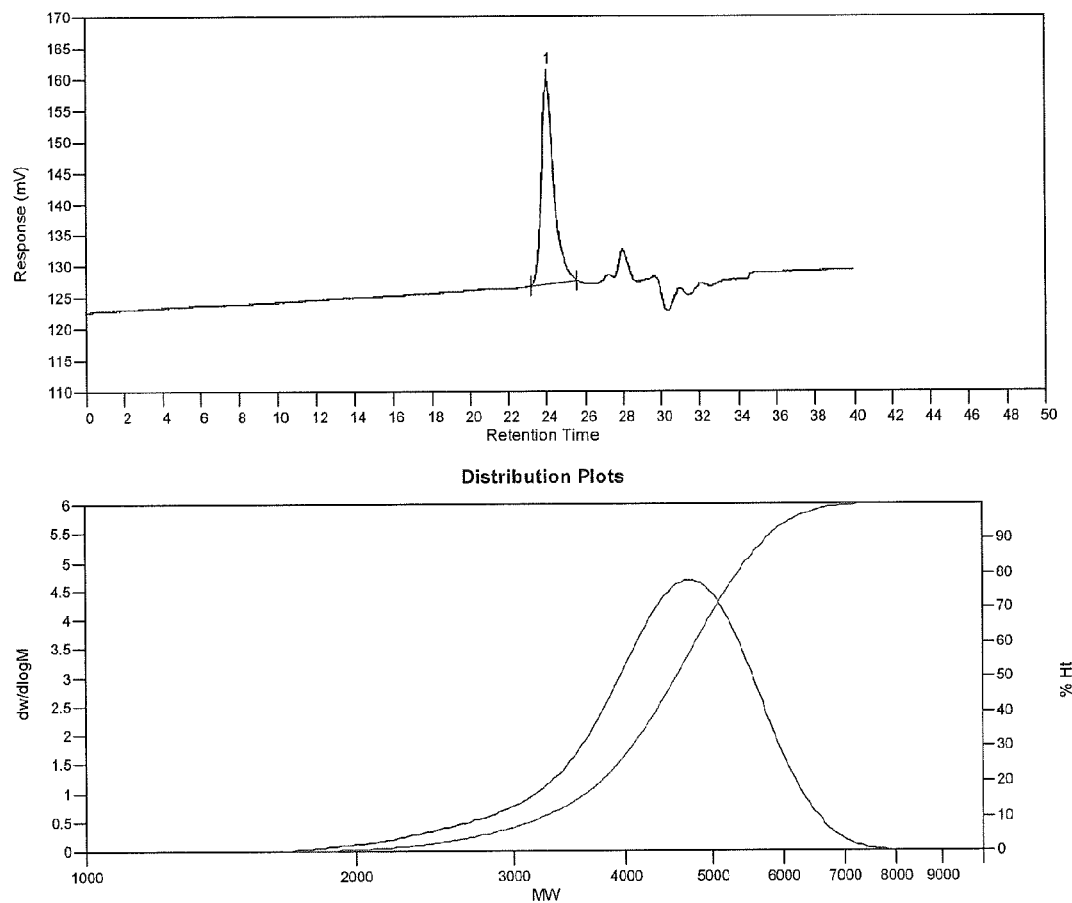
FIG. 46 shows a GPC trace of polyol PC-12
Figure 47:
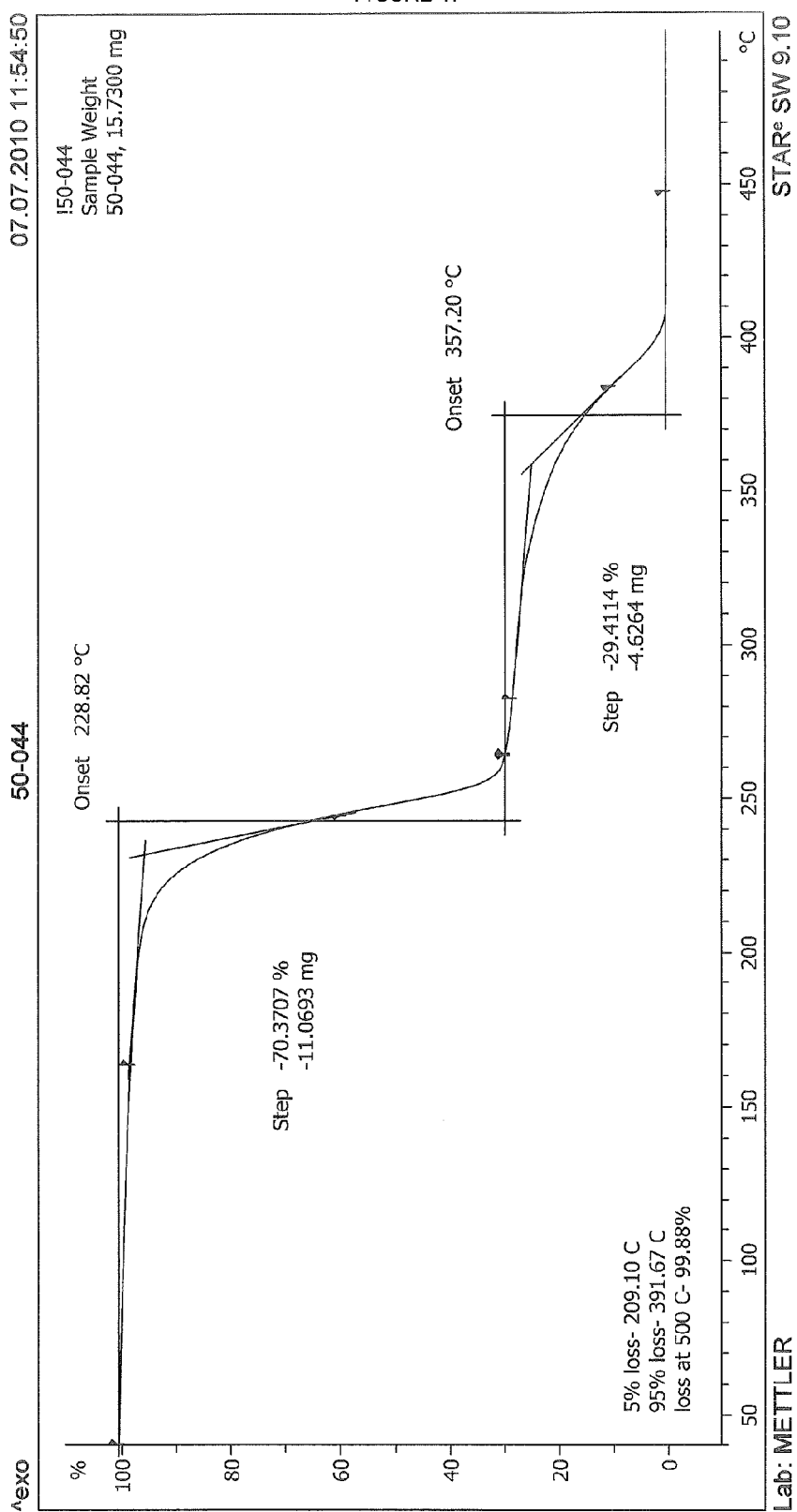
FIG. 47 shows a TGA of polyol PC-12
Figure 48:
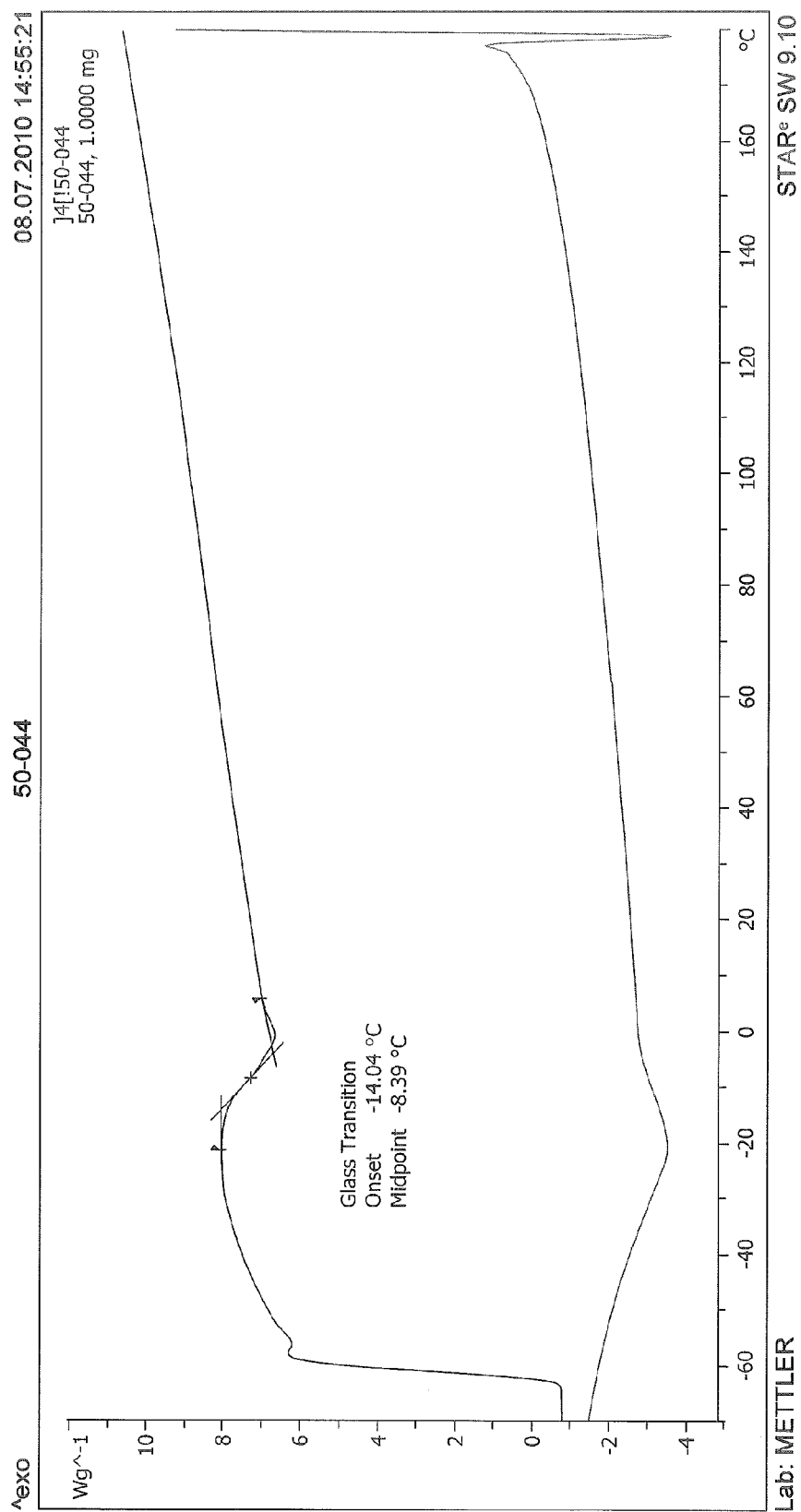
FIG. 48 shows a DSC trace of polyol PC-12
Figure 49:
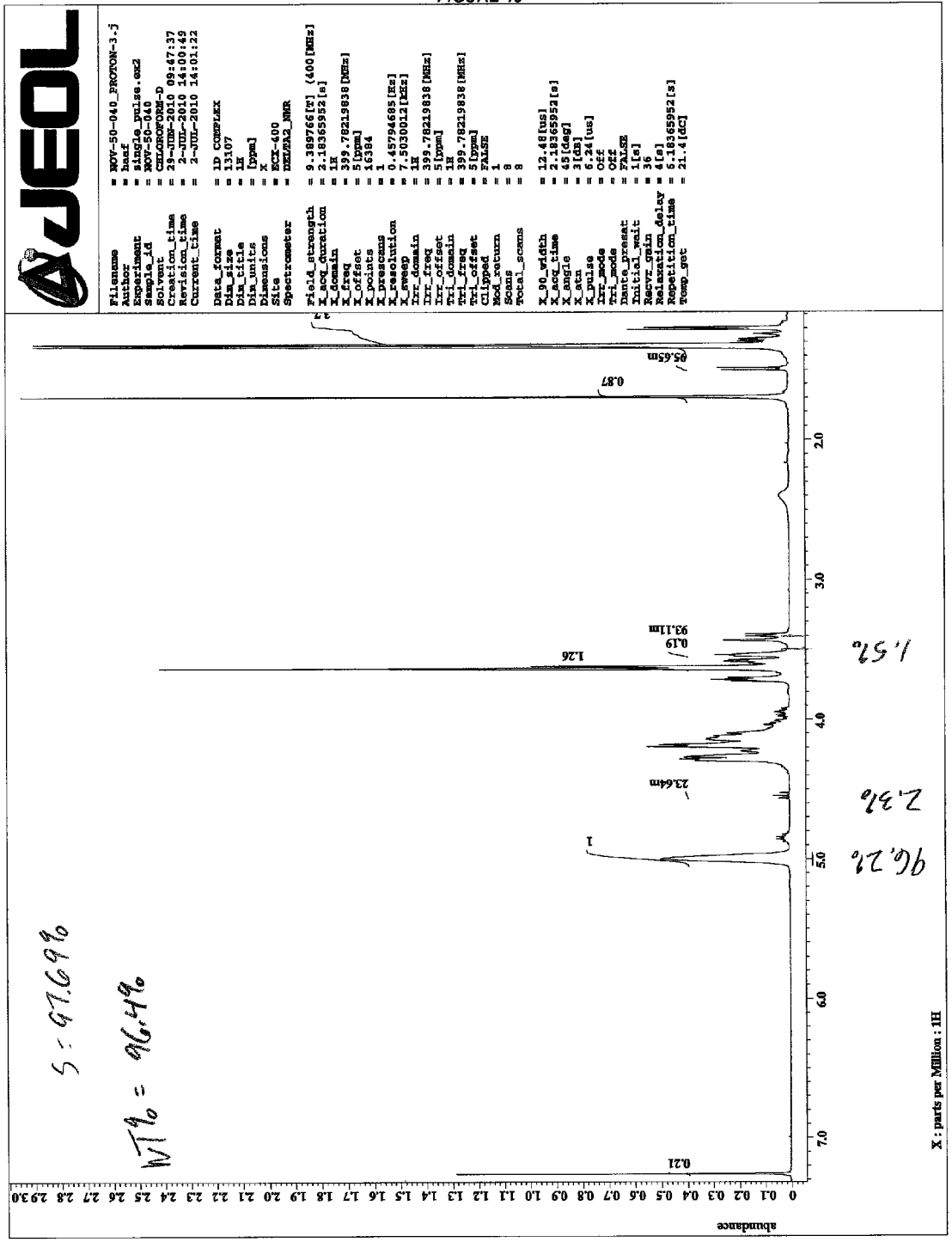
FIG. 49 shows a proton NMR spectrum of polyol PC-13
Figure 50:
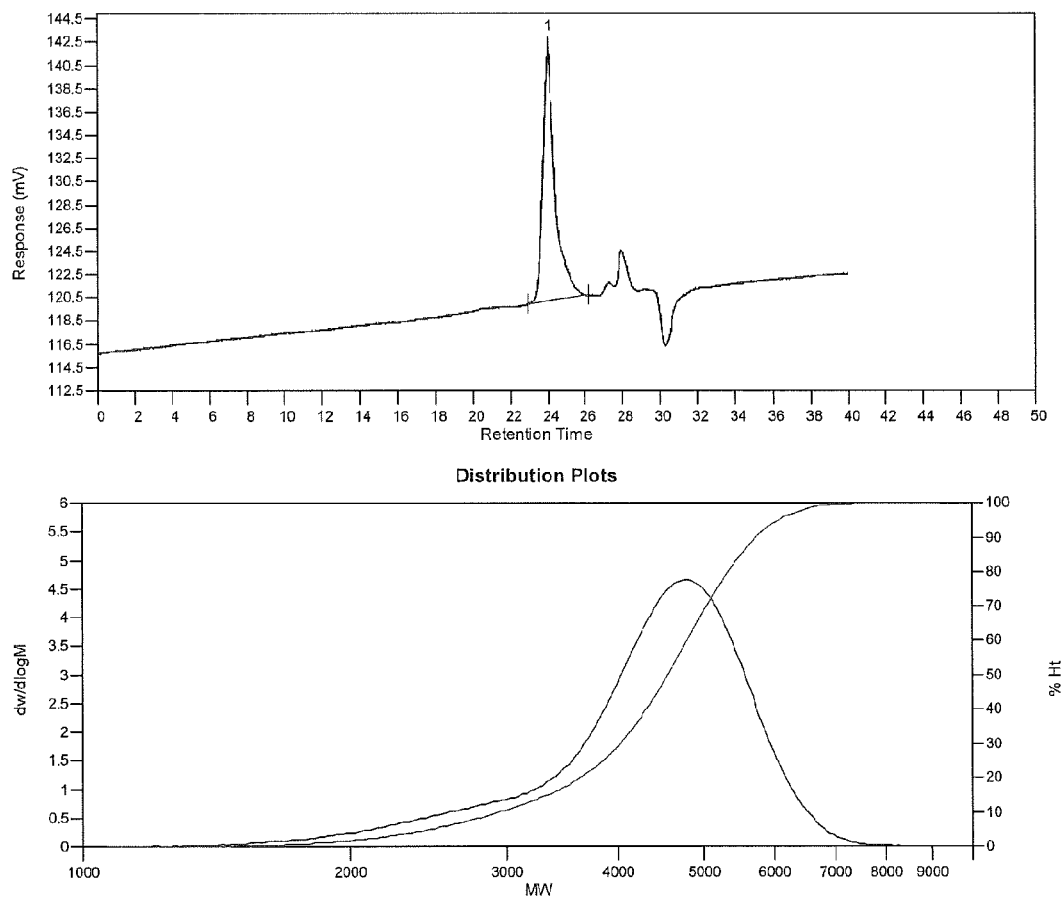
FIG. 50 shows a GPC trace of polyol PC-13
Figure 51:
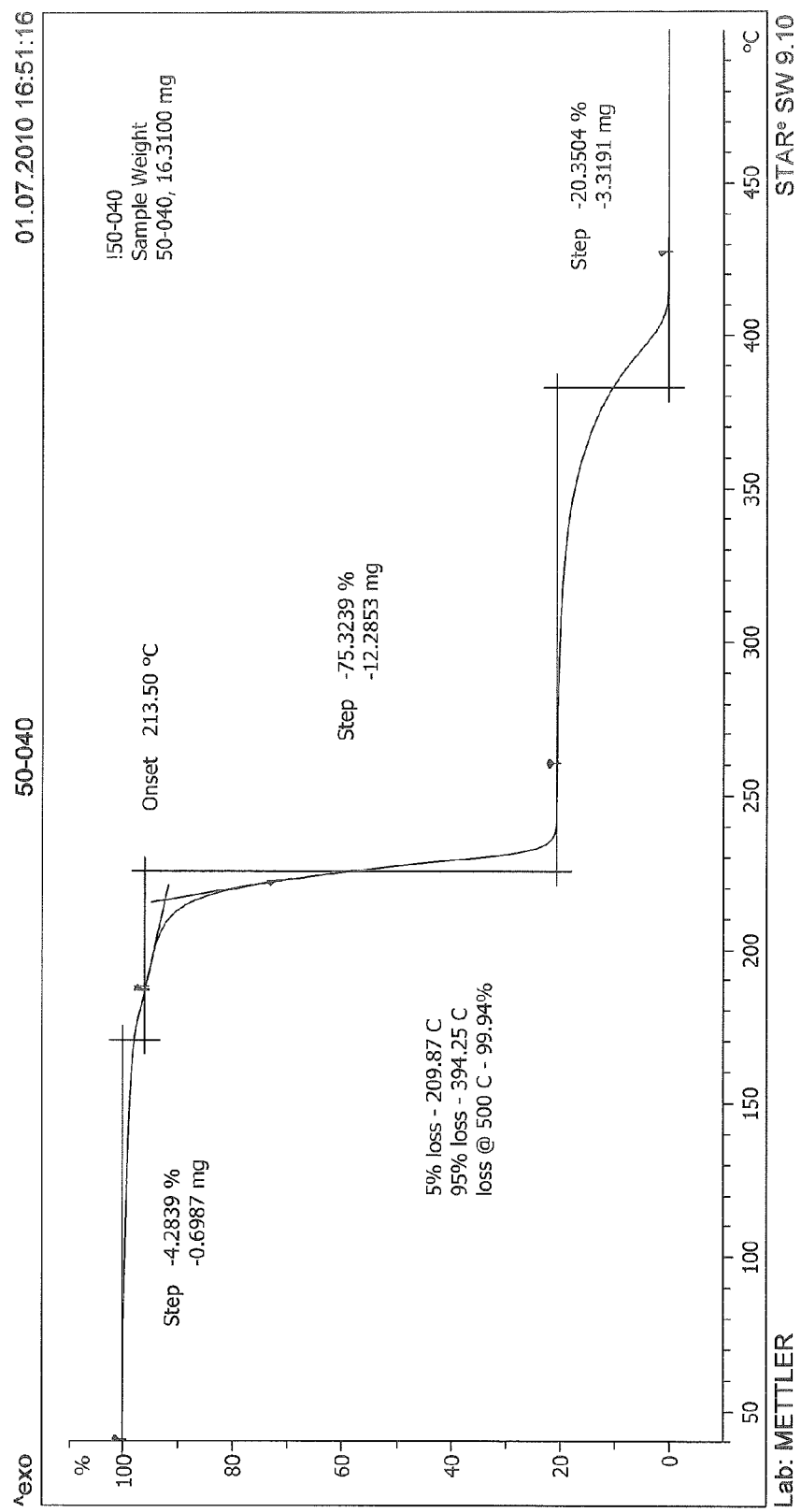
FIG. 51 shows a TGA of polyol PC-13
Figure 52:
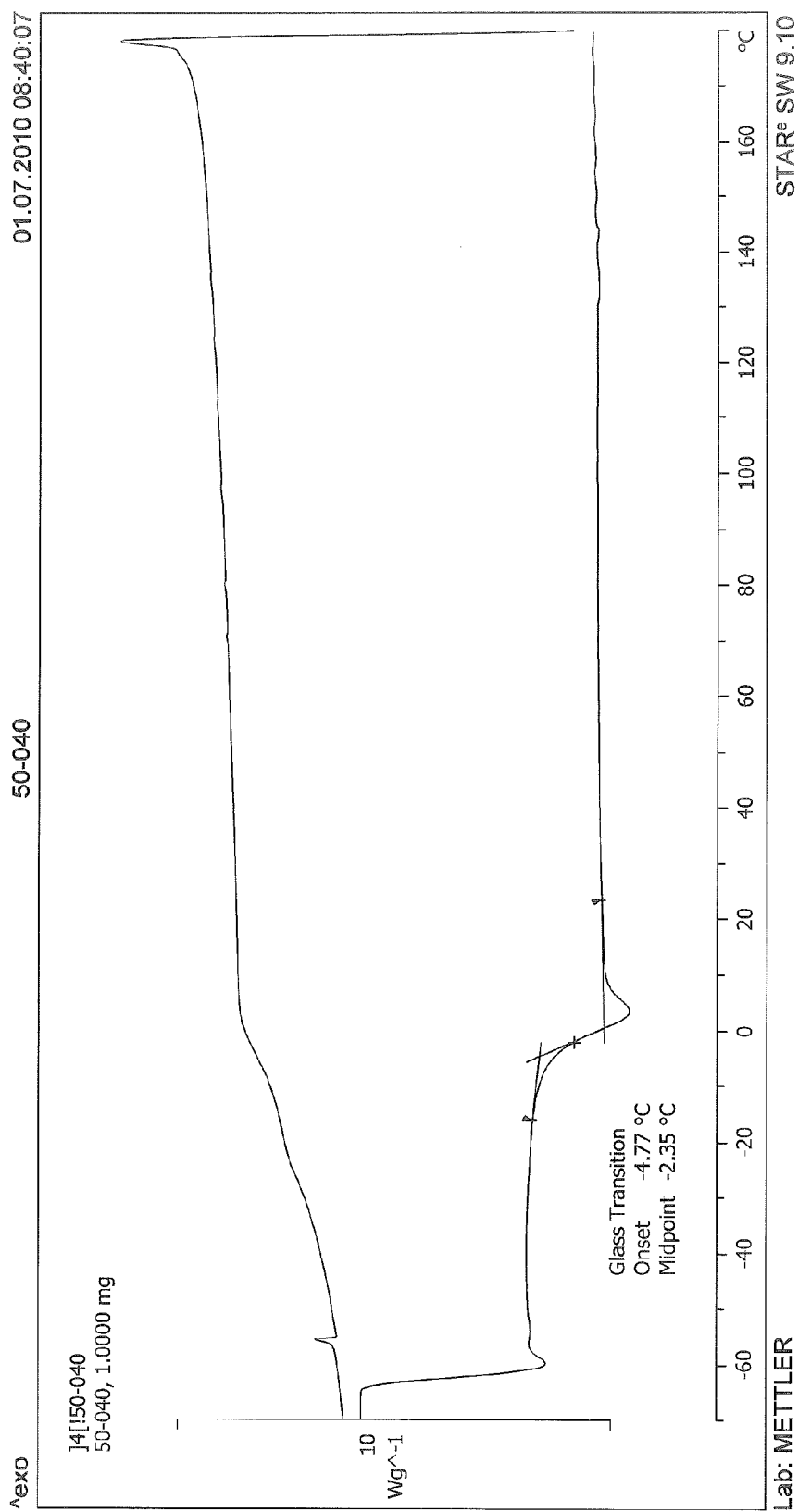
FIG. 52 shows a DSC trace of polyol PC-13
Figure 53:
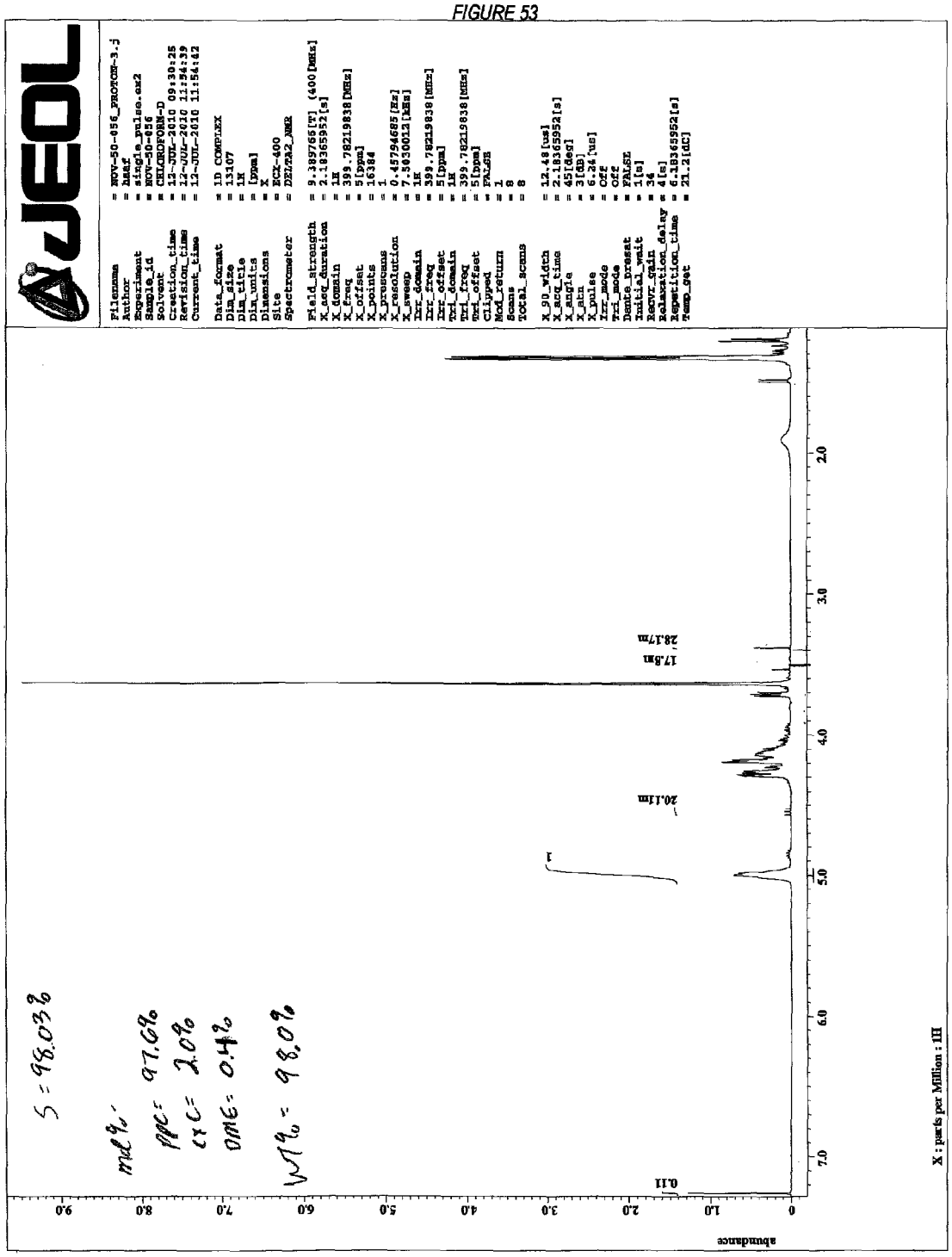
FIG. 53 shows a proton NMR spectrum of polyol PC-14
Figure 54:
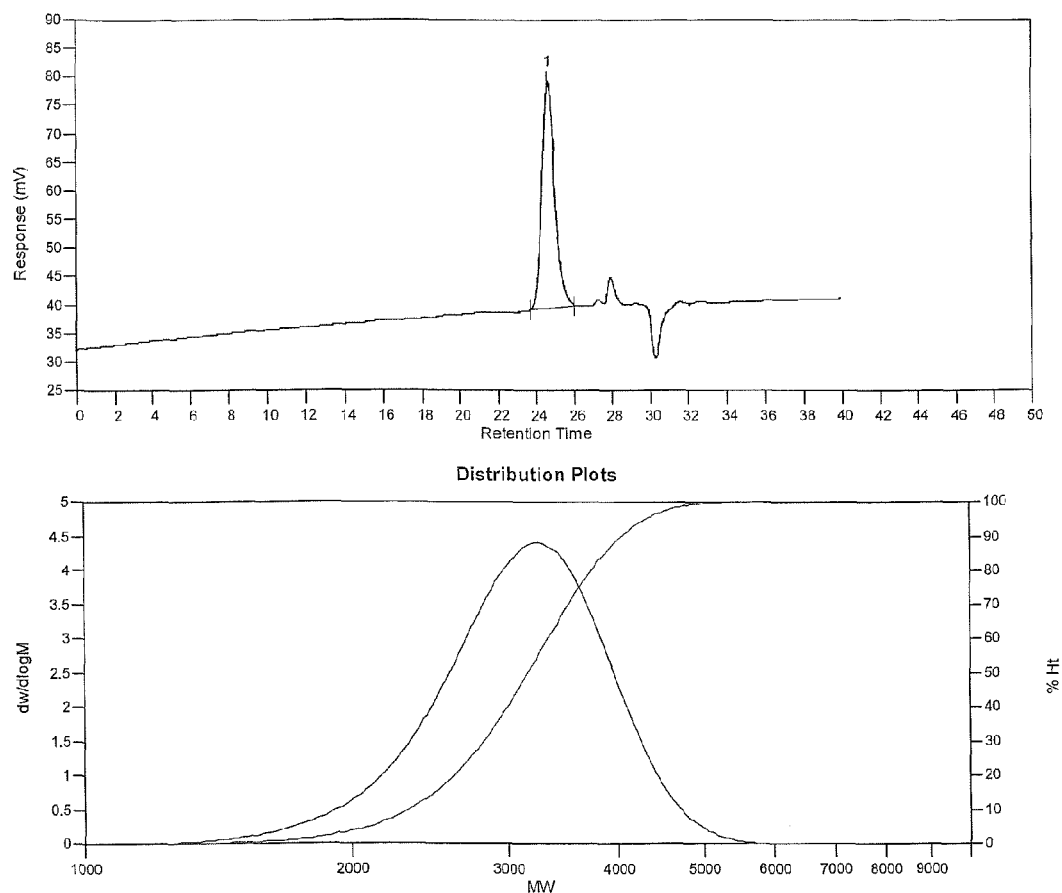
FIG. 54 shows a GPC trace of polyol PC-14
Figure 55:
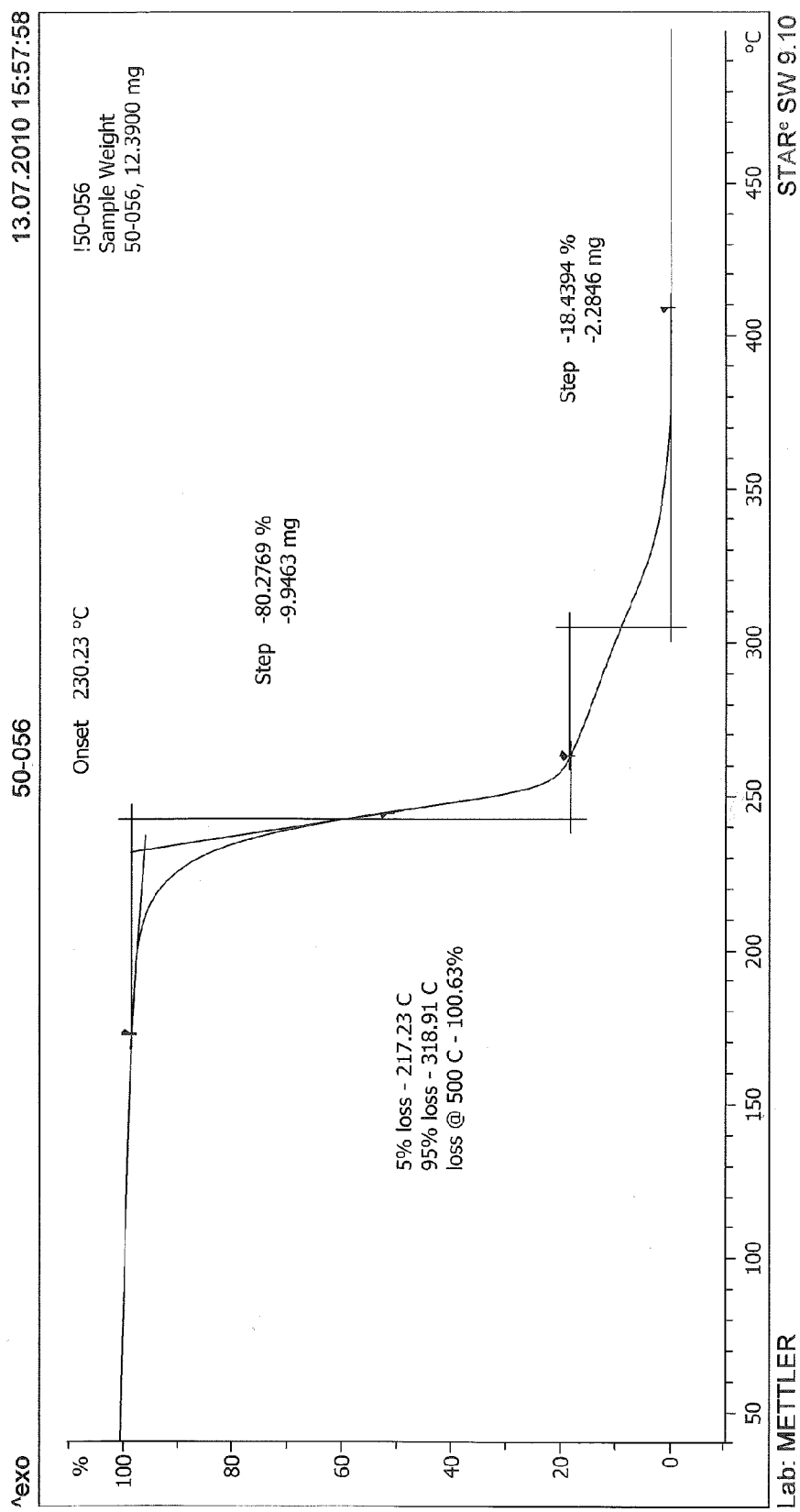
FIG. 55 shows a TGA of polyol PC-14

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of only one monomer species (e.g., polyethylene oxide). In certain embodiments, a polymer of the present invention is a copolymer, terpolymer, heteropolymer, block copolymer, or tapered heteropolymer of one or more epoxides.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring. In certain embodiments, the term "$C_{3-20}$ carbocycle" refers to a 3- to 8-membered saturated or partially unsaturated monocyclic carbocyclic ring, or a 7- to 20-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, iso-propyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight-or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "carbocycle" and "carbocyclic ring" as used herein, refer to monocyclic and polycyclic moieties wherein the rings contain only carbon atoms. Unless otherwise specified, carbocycles may be saturated, partially unsaturated or aromatic, and contain 3 to 20 carbon atoms. Representative carbocyles include cyclopropane, cyclobutane, cyclopentane, cyclohexane, bicyclo[2,2,1]heptane, norbornene, phenyl, cyclohexene, naphthalene, and spiro[4.5]decane, to name but a few.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring. In certain embodiments, the term "6- to 12-membered aryl" refers to a phenyl or an 8- to 12-membered polycyclic aryl ring. In certain embodiments, the term "$C_{6-14}$ aryl" refers to a phenyl or an 8- to 14-membered polycyclic aryl ring.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{2-5}$, straight or branched, saturated hydrocarbon chain", refers to bivalent alkylene chains that are straight or branched as defined herein.

The term "alkylene" refers to a bivalent alkyl group. An "alkylene chain" is a polymethylene group, i.e., —$(CH_2)_n$—, wherein n is a positive integer, preferably from 1 to 5, from 1 to 4, from 1 to 3, from 1 to 2, or from 2 to 3. A substituted alkylene chain is a polymethylene group in which one or more methylene hydrogen atoms are replaced with a substituent. Suitable substituents include those described below for a substituted aliphatic group.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π (pi) electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1, 4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 8-membered heterocycle" refers to a 3- to 8-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur. In some embodiments, the term "3- to 14-membered heterocycle" refers to a 3- to 8-membered saturated or partially unsaturated monocyclic heterocyclic ring having 1 to 2 heteroatoms independently selected from nitrogen, oxygen, or sulfur, or a 7- to 14-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —(CH$_2$)$_{0-4}$R$^°$; —(CH$_2$)$_{0-4}$OR$^°$; —O—(CH$_2$)$_{0-4}$C(O)OR$^°$; —(CH$_2$)$_{0-4}$CH(OR$^°$)$_2$; —(CH$_2$)$_{0-4}$SR$^°$; —(CH$_2$)$_{0-4}$Ph, which may be substituted with R$^°$; —(CH$_2$)$_{0-4}$O(CH$_2$)$_{0-1}$Ph which may be substituted with R$^°$; —CH═CHPh, which may be substituted with R$^°$; —NO$_2$; —CN; —N$_3$; —(CH$_2$)$_{0-4}$N(R$^°$)$_2$; —(CH$_2$)$_{0-4}$N(R$^°$)C(O)R$^°$; —N(R$^°$)C(S)R$^°$; —(CH$_2$)$_{0-4}$N(R$^°$)C(O)NR$^°{}_2$; —N(R$^°$)C(S)NR$^°{}_2$; —(CH$_2$)$_{0-4}$N(R$^°$)C(O)OR$^°$; —N(R$^°$)N(R$^°$)C(O)R$^°$; —N(R$^°$)N(R$^°$)C(O)NR$^°{}_2$; —N(R$^°$)N(R$^°$)C(O)OR$^°$; —(CH$_2$)$_{0-4}$C(O)R$^°$; —C(S)R$^°$; —(CH$_2$)$_{0-4}$C(O)OR$^°$; —(CH$_2$)$_{0-4}$C(O)N(R$^°$)$_2$; —(CH$_2$)$_{0-4}$C(O)SR$^°$; —(CH$_2$)$_{0-4}$C(O)OSiR$^°{}_3$; —(CH$_2$)$_{0-4}$OC(O)R$^°$; —OC(O)(CH$_2$)$_{0-4}$SR—, SC(S)SR$^°$; —(CH$_2$)$_{0-4}$SC(O)R$^°$; —(CH$_2$)$_{0-4}$C(O)NR$^°{}_2$; —C(S)NR$^°{}_2$; —C(S)SR$^°$; —SC(S)SR$^°$, —(CH$_2$)$_{0-4}$OC(O)NR$^°{}_2$; —C(O)N(OR$^°$)R$^°$; —C(O)C(O)R$^°$; —C(O)CH$_2$C(O)R$^°$; —C(NOR$^°$)R$^°$; —(CH$_2$)$_{0-4}$SSR$^°$; —(CH$_2$)$_{0-4}$S(O)$_2$R$^°$; —(CH$_2$)$_{0-4}$S(O)$_2$OR$^°$; —(CH$_2$)$_{0-4}$OS(O)$_2$R$^°$; —S(O)$_2$NR$^°{}_2$; —(CH$_2$)$_{0-4}$S(O)R$^°$; —N(R$^°$)S(O)$_2$NR$^°{}_2$; —N(R$^°$)S(O)$_2$R$^°$; —N(OR$^°$)R$^°$; —C(NH)NR$^°{}_2$; —P(O)$_2$R$^°$; —P(O)R$^°{}_2$; —OP(O)R$^°{}_2$; —OP(O)(OR$^°$)$_2$; SiR$^°{}_3$; —(C$_{1-4}$ straight or branched alkylene)O—N(R$^°$)$_2$; or —(C$_{1-4}$ straight or branched)alkylene)C(O)O—N(R$^°$)$_2$, wherein each R$^°$ may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R$^°$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R$^°$ (or the ring formed by taking two independent occurrences of R$^°$ together with their intervening atoms), are independently halogen, —(CH$_2$)$_{0-2}$R$^•$, -(haloR$^•$), —(CH$_2$)$_{0-2}$OH, —(CH$_2$)$_{0-2}$OR$^•$, —(CH$_2$)$_{0-2}$CH(OR$^•$)$_2$; —O(haloR$^•$), —CN, —N$_3$, —(CH$_2$)$_{0-2}$C(O)R$^•$, —(CH$_2$)$_{0-2}$C(O)OH, —(CH$_2$)$_{0-2}$C(O)OR$^•$, —(CH$_2$)$_{0-4}$C(O)N(R$^°$)$_2$; —(CH$_2$)$_{0-2}$SR$^•$, —(CH$_2$)$_{0-2}$SH, —(CH$_2$)$_{0-2}$NH$_2$, —(CH$_2$)$_{0-2}$NHR$^•$, —(CH$_2$)$_{0-2}$NR$^•{}_2$, —NO$_2$, —SiR$^•{}_3$, —OSiR$^•{}_3$, —C(O)SR$^•$, —(C$_{1-4}$ straight or branched alkylene)C(O)OR$^•$, or —SSR$^•$ wherein each R$^•$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^°$ include ═O and ═S.

Suitable divalent substituents on a saturated carbon atom of an "optionally substituted" group include the following: ═O, ═S, ═NNR*$_2$, ═NNHC(O)R*, ═NNHC(O)OR*, ═NNHS(O)$_2$R*, ═NR*, ═NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^•$, -(haloR$^•$), —OH, —OR$^•$, —O(haloR$^•$), —CN, —C(O)OH, —C(O)OR$^•$, —NH$_2$, —NHR$^•$, —NR$^•{}_2$, or —NO$_2$, wherein each R$^•$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^†$, —NR$^†{}_2$, —C(O)R$^†$, —C(O)OR$^†$, —C(O)C(O)R$^†$, —C(O)CH$_2$C(O)R$^†$, —S(O)$_2$R$^†$, —S(O)$_2$NR$^†{}_2$, —C(S)NR$^†{}_2$, —C(NH)NR$^†{}_2$, or —N(R$^†$)S(O)$_2$R$^†$; wherein each R$^†$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R$^•$, -(haloR$^•$), —OH, —OR$^•$, —O(haloR$^•$), —CN, —C(O)OH, —C(O)OR$^•$, —NH$_2$, —NHR$^•$, —NR$^•{}_2$, or —NO$_2$, wherein each R$^•$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the term "catalyst" refers to a substance the presence of which increases the rate and/or extent of a chemical reaction, while not being consumed or undergoing a permanent chemical change itself. It is to be understood that the term catalyst as used herein also encompasses substances which, on addition to a chemical reaction undergo a transformation to become an active catalytic species, it is generally understood in the art that the precise structure of the catalytic species is not always known with certainty and that many substances referred to as catalysts are, in fact, precatalysts.

As used herein, the term "Tg" refers to the glass transition temperature of a polymer. This is defined as the temperature at which the amorphous domains of the polymer take on the brittleness, stiffness, and rigidity characteristic of the glassy state. For polymers, this temperature is typically determined by performing differential scanning calorimetry (DSC) using methods well known in the art.

The term "improved properties" as used herein means the numerical value of the given property (in appropriate units as described herein) of the polymer and/or the composition of the present invention is >+8% of the numerical value of the known reference polymer and/or composition described herein, more preferably >+10%, even more preferably >+12%, most preferably >+15%.

The term "comparable properties" as used herein means the numerical value of the given property (in appropriate units as described herein) of the polymer and/or the composition of the present invention is within +/−6% of the numerical value of the known reference polymer and/or the composition described herein, more preferably +/−5%, most preferably +/−4%.

As used herein, the term "binder resin" means the polymeric or resinous component that combined with a crosslinker forms the binder component of the compositions of the invention.

DETAILED DESCRIPTION OF CERTAIN EMBODIMENTS

Polymer Compositions

The present invention provides polycarbonate polyol compositions and methods of using the same. Polycarbonate polyol compositions provided by the present invention exhibit improved performance in coatings applications including increased hardness, flexibility, corrosion resistance, outdoor durability, and combinations thereof. In particular, cured coatings using the provided polycarbonate compositions exhibit a range of protective properties including one or more of excellent hardness, flexibility, processability, resistance against solvent, stain, corrosion, or dirt pickup, hydrolytic stability against humidity or sterilization, and outdoor stability.

In certain embodiments, the present invention provides poly(propylene carbonate) (PPC) polyol compositions characterized in that the composition has:
  i. a glass transition temperature (Tg) from about −20° C. to about 30° C.;
  ii. a polydispersity index (PDI) less than 2; and
  iii. a Mn less than 15 kDa.

In some embodiments, a PPC polyol composition has a Tg from about −20° C. to about 50° C. or from about 0° C. to about 30° C. In some embodiments a PPC polyol composition has a Tg from about −20° C. to about 30° C. In some embodiments a polycarbonate polyol composition has a Tg from about 0° C. to about 50° C. or from about 10° C. to about 40° C. In some embodiments, a PPC polyol composition has a Tg from about −15° C. to about 30° C. In some embodiments, a PPC polyol composition has a Tg from about −20° C. to about 25° C. In some embodiments, a PPC polyol composition has a Tg from about −15° C. to about 30° C. In some embodiments, a PPC polyol composition has a Tg from about −10° C. to about 30° C. In some embodiments, a PPC polyol composition has a Tg from about −10° C. to about 20° C. In some embodiments, a PPC polyol composition has a Tg from about −5° C. to about 25° C. In some embodiments, a PPC polyol composition has a Tg from about 5° C. to about 15° C.

In some embodiments, a PPC polyol composition has a PDI less than 1.8. In some embodiments, a PPC polyol composition has a PDI less than 1.7. In some embodiments, a PPC polyol composition has a PDI less than 1.6. In some embodiments, a PPC polyol composition has a PDI less than 1.5. In some embodiments, a PPC polyol composition has a PDI less than 1.4. In some embodiments, a PPC polyol composition has a PDI less than 1.3. In some embodiments, a PPC polyol composition has a PDI less than 1.2. In some embodiments, a PPC polyol composition has a PDI less than 1.1. In some embodiments, a PPC polyol composition has a PDI less than 1.05. In some embodiments, a PPC polyol composition has a PDI about 1.0.

In certain embodiments, a PPC polyol composition has a Mn less than 15 kDa. In certain embodiments, a PPC polyol composition has a Mn less than 10 kDa. embodiments, a PPC polyol composition has a Mn less than 5 kDa. In certain embodiments, a PPC polyol composition has a Mn of about 3 kDa. In certain embodiments, a PPC polyol composition has a Mn of about 4 kDa. In certain embodiments, a PPC polyol composition has a Mn of about 6 kDa. In certain embodiments, a PPC polyol composition has a Mn in the range from about 2.5 kDa to about 10 kDa. In certain embodiments, a PPC polyol composition has a Mn in the range from about 2.5 kDa to about 6 kDa. In certain embodiments, a PPC polyol composition has a Mn in the range from about 2.5 kDa to about 4 kDa.

In certain embodiments, a PPC polyol composition has a weight average molecular weight (Mw) of less than or equal to 100 kilodaltons. In certain embodiments, a PPC polyol composition has a weight average molecular weight (Mw) of less than or equal 50 kilodaltons. In some embodiments, a PPC polyol composition has a Mw of from 500 to 50,000 daltons. In some embodiments, a PPC polyol composition has a Mw of from 500 to 25,000 daltons. Where the PPC polyol composition is to be applied to metal surfaces (e.g. cans or coils) then in some embodiments, the PPC polyol has a Mw from 2000 to 10000 daltons. Where the PPC polyol composition is to be used in a 2C system then in some embodiments, the polymer Mw is from 1000 to 5000 daltons.

In certain embodiments, a PPC polyol composition has a Mn of less than or equal to 100 kilodaltons. In certain embodiments, a PPC polyol composition has a Mn of less than or equal 50 kilodaltons. In some embodiments, a PPC polyol composition has a Mn of from 500 to 50,000 daltons. In some embodiments, a PPC polyol composition has a Mn of from 500 to 25,000 daltons. Where the PPC polyol composition is to be applied to metal surfaces (e.g. cans or coils) then in some embodiments, the PPC polyol has a Mn from 2000 to 10000 daltons. Where the PPC polyol composition is to be used in a 2C system then in some embodiments, the polymer Mn is from 1000 to 5000 daltons.

In some embodiments, a PPC polyol composition has a Tg from about −15° C. to about 30° C., a PDI less than 1.2, and a Mn less than 15 kDa. In some embodiments, a PPC polyol composition has a Tg from about −10° C. to about 30° C., a PDI less than 1.1, and a Mn less than 15 kDa. In some embodiments, a PPC polyol composition has a Tg from about −10° C. to about 30° C., a PDI less than 1.1, and a Mn less than 10 kDa. In some embodiments, a PPC polyol composition has a Tg from about −10° C. to about 30° C., a PDI less than 1.1, and a Mn less than 5 kDa. In some embodiments, a PPC polyol composition has a Tg from about −10° C. to about 30° C., a PDI less than 1.1, and a Mn of about 3 kDa.

In certain embodiments, provided PPC polyol compositions comprise polymer chains denoted $P^1$ having the formula T-Y-A-(Y-T)$_n$ wherein:
each T is a polycarbonate chain having a formula independently selected from the group consisting of:

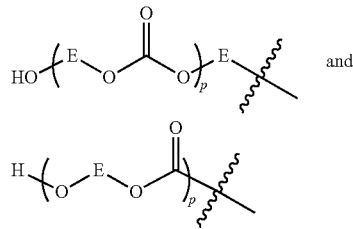

wherein:
E is a $C_3$ unit derived from propylene oxide;
p ranges from about 5 to about 75;
each Y group is independently the bound form of a functional group capable of initiating chain growth of epoxide CO₂ copolymers, optionally comprising one or multiple repeating units of a bivalent $C_{2-5}$, straight or branched, saturated hydrocarbon chain, wherein one methylene unit of each hydrocarbon group is replaced with —O—;

-A- is a covalent bond, a heteroatom, or a multivalent moiety; and n is from 1 to 10 inclusive.

In certain embodiments, each Y group comprises one or multiple repeating groups of a $C_{1-4}$ ether moiety. In certain embodiments, each Y group comprises one or multiple repeating groups of a $C_2$ ether moiety. In certain embodiments, each Y group comprises one or multiple repeating groups of a $C_3$ ether moiety.

In certain embodiments, each Y group is or comprises one or multiple repeating units of ethylene glycol. In certain embodiments, each Y group is or comprises one or multiple repeating units of propylene glycol.

In certain embodiments, E is —CH(CH₃)CH₂—. In certain embodiments, E is —CH₂CH(CH₃)—. The regiochemical orientation of E units is reflected by the polycarbonate head-to-tail ratio, as described in further detail below.

In some embodiments, p is from about 5 to about 25. In some embodiments, p is from about 5 to about 50. In some embodiments, p is from about 5 to about 30. In some embodiments, p is from about 5 to about 20. In some embodiments, p is from about 20 to about 75.

In certain embodiments, -A- is a covalent bond. In some embodiments, -A- is oxygen. In some embodiments, -A- is nitrogen. In some embodiments, -A- is sulfur. In other embodiments, -A- is phosphorus.

In some embodiments, -A- is a multivalent moiety. In some embodiments, -A- is a multivalent $C_{1-10}$ straight or branched, saturated or unsaturated, optionally substituted aliphatic moiety. In some embodiments, -A- is a multivalent $C_{1-10}$ aliphatic moiety substituted with two or more groups selected from the group consisting of —O—, —NR$^y$—, —S—, and —C(O)—, wherein R$^y$ is as described herein. In some embodiments, -A- is a multivalent $C_{1-10}$ aliphatic moiety substituted with three or more groups selected from the group consisting of —O—, —NR$^y$—, —S—, and —C(O)—, wherein R$^y$ is as described herein. In some embodiments, -A- is a multivalent straight or branched, saturated or unsaturated, optionally substituted moiety with a molecular weight Mn in between 500 and 3000 Daltons. In some embodiments, A is a $C_{1-10}$ alkylene diol. In some embodiments, A is dipropylene glycol, butane diol, hexane diol, propylene glycol, 3-methylene propane (TMP), penta erythirol, or dipenta erythirol. In some embodiments, A is a polyester.

In some embodiments, n is 1. In some embodiments, n is 2. In some embodiments, n is 3. In some embodiments, n is 4. In some embodiments, n is 5. In some embodiments, n is 6. In some embodiments, n is 7. In some embodiments, n is 8. In some embodiments, n is 9. In some embodiments, n is 10.

In certain embodiments, provided PPC polyol compositions comprise polymer chains denoted $P^1$ having the formula $T-Y_x-A(Y_x-T)_n$ wherein:

each -T is a polycarbonate chain having a formula independently selected from the group consisting of:

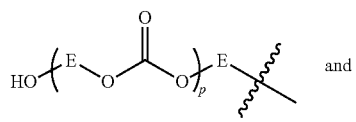 and

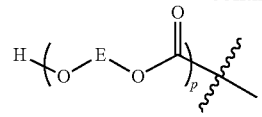

wherein:

E is a $C_3$ unit derived from propylene oxide; p ranges from about 5 to about 75; each Y group is independently a functional group capable of initiating chain growth of epoxide CO₂ copolymers; -A- is a covalent bond, a heteroatom, or a multivalent moiety;

x is from 0 to 10; and n is from 1 to 10 inclusive.

In certain embodiments, each Y group is or comprises one or more divalent $C_{1-4}$alkyleneoxy groups. In certain embodiments, each Y group is or comprises one or more repeating units of ethylene glycol or propylene glycol.

In some embodiments, the $P^1$ polymer chains have the formula:

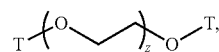

wherein z is from 1 to 10 inclusive.

In certain embodiments, z is from 2 to 10 inclusive. In some embodiments, z is 2. In some embodiments, z is, on average in the composition, about 2. In some embodiments, z is 3. In some embodiments, z is, on average in the composition, about 3. In some embodiments, z is 4. In some embodiments, z is, on average in the composition, about 4. In some embodiments, z is from 5 to 10 inclusive.

In certain embodiments, the Y group is defined by the number average molecular weight (Mn) of an unbound chain transfer agent, as described below. In certain embodiments, compositions comprising $P^1$ polymer chains contain a mixture of chains where the values of z in individual chains vary. In certain embodiments z is, on average in the composition, from about 2 to about 10. In some embodiments, z is, on average in the composition, about 2. In some embodiments, z is, on average in the composition, about 3. In some embodiments, z is, on average in the composition, about 4.

In certain embodiments, the $P^1$ polymer chains have the formula:

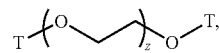

wherein the repeating units of ethylene glycol corresponds to PEG 400.

In some embodiments, n is from 2 to 10, inclusive, and -A- is a multivalent moiety. In some embodiments, n is from 2 to 6, inclusive, and -A- is a multivalent moiety. In some embodiments, n is from 2 to 4, inclusive, and -A- is a multivalent moiety.

In certain embodiments, the —Y-A-(Y—)$_n$ moiety of $P^1$ polymer chains is derived from a polyol having two, three, four, five, or six hydroxyl groups. In certain embodiments, the —Y-A-(Y—)$_n$ moiety of $P^1$ polymer chains is derived from a polyol having two, three, four, five, or six hydroxyl groups, and each Y group comprises one more repeating units of ethylene glycol. In certain embodiments, the —Y$_x$-A(Y$_x$—)$_n$ moiety of $P^1$ polymer chains is derived from a polyester having two, three, four, five, or six hydroxyl groups.

In certain embodiments, $P^1$ polymer chains have the formula:

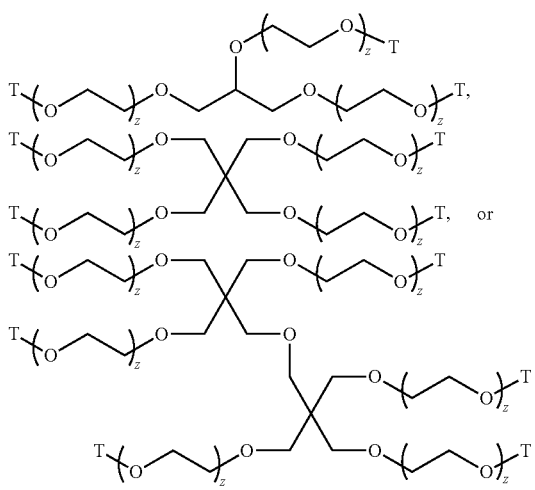

wherein z is, independently at each occurrence, from 1 to 10 inclusive.

Without wishing to be bound by any particular theory, it appears that when n is 3 or more, the presence of a repeating ethylene glycol or propylene glycol unit is useful to reduce steric crowding. Polycarbonate polyols comprising such ethyoxylated or propoxylated Y groups are highly compatible with crosslinking chemistries and procedures using polycarbonate resins.

In certain embodiments, each Y group comprises one or more repeating units of propylene glycol. In certain embodiments, each Y group comprises one repeating unit of propylene glycol. In certain embodiments, the $P^1$ polymer chains have the formula:

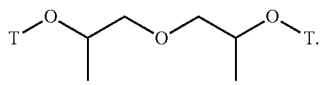

In some embodiments, the present invention encompasses propylene oxide $CO_2$ copolymers with a number average molecular weight (Mn) between about 400 g/mol and about 15,000 g/mol characterized in that the polymer chains have a carbonate content of >90%, and at least 95% of the end groups are hydroxyl groups.

In some embodiments, the present invention encompasses polyol compostions comprising propylene oxide-$CO_2$ copolymers as a further component to the polyol where the copolymer has a number average molecular weight (Mn) between about 400 g/mol and about 15,000 g/mol, characterized in that the polymer chains of the copolymer have a carbonate content of >90%, and end groups reactive with hydroxyl groups. In some embodiments, such OH reactive end groups are selected from amide and/or carboxy groups. In some embodiments, such OH reactive end groups are carboxy groups. In certain embodiments, OH reactive end groups comprise less than 50%, or less than 30% of the total end groups.

In certain embodiments, the carbonate linkage content of the polycarbonate chains of the present invention is at least 90%. In some embodiments greater than 92% of linkages are carbonate linkages. In certain embodiments, at least 95% of linkages are carbonate linkages. In certain embodiments, at least 97% of linkages are carbonate linkages. In some embodiments, greater than 98% of linkages are carbonate linkages in some embodiments at least 99% of linkages are carbonate linkages. In some embodiments, essentially all of the linkages are carbonate linkages (i.e. there are essentially only carbonate linkages detectable by typical methods such as $^1H$ or $^{13}C$ NMR spectroscopy).

In certain embodiments, the ether linkage content of the polycarbonate chains of the present invention is less than 10%. In some embodiments, less than 8% of linkages are ether linkages. In certain embodiments, less than 5% of linkages are ether linkages. In certain embodiments, no more than 3% of linkages are ether linkages. In some embodiments, fewer than 2% of linkages are ether linkages in some embodiments less than 1% of linkages are ether linkages. In some embodiments essentially none of the linkages are ether linkages (i.e. there are essentially no ether bonds detectable by typical methods such as $^1H$ or $^{13}C$ NMR spectroscopy).

In certain embodiments, polymer chains may contain embedded polymerization initiators or may be a block-copolymer with a non-polycarbonate segment. In certain examples of these embodiments, the stated total carbonate content of the polymer chain may be lower than the stated carbonate content limitations described above. In these cases, the carbonate content refers only to the epoxide $CO_2$ copolymeric portions of the polymer composition. In other words, a composition of the present invention may contain a polyester, polyether or polyether-polycarbonate moiety embedded within or appended to the polyol component (such as a polyether portion of a —Y— group). In some embodiments, the non-carbonate linkages in such moieties are not included in the carbonate and ether linkage limitations described above.

In certain embodiments, propylene oxide can be incorporated into the growing polymer chain in different orientations. The regiochemistry of the enchainment of adjacent monomers in such cases is characterized by the head-to-tail ratio of the composition. As used herein the term "head-to-tail" refers to the regiochemistry of the enchainment of a substituted epoxide in the polymer chain as shown in the figure below for propylene oxide:

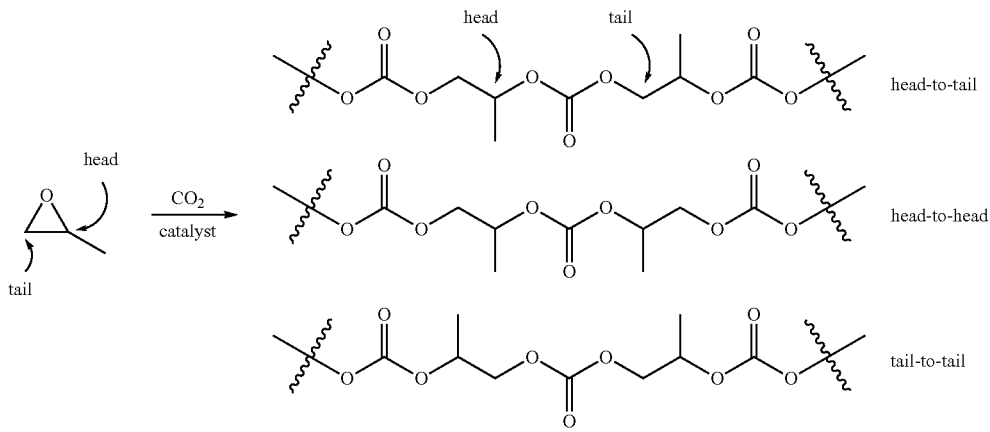

In certain embodiments, a provided polycarbonate polyol composition is characterized in that, on average, more than about 80% of linkages between adjacent epoxide monomer units are head-to-tail linkages. In certain embodiments, on average, more than 85% of linkages between adjacent epoxide monomer units are head-to-tail linkages. In certain embodiments, on average, more than 90% of linkages between adjacent epoxide monomer units are head-to-tail linkages. In certain embodiments, more than 95% of linkages between adjacent epoxide monomer units are head-to-tail linkages. In certain embodiments, more than 99% of linkages between adjacent epoxide monomer units are head-to-tail linkages.

In certain embodiments, provided polycarbonate polyol compositions are characterized in that the content (by weight) of cyclic propylene carbonate is less than about 5%. In certain embodiments, provided polycarbonate polyol compositions are characterized in that the content of cyclic propylene carbonate is less than about 3%. In certain embodiments, provided polycarbonate polyol compositions are characterized in that the content of cyclic propylene carbonate is less than about 2%. In certain embodiments, provided polycarbonate polyol compositions are characterized in that the content of cyclic propylene carbonate is less than about 1%. In certain embodiments, cyclic carbonate is produced as a by-product in amounts of less than about 1%. In certain embodiments, provided polycarbonate polyol compositions are characterized in that they contain essentially no cyclic carbonate (e.g., as detectable by $^1$H-NMR and/or liquid chromatography (LC)). It will be appreciated that the terms "cyclic propylene carbonate" and "propylene carbonate" may be used interchangeably.

The aliphatic polycarbonate compositions of the present invention include polymer chains derived from the chain transfer agents described hereinabove. In certain embodiments, these polymer chains are denoted $P^1$. In some embodiments, where the chain transfer agent has a formula Y-A-(Y)$_n$, as described above, polymer chains of type $P^1$ have the formula T-Y-A-(Y-T)$_n$, wherein Y, A, and n are as defined above, and each -T is an aliphatic polycarbonate chain covalently bound to a Y group, where -T is as defined above.

An additional category of $P^1$ chains may arise from water present in the reaction mixtures. In some circumstances, under polymerization conditions the water will ring-open an epoxide leading to formation of a glycol corresponding to one or more epoxides present in the reaction mixture. In certain embodiments, this glycol will lead to formation of chains of type $P^{1a}$ having the structure:

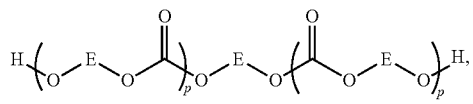

wherein -E- is an optionally substituted $C_3$ unit derived from propylene oxide, and p ranges from about 5 to about 75.

In some embodiments, each of these sources of chains $P^1$ may have a different structure and the compositions may include several types of $P^1$ chain (e.g., type $P^1$ derived from a chain transfer agent, type $P^{1'}$ derived from a polyfunctional initiating ligand present on the catalyst, and type $P^{1''}$ derived from polyfunctional anions present on a co-catalyst). In certain embodiments, the chain transfer agent, initiating ligand, and co-catalyst anions may have the same structure (or be ionic forms of the same structure). In these instances, the polymer compositions may comprise only one type of $P^1$ chain, or if water is present a mixture of a single type of $P^1$ chain along with some amount of $P^{1a}$. In certain embodiments, a glycol corresponding to an epoxide present in the reaction mixture may be used as a chain transfer agent in which case, polymer chains $P^1$ arising from the chain transfer agent and $P^{1a}$ arising from water will be indistinguishable. In certain other embodiments, water may be rigorously excluded from the polymerization mixture in which case chains of type $P^{1a}$ will be substantially absent.

Additionally, in certain embodiments polymer compositions of the present invention include polymer chains of type $P^2$. These chains have only one OH end group. Chains of type $P^2$ may arise from monofunctional initiating ligands present on the metal complexes or from monofunctional anions present on ionic co-catalysts. In certain cases, such chains may also arise from spurious sources such as alcohols or halide ions present as impurities in the reaction mixtures. In certain embodiments, chains of type $P^2$ have a formula selected from the group consisting of:

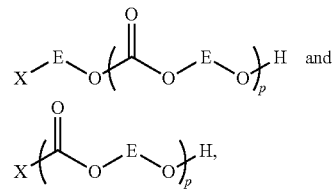

wherein:
X is a bound form of an anion capable of initiating one polymer chain;
E is an optionally substituted $C_3$ unit derived from propylene oxide, and
p ranges from about 5 to about 75.

In certain embodiments of polymer chains of type $P^2$, X comprises a halogen atom, an azide, an ester group, an ether group, or a sulfonic ester group.

In some embodiments, polymer compositions of the present invention are characterized in that at least 90% of the chains ends are —OH. In some embodiments, polymer compositions of the present invention are characterized in that at least 95% of the chains ends are —OH. In some embodiments, polymer compositions of the present invention are characterized in that at least 97% of the chains ends are —OH. In some embodiments, polymer compositions of the present invention are characterized in that at least 98% of the chains ends are —OH. In some embodiments, polymer compositions of the present invention are characterized in that at least 99% of the chains ends are —OH. In some embodiments, polymer compositions of the present invention are characterized in that they have from 2 to 10 or from 2 to 6 moles of hydroxy functional groups per mole of polymer.

In some embodiments, polymer compositions of the present invention have a hydroxy concentration (also denoted by [OH]) greater than or equal to 99% of the theoretical stoichiometric maximum.

In some embodiments, polymer compositions of the present invention have a concentration of free (i.e. unreacted) hydroxyl groups of ≥99.5% of the total amount of hydroxyl groups on the polymer. In some embodiments, polymer compositions of the present invention have a concentration of free (i.e. unreacted) hydroxyl groups of ≥99.7% of the total amount of hydroxyl groups on the polymer. In some embodiments, polymer compositions of the present invention have a concentration of free (i.e. unreacted) hydroxyl groups of about 100% of the total amount of hydroxyl groups on the polymer.

In some embodiments, polymers have a hydroxyl number of at least 10 mg KOH/g. Where polymers of the present invention are used in compositions suitable for application to metal surfaces (such as metal cans or coils) then in some embodiments polymers may have a hydroxyl number of from 30 to 50 mg KOH/g. Where polymers of the present invention are used in compositions suitable for application used for stoving (such as claddings, metal furniture, automotive OEM) then in some embodiments polymers may have a hydroxyl number of at least 50, preferably at least 100 mg KOH/g. Certain compositions of the invention may comprise components (such as combinations of certain polymers and certain cross-linkers) which readily react under ambient conditions and so the composition is not storage stable. Typically the components of such compositions are only mixed just before use (so called two component or 2C systems). Where the polymer is to be used in a 2C system, then conveniently the polymer may have a hydroxyl number of at least 50 or at least 100 mg KOH/g.

In some embodiments polymers of the invention are substantially free of aromatic moieties and/or cyclic moieties.

In certain embodiments, at least 90% of the chains in a polymer composition are of type $P^1$. In certain embodiments, the chains of type $P^1$ are essentially all the same. In other embodiments, there are two or more distinct types of $P^1$ chain present. In certain embodiments, there are several types of $P^1$ chains present, but at least 80% of the $P^1$ chains have one structure with lesser amounts of one or more $P^1$ chain types making up the remaining 20%.

In certain embodiments, polymer compositions of the present invention include more than 95% chains of type $P^1$. In other embodiments, polymer compositions of the present invention include more than 97% chains of type $P^1$. In certain embodiments, polymer compositions of the present invention include more than 99% chains of type $P^1$. It should be noted that in certain embodiments, polymer compositions of the present invention are characterized in that at least 90% of the chain ends are —OH groups may include mixtures having less than 90% chains of type $P^1$, as for example when a chain transfer agent capable of initiating three or more polymer chains is used. For example, where a triol is used as the chain transfer agent, if 80% of the chains result from initiation by the triol (three —OH end groups per chain) and the remaining 20% of chains have only one —OH end group, the composition as a whole will still contain greater than 90% —OH end groups.

Chain Transfer Agents

Chain transfer agents suitable for the present invention include compounds having two or more functional groups capable of initiating chain growth in the co-polymerization of propylene oxide and carbon dioxide. In some embodiments the chain transfer agent comprises one or more repeating units of ethylene glycol or propylene glycol. Preferably such compounds do not have other functional groups that interfere with the polymerization.

In certain embodiments, chain transfer agents of the present disclosure have a structure HO—$Y_x$-A($Y_x$—OH)$_n$, where:

each —Y group comprises repeating units of ethylene glycol or propylene glycol;

-A- is a covalent bond, a heteroatom, or a multivalent moiety; x is 0 to 10 (preferably 1 to 10) and n is from 1 to 10 inclusive.

In certain embodiments, chain transfer agents of the present disclosure have a structure HO—Y-A-(Y—OH)$_n$, where:

each —Y group comprises one or multiple repeating units of a bivalent $C_{2-5}$, straight or branched, saturated hydrocarbon chain, wherein one methylene unit of each hydrocarbon group is replaced with —O—;

-A- is a covalent bond, a heteroatom, or a multivalent moiety; and n is from 1 to 10 inclusive.

In certain embodiments, chain transfer agents of the present disclosure have a structure HO-A(OH)$_n$, wherein n and A are as defined above and described in classes and subclasses herein.

In certain embodiments, each Y group is or comprises one or multiple repeating groups of a $C_{1-4}$ ether moiety. In some embodiments the chain transfer agent used to prepare the polymer of the invention may be a $C_{2-8}$alkylenediol. In some embodiments the chain transfer agent used to prepare the polymer of the invention may be 1,4 butanediol. In some embodiments the chain transfer agent used to prepare the polymer of the invention may be 1,6 hexanediol. In some embodiments, a chain transfer agent used to prepare the polymer of the invention is dipropylene glycol.

In some embodiments the chain transfer agent used to prepare the polymer of the invention may be a polyester and optionally may have a number average molecular weight (Mn) of from 500 to 5000, preferably 500 to 3000, more preferably 1000 to 3000 daltons. In certain embodiments, each Y group is or comprises one or multiple repeating units of ethylene glycol or propylene glycol.

General Synthesis

General synthetic procedures useful for preparing polycarbonate polyol compositions of the present invention are disclosed in International Patent Application Publication No. WO2010/028362, the entirety of which is incorporated herein by reference. In some embodiments, polymerization systems useful to make polycarbonate polyols of the present invention comprise transition metal catalysts capable of catalyzing the copolymerization of carbon dioxide and epoxides. In certain embodiments, polymerization systems include any of the catalyst systems disclosed in U.S. Pat. Nos. 7,304,172, and 6,870,004; U.S. Patent Application No. 2009-0299032; International Patent Application Publication Nos. WO2010/028362, WO2010/033703, WO2010/033705, WO2008136591, WO2008150033, WO2010/062703, WO2008136591, WO2009/137540, and WO2010/022388; and in Chinese Patent Application Numbers CN200710010706, and CN200810229276, the entirety of each of which is hereby incorporated herein by reference.

In certain embodiments, the steps of preparing a polycarbonate polyol of the present invention further comprise one or more solvents. In certain embodiments, the polymerization steps are performed in neat epoxide without the addition of solvent.

In certain methods, where a polymerization solvent is present, the solvent comprises an organic solvent. In certain embodiments, the solvent comprises a hydrocarbon. In certain embodiments, the solvent comprises an aromatic hydrocarbon. In certain embodiments, the solvent comprises an aliphatic hydrocarbon. In certain embodiments, the solvent comprises a halogenated hydrocarbon. In some embodiments, the solvent comprises a ketone. In some embodiments, the solvent comprises acetone. In some embodiments, the solvent is methyl ethyl ketone. In some embodiments, the solvent is an ether. In some embodiments, the solvent comprises dimethoxyethane. In some embodiments, the solvent is acetonitrile. In some embodiments, the solvent is dioxane. In some embodiments, the solvent comprises an amide. In some embodiments, the solvent comprises dimethyl acetamide. In some embodiments, the solvent comprises dimethyl formamide. In some embodiments, the solvent comprises dimethyl sulfoxide. In some embodiments, the solvent comprises ethylene dichloride. In some embodiments, the solvent comprises toluene. In some embodiments, the solvent comprises xylene.

Certain thermosetting applications may require the use of high temperature. Residual solvent remaining in polycarbonate polyol composition may cause undesirable effects when subjected to higher temperatures. Applicant has found that the use of high boiling solvents in the synthesis of polycarbonate polyols can be advantageous when using the polycarbonate polyols in thermosetting. In certain embodiments, a high boiling solvent has a boiling point greater than 70° C. In certain embodiments, a high boiling solvent has a boiling point greater than 80° C. In certain embodiments, a high boiling solvent has a boiling point greater than 90° C. In certain embodiments, a high boiling solvent has a boiling point greater than 100° C.

In certain embodiments, polymerization methods to prepare a provided polycarbonate polyol composition produce cyclic carbonate as a by-product in amounts of less than about 20%. In certain embodiments, cyclic carbonate is produced as a by-product in amounts of less than about 15%. In certain embodiments, cyclic carbonate is produced as a by-product in amounts of less than about 10%. In certain embodiments, cyclic carbonate is produced as a by-product in amounts of less than about 5%. In certain embodiments, cyclic carbonate is produced as a by-product in amounts of less than about 1%. In certain embodiments, the reaction does not produce any detectable by-products (e.g., as detectable by $^1$H-NMR and/or liquid chromatography (LC)).

In certain embodiments, a polymerization reaction is allowed to proceed until the number average molecular weight of the polymers formed is between about 500 and about 15,000 g/mol. In certain embodiments, the number average molecular weight is allowed to reach a value between 500 and 10,000 g/mol. In some embodiments, the number average molecular weight is allowed to reach a value between 500 and 5,000 g/mol. In some embodiments, the number average molecular weight is allowed to reach a value between 500 and 3,500 g/mol. In some embodiments, the number average molecular weight is allowed to reach a value between 500 and 2,500 g/mol. In some embodiments, the number average molecular weight is allowed to reach a value between 1,000 and 5,000 g/mol.

Specific Polyols

In certain embodiments, polycarbonate polyol compositions of the present invention that are suitable for formulation into coatings for can and coil applications comprise chains with a structure P2:

In certain embodiments, polyol compositions comprising chains of formula P2 are characterized in that the Mn of the compostion is in the range from about 2500 g/mol to about 4000 g/mol. In certain embodiments, polyol compositions comprising chains of formula P2 have an Mn of about 3000 g/mol.

In certain embodiments, polyol compositions comprising chains of formula P2 are characterized in that at least 95% of the linkages between adjacent monomer units in the polycarbonate portions of the chains are carbonate linkages. In certain embodiments, at least 97% of linkages are carbonate linkages. In some embodiments, greater than 98% of linkages are carbonate linkages. In some embodiments at least 99% of linkages are carbonate linkages. In some embodiments essentially all of the linkages are carbonate linkages (i.e. there are essentially only carbonate linkages detectable by typical methods such as $^1$H or $^{13}$C NMR spectroscopy).

In certain embodiments, polyol compositions comprising chains of formula P2 are characterized in that they have a polydispersity index of less than 1.2. In certain embodiments, polyol compositions comprising chains of formula P2 have a polydispersity index of less than 1.1. In certain embodiments, polyol compositions comprising chains of formula P2 have a polydispersity index of about 1.05.

In certain embodiments, polyol compositions comprising chains of formula P2 are characterized in that they have a cyclic propylene carbonate content of less than 5%. In certain embodiments, polyol compositions comprising chains of formula P2 have a cyclic propylene carbonate content of less than 3%. In certain embodiments, polyol compositions comprising chains of formula P2 have a cyclic propylene carbonate content of less than 2%. In certain embodiments, polyol compositions comprising chains of formula P2 have a cyclic content of about 1% or less. It will be appreciated that the preceding percentages of cyclic propylene carbonate content may be calculated as either a mole percentage of the polymer P2 or in an alternative embodiment the same values may be used calculated as a weight percent.

In certain embodiments, provided polycarbonate polyol compositions comprising chains of formula P2 are characterized in that, on average, more than about 80% of linkages between adjacent monomer units are head-to-tail linkages. In certain embodiments, on average, more than 85% of linkages between adjacent epoxide monomer units are head-to-tail linkages. In certain embodiments, on average, more than 90% of linkages between adjacent epoxide monomer units are head-to-tail linkages.

In certain embodiments, provided polycarbonate polyol compositions comprising chains of formula P2 are characterized in that at least 90% of the chain ends are —OH groups. In certain embodiments, at least 95% of the chain ends are —OH groups. In certain embodiments, at least 98% of the chain ends are —OH groups. In certain embodiments, at least 99% of the chain ends are —OH groups.

In some embodiments, the present invention encompasses a polycarbonate polyol of structure P2 having a Mn of about 3000 g/mol and characterized in that at least 98% of the

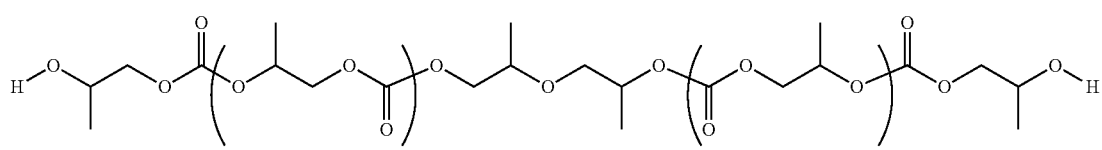

P2 linkages in the polycarbonate chains are carbonate linkages, at least 85% of adjacent monomer units are oriented head to tail, the polydispersity index is less than 1.1, the polyol contains less than 5% cyclic propylene carbonate and at least 95% of the polymer ends comprise —OH groups.

In some embodiments, the present invention encompasses a polycarbonate polyol of structure P2 having a Mn of about 4000 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the polymer ends comprise —OH groups.

In some embodiments, the present invention encompasses a polycarbonate polyol of structure P2 having a Mn of about 2000 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the polymer ends comprise —OH groups.

In certain embodiments, polycarbonate polyol compositions of the present invention that are suitable for formulation into coatings for can and coil applications comprise chains with a structure P2a:

mula P3 are characterized in that the Mn of the compostion is in the range from about 2500 g/mol to about 6000 g/mol. In certain embodiments, polyol compositions comprising chains of formula P3 have an Mn of about 4000 g/mol.

In certain embodiments, polyol compositions comprising chains of formula P3 are characterized in that at least 95% of the linkages between adjacent monomer units in the polycarbonate portions of the chains are carbonate linkages. In certain embodiments, at least 97% of linkages are carbonate linkages. In some embodiments, greater than 98% of linkages are carbonate linkages in some embodiments at least 99% of linkages are carbonate linkages. In some embodiments essentially all of the linkages are carbonate linkages (i.e. there are essentially only carbonate linkages detectable by typical methods such as $^1$H or $^{13}$C NMR spectroscopy).

In certain embodiments, polyol compositions comprising chains of formula P3 are characterized in that they have a polydispersity index of less than 1.2. In certain embodiments, polyol compositions comprising chains of formula P3 have a polydispersity index of less than 1.1. In certain embodiments, polyol compositions comprising chains of formula P3 have a polydispersity index of about 1.05.

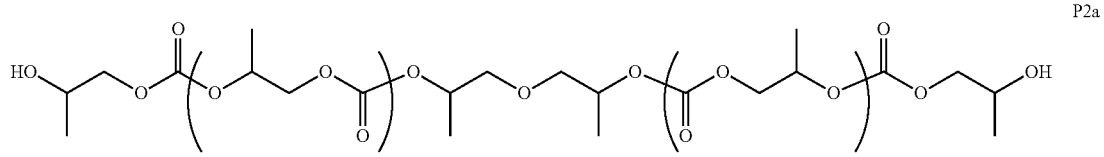

P2a wherein each p bracketed group is a repeating unit, and the embodiments listed above for structure P2 apply. In some embodiments, p is from about 5 to about 75.

In some embodiments, polycarbonate polyol compositions of the present invention that are suitable for formulation into coatings for can and coil applications comprise chains with a structure P3:

In certain embodiments, polyol compositions comprising chains of formula P3 are characterized in that they have a propylene carbonate content of less than 5%. In certain embodiments, polyol compositions comprising chains of formula P3 have a propylene carbonate content of less than 3%. In certain embodiments, polyol compositions comprising chains of formula P3 have a propylene carbonate content of

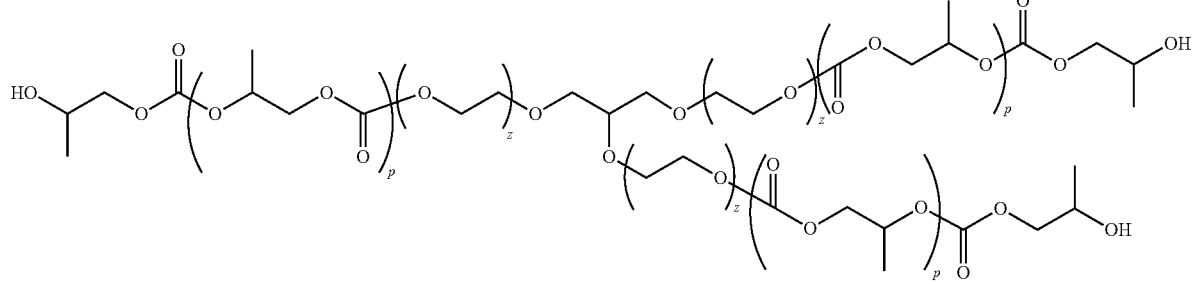

P3 wherein each p bracketed group is a repeating unit and z is as defined below. In some embodiments, p is from about 5 to about 75.

In certain embodiments of polyol compositions having formula P3, each z is independently between from 1 to 10. In certain embodiments, each z in P3 is independently between from 1 to 6. In certain embodiments, z in P3 is, on average about 2. In certain embodiments, z in P3 is, on average about 3. In certain embodiments, z in P3 is, on average about 4. In certain embodiments, z in P3 is, on average about 5. In certain embodiments, polyol compositions comprising chains of forless than 2%. In certain embodiments, polyol compositions comprising chains of formula P3 have a propylene carbonate content of about 1% or less.

In some embodiments, provided polycarbonate polyol compositions comprising chains of formula P3 are characterized in that, on average, more than about 80% of linkages between adjacent monomer units are head-to-tail linkages. In certain embodiments, on average, more than 85% of linkages between adjacent epoxide monomer units are head-to-tail linkages. In certain embodiments, on average, more than 90% of linkages between adjacent epoxide monomer units are head-to-tail linkages.

In certain embodiments, provided polycarbonate polyol compositions comprising chains of formula P3 are characterized in that at least 90% of the chain ends are —OH groups. In certain embodiments, at least 95% of the chain ends are —OH groups. In certain embodiments, at least 98% of the chain ends are —OH groups. In certain embodiments, at least 99% of the chain ends are —OH groups.

In some embodiments, the present invention encompasses a polycarbonate polyol of structure P3 having a Mn of about 4000 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the chain ends are —OH groups.

In some embodiments, the present invention encompasses a polycarbonate polyol of structure P3 having a Mn of about 6000 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the chain ends are —OH groups.

In certain embodiments, the present invention encompasses a polycarbonate polyol composition comprising a mixture of polyol chains of formulae P2 and P3. In certain embodiments, polycarbonate polyol compositions of the present invention that are suitable for formulation into two-component coating applications, application to can, application to coil, or combinations thereof, have a structure P2. In certain embodiments, polycarbonate polyol compositions of the present invention that are suitable for formulation into two-component coating applications, application to can, application to coil, or combinations thereof, have a structure P3.

In certain embodiments, polycarbonate polyol compositions of the present invention that are suitable for formulation into two-component coating applications, application to can, application to coil, or combinations thereof, comprise polymer chains having a structure P4:

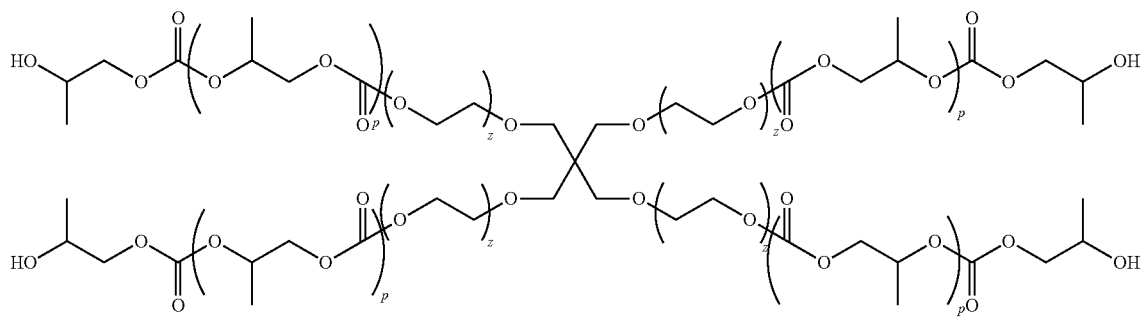

P4 wherein each p bracketed group is a repeating unit and z is as defined below. In some embodiments, p is from about 5 to about 75.

In certain embodiments of polyol compositions having formula P4, each z is independently between from 1 to 10. In certain embodiments, each z in P4 is independently between from 1 to 6. In certain embodiments, z in P4 is, on average about 2. In certain embodiments, z in P4 is, on average about 3. In certain embodiments, z in P4 is, on average about 4. In certain embodiments, z in P4 is, on average about 5.

In certain embodiments, polyol compositions comprising chains of formula P4 are characterized in that the Mn of the compostion is in the range from about 1500 g/mol to about 6000 g/mol. In certain embodiments, polyol compositions comprising chains of formula P4 are characterized in that the Mn of the compostion is in the range from about 2500 g/mol to about 6000 g/mol. In certain embodiments, polyol compositions comprising chains of formula P4 have an Mn of about 4000 g/mol.

In certain embodiments, polyol compositions comprising chains of formula P4 are characterized in that at least 95% of the linkages between adjacent monomer units in the polycarbonate portions of the chains are carbonate linkages. In certain embodiments, at least 97% of linkages are carbonate linkages. In some embodiments, greater than 98% of linkages are carbonate linkages in some embodiments at least 99% of linkages are carbonate linkages. In some embodiments essentially all of the linkages are carbonate linkages (i.e. there are essentially only carbonate linkages detectable by typical methods such as $^1$H or $^{13}$C NMR spectroscopy).

In certain embodiments, polyol compositions comprising chains of formula P4 are characterized in that they have a polydispersity index of less than 1.2. In certain embodiments, polyol compositions comprising chains of formula P4 have a polydispersity index of less than 1.1. In certain embodiments, polyol compositions comprising chains of formula P4 have a polydispersity index of about 1.05.

In certain embodiments, polyol compositions comprising chains of formula P4 are characterized in that they have a propylene carbonate content of less than 5%. In certain embodiments, polyol compositions comprising chains of formula P4 have a propylene carbonate content of less than 3%. In certain embodiments, polyol compositions comprising chains of formula P4 have a propylene carbonate content of less than 2%. In certain embodiments, polyol compositions comprising chains of formula P4 have a propylene carbonate content of about 1% or less.

In some embodiments, provided polycarbonate polyol compositions comprising chains of formula P4 are characterized in that, on average, more than about 80% of linkages between adjacent monomer units are head-to-tail linkages. In certain embodiments, on average, more than 85% of linkages between adjacent epoxide monomer units are head-to-tail linkages. In certain embodiments, on average, more than 90% of linkages between adjacent epoxide monomer units are head-to-tail linkages.

In certain embodiments, provided polycarbonate polyol compositions comprising chains of formula P4 are characterized in that at least 90% of the chain ends are —OH groups. In certain embodiments, at least 95% of the chain ends are —OH groups. In certain embodiments at least 98% of the chain ends are —OH groups. In certain embodiments, at least 99% of the chain ends are —OH groups.

In some embodiments, the present invention encompasses a polycarbonate polyol of structure P4 having a Mn of about 4000 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the chain ends are —OH groups.

In some embodiments, the present invention encompasses a polycarbonate polyol of structure P4 having a Mn of about 3000 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the chain ends are —OH groups.

In some embodiments, the present invention encompasses a polycarbonate polyol of structure P4 having a Mn of about 2500 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the chain ends are —OH groups.

In certain embodiments, polycarbonate polyol compositions of the present invention that are suitable for formulation into two-component coating applications comprise polymer chains having a structure P6:

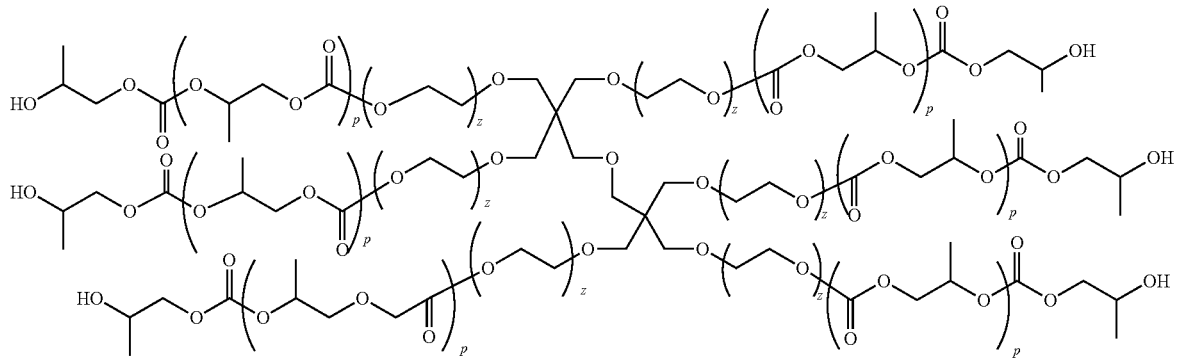

P6 wherein each p bracketed group is a repeating unit and z is as defined below. In some embodiments, p is from about 5 to about 75.

In certain embodiments of polyol compositions having formula P6, each z is independently between from 1 to 10. In certain embodiments, each z in P6 is independently between from 1 to 6. In certain embodiments, z in P6 is, on average about 2. In certain embodiments, z in P6 is, on average about 3. In certain embodiments, z in P6 is, on average about 4. In certain embodiments, z in P6 is, on average about 5.

In certain embodiments, polyol compositions comprising chains of formula P6 are characterized in that the Mn of the compostion is in the range from about 2500 g/mol to about 6000 g/mol. In certain embodiments, polyol compositions comprising chains of formula P6 have an Mn of about 4000 g/mol.

In certain embodiments, polyol compositions comprising chains of formula P6 are characterized in that at least 95% of the linkages between adjacent monomer units in the polycarbonate portions of the chains are carbonate linkages. In certain embodiments, at least 97% of linkages are carbonate linkages. In some embodiments, greater than 98% of linkages are carbonate linkages in some embodiments at least 99% of linkages are carbonate linkages. In some embodiments essentially all of the linkages are carbonate linkages (i.e. there are essentially only carbonate linkages detectable by typical methods such as $^1$H or $^{13}$C NMR spectroscopy).

In certain embodiments, polyol compositions comprising chains of formula P6 are characterized in that they have a polydispersity index of less than 1.2. In certain embodiments, polyol compositions comprising chains of formula P6 have a polydispersity index of less than 1.1. In certain embodiments, polyol compositions comprising chains of formula P6 have a polydispersity index of about 1.05.

In certain embodiments, polyol compositions comprising chains of formula P6 are characterized in that they have a propylene carbonate content of less than 5%. In certain embodiments, polyol compositions comprising chains of formula P6 have a propylene carbonate content of less than 3%. In certain embodiments, polyol compositions comprising chains of formula P6 have a propylene carbonate content of less than 2%. In certain embodiments, polyol compositions comprising chains of formula P6 have a propylene carbonate content of about 1% or less.

In some embodiments, provided polycarbonate polyol compositions comprising chains of formula P6 are characterized in that, on average, more than about 80% of linkages between adjacent monomer units are head-to-tail linkages. In certain embodiments, on average, more than 85% of linkages between adjacent epoxide monomer units are head-to-tail linkages. In certain embodiments, on average, more than 90% of linkages between adjacent epoxide monomer units are head-to-tail linkages.

In certain embodiments, provided polycarbonate polyol compositions comprising chains of formula P6 are characterized in that at least 90% of the chain ends are —OH groups. In certain embodiments, at least 95% of the chain ends are —OH groups. In certain embodiments at least 98% of the chain ends are —OH groups. In certain embodiments, at least 99% of the chain ends are —OH groups.

In some embodiments, the present invention encompasses a polycarbonate polyol of structure P6 having a Mn of about 4000 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the chain ends are —OH groups.

In some embodiments, the present invention encompasses a polycarbonate polyol of structure P6 having a Mn of about 3000 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the chain ends are —OH groups.

In some embodiments, the present invention encompasses a polycarbonate polyol of structure P6 having a Mn of about 2500 g/mol and characterized in that at least 98% of the linkages in the polycarbonate chains are carbonate linkages, at least 85% of adjacent monomer units are oriented head to tail, the polydispersity index is less than 1.1, the polyol contains less than 5% cyclic propylene carbonate, and at least 95% of the chain ends are —OH groups.

In certain embodiments the present invention encompasses polycarbonate polyol compositions comprising a mixture of polycarbonate polyol chains of structure P4 with one or more polycarbonate polyol chains selected from structures P2 and P3. In certain embodiments, the present invention encompasses a polycarbonate polyol composition comprising a mixture of polyol chains of formulae P2 and P4.

In certain embodiments the present invention encompasses polycarbonate polyol compositions comprising a mixture of polycarbonate polyol chains of structure P6 with one or more polycarbonate polyol chains selected from structures P2, P3 and/or P3. In certain embodiments, the present invention encompasses a polycarbonate polyol composition comprising a mixture of polyol chains of formulae P2 and P6.

Representative Procedure for Preparing Epoxide/$CO_2$ Polycarbonate Polyols

Propylene oxide, chain transfer agent (CTA), cobalt catalyst and co-catalyst were added to a 2 gallon (PC-1, 2, 4-14) or 25 gallon (PC-3) stainless steel autoclave and the polymerization was carried out according to the conditions disclosed in WO 2010028362. After the allotted reaction time, the reaction was quenched and the polyol was purified according to the conditions disclosed in WO 2010033705 and WO 2010033703, respectively. The CTAs used to prepare the polycarbonate polyols are listed below:

| Polyol | Chain transfer agent |
| --- | --- |
| PC-1 | Dipropylene glycol |
| PC-2 | Dipropylene glycol |
| PC-3 | Dipropylene glycol |
| PC-4 | Dipropylene glycol |
| PC-5 | Perstorp Polyol |
| PC-6 | Dipropylene glycol |
| PC-7 | Dipropylene glycol |
| PC-8 | Perstorp Polyol 3611 |
| PC-9 | Perstorp Polyol 4640 |
| PC-10 | Perstorp Polyol 3611 |
| PC-11 | Perstorp Polyol 4640 |
| PC-12 | Perstorp Polyol 3165 |
| PC-13 | Perstorp Polyol 4290 |
| PC-14 | 400 g/mol poly(ethylene glycol) |
| PC-33 | Perstorp Polyol R6405 |

Figure 56:
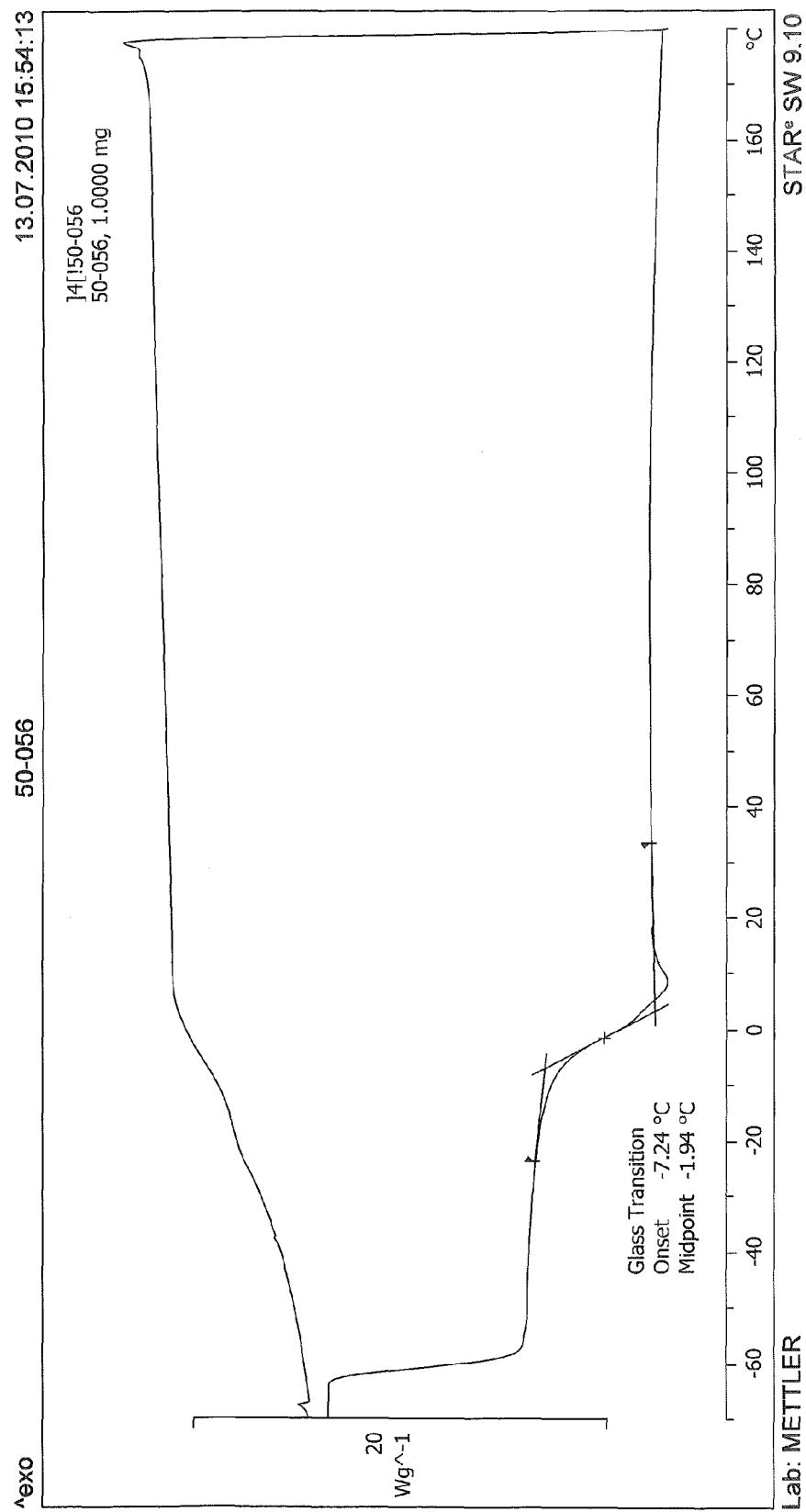
FIG. 56 shows a DSC trace of polyol PC-14

Representative analytical data for polyols PC-1 through PC-14 are provided in FIGS. 1-56. The use of these and other related polycarbonate polyol compositions to produce higher polymers and the properties of the resulting materials are further described below.

Higher Polymers

Useful materials may be made by cross-linking any of the above polycarbonate polyol polymer compositions. In certain embodiments, such cross-linked materials comprise polyurethanes. In certain embodiments such cross-linked polyurethanes comprise coatings and adhesives. In particular, polycarbonate resins made from PPC polyols of the present invention are useful in "can and coil" applications (e.g., hard, flexible coatings for metal coated prior to being formed into finished goods such as appliances, metal panels and coated cans) and "two-component" applications (e.g., coatings for industrial applications).

In certain embodiments, polymers described herein may be used as a polyol or polymer with (mainly) hydroxy functionality in "1C" systems with materials such as melamine, phenolic systems and/or blocked isocyanates In certain embodiments, polymers described herein may be used with other ingredients in "2C" systems such as with iscocynate industrial applications for coating substrates such as cans, coils, automotive substartes and/or wood used in industrial applications.

Generally "1C" system or curing (or single component curing) is used herein to denote coatings that cure without additional reagents e.g. by using ambient material moisture and/or humidity whereas "2C" system or curing (or two component curing) is used herein to denote coatings that cure when two components react with each other (e.g. when they are brought together in situ).

Thus, the present disclosure encompasses higher polymers derived from the polycarbonate polyols described hereinabove. In certain embodiments, cross linkers including functional groups reactive toward hydroxyl groups are selected, for example, from epoxy and isocyanate groups. In certain embodiments, a higher polymer is formed by reacting a provided polycarbonate polyol with a multifunctional crosslinker. In certain embodiments, such cross linking agents are polyisocyanates. In certain embodiments, such cross linking agents are melamine derivatives such as (etherified) melamine formaldehyde oligomers. In certain embodiments, such cross linking agents are phenol-formaldehyde oligomers.

In certain embodiments, such cross linking agents are polyisocyanates. In some embodiments, a difunctional or higher-functionality isocyanate is selected from di-isocyanates, the biurets and cyanurates of diisocyanates, and the adducts of diisocyanates to polyols. Suitable diisocyanates have generally from 4 to 22 carbon atoms. The diisocyanates are typically selected from aliphatic, cycloaliphatic and aromatic diisocyanates, for example 1,4-diisocyanatobutane, 1,6-diisocyanatohexane, 1,6-diisocyanato-2,2,4-trimethylhexane, 1,6-diisocyanato-2,4,4-trimethylhexane, 1,2-, 1,3- and 1,4-diisocyanatocyclohexane, 2,4- and 2,6-diisocyanato-1-methylcyclohexane, 4,4'-bis(isocyanatocyclohexyl)methane, isophorone diisocyanate (1-isocyanato-3,3,5-trimethyl-5-isocyanatomethylcyclohexane), 2,4- and 2,6-tolylene diisocyanate, tetramethylene-p-xylylene diisocyanate (1,4-bis(2-isocyanatoprop-2-yl)benzene), 4,4'-diisocyanato-diphenylmethane, preferably 1,6-diisocyanatohexane diisocyanatohexane and isophorone diisocyanate, and mixtures thereof.

In certain embodiments, crosslinking compounds comprise the cyanurates and biurets of aliphatic diisocyanates. In certain embodiments, crosslinking compounds are the di-isocyanurate and the biuret of isophorone diisocyanate, and the isocyanate and the biuret of 1,6-diisocyanatohexane. Examples of adducts of diisocyanates to polyols are the adducts of the abovementioned diisocyanates to glycerol, trimethylolethane and trimethylolpropane, for example the adduct of tolylene diisocyanates to trimethylolpropane, or the adducts of 1,6-diisocyanatohexane or isophorone diisocyanate to trimethylpropane and/or glycerol.

In some embodiments, a polyisocyanate used, may, for example, be an aromatic polyisocyanate such as tolylene diisocyanate, diphenylmethane diisocyanate or polymethylene polyphenyl isocyanate, an aliphatic polyisocyanate such as hexamethylene diisocyanate, xylylene diisocyanate, dicyclohexylmethane diisocyanate, lysine diisocyanate or tetramethylxylylene diisocyanate, an alicyclic polyisocyanate such as isophorone diisocyanate, or a modified product thereof.

In some embodiments, a modified product of a polyisocyanate is a prepolymer modified product which is a reaction product of a low molecular weight diol with a low molecular weight triol, a biuret product which is a reaction product with water, or a trimer having an isocyanurate skeleton.

The isocyanate group-terminated prepolymer can be produced by reacting a stoichiometrically excess amount of a polyisocyanate to the polyol composition. It can be produced by thermally reacting the polyol composition with the polyisocyanate at a temperature of from 60 to 100° C. for from 1 to 30 hours in a dry nitrogen stream in the presence or absence of a solvent and optionally in the presence of a urethane-forming catalyst. In some embodiments, a urethane-forming catalyst is an organometallic compound of tin, lead or titanium. In some embodiments a urethane-forming catalyst is an organic tin compound, such as dibutyltin dilaurate, dibutyltin dioctoate or stannous octoate.

An isocyanate group-terminated prepolymer of the present invention can be used for uses known in the art and familiar to the skilled artisan. In some embodiments, it can be used for a humidity curable composition which is cured by a reaction with moisture in air, a two-part curable composition to be reacted with a curing agent such as a polyamine, a polyol or a low molecular weight polyol, a casting polyurethane elastomer, or other applications.

The present invention also provides a polyurethane resin obtained by reacting the above polyol composition with a polyisocyanate. Such a polyurethane resin can be produced by a known method, and a curing agent such as a polyamine or a low molecular polyol, or the above mentioned urethane-forming catalyst may optionally be used.

In the production of polyurethanes, polyols of the invention may be reacted with the polyisocyanates using conventional techniques that have been fully described in the prior art. Depending upon whether the product is to be a homogeneous or microcellular elastomer, a flexible or rigid foam, an adhesive, coating or other form, the reaction mixture may contain other conventional additives, such as chain-extenders, for example 1,4-butanediol or hydrazine, catalysts, for example tertiary amines or tin compounds, surfactants, for example siloxane-oxyalkylene copolymers, blowing agents, for example water and trichlorofluoromethane, cross-linking agents, for example triethanolamine, fillers, pigments, fire-retardants and the like.

To accelerate the reaction between the isocyanate-reactive groups of the polyol resin and the isocyanate groups of the crosslinker, it is possible to use known catalysts, for example, dibutyltin dilaurate, tin(II) octoate, 1,4-diazabicyclo[2.2.2]-octane, or amines such as triethylamine. In some embodiments, such catalysts are used in an amount of from $10^{-5}$ to $10^{-2}$ g, based on the weight of the crosslinker. In some embodiments, such catalysts are used in an amount from 0.01 to 0.5 weight percent, based on the weight of the solid part of the crosslinker and polyol resin.

The crosslinking density can be controlled by varying the functionality of the polyisocyanate, the molar ratio of the polyisocyanate to the polyol resin, or by additional use of monofunctional compounds reactive toward isocyanate groups, such as monohydric alcohols, e.g. ethylhexanol or propylheptanol.

A crosslinker is generally used in an amount which corresponds to an NCO:OH equivalents ratio of from 0.5 to 2, preferably from 0.75 to 1.5 and most preferably from 0.8 to 1.2.

Suitable crosslinking agents are also epoxy compounds having at least two epoxide groups in the molecule, and their extension products formed by preliminary extension (pre-polymers for epoxy resins, as described, for example in Ullmann's Encyclopedia of Industrial Chemistry, 6th edition, 2000, Electronic Release, in the chapter "Epoxy Resins"). Epoxy compounds having at least two epoxide groups in the molecule include, in particular:

(i) Polyglycidyl and poly(β-methylglycidyl) esters which are obtainable by reacting a compound having at least two carboxyl groups, such as an aliphatic or aromatic polycarboxylic acid, with epichlorohydrin or beta-methylepichlorohydrin. The reaction is effected, preferably, in the presence of a base. Suitable aliphatic polycarboxylic acids are oxalic acid, succinic acid, glutaric acid, adipic acid, pimelic acid, azelaic acid, dimerized or trimerized linolenic acid, tetrahydrophthalic acid, hexahydrophthalic acid or 4-methylhexahydrophthalic acid. Suitable aromatic polycarboxylic acids are, for example, phthalic acid, isophthalic acid or terephthalic acid.

(ii) Polyglycidyl or poly(β-methylglycidyl)ethers which derive, for example, from acyclic alcohols, such as ethylene glycol, diethylene glycol, poly(oxyethylene) glycols, propane-1,2-diol, poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol; or cyclic alcohols such as 1,4-cyclohexanedimethanol, bis(4-hydroxycyclohexyl)methane or 2,2-bis(4-hydroxycyclohexyl)propane; or comprise aromatic rings, such as N,N-bis(2-hydroxyethyl)aniline or p,p-bis(2-hydroxyethylamino) diphenylmethane. The glycidyl ethers may also derive from monocyclic phenols such as resorcinol or hydroquinone, or polycyclic phenols, such as bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl) propane, or from novolaks which are obtainable by condensing aldehydes, such as formaldehyde, acetaldehyde, chloral or furfural, with phenols, such as phenol, 4-chlorophenol, 2-methylphenol, 4-tert-butylphenol or bisphenols.

(iii) Poly(N-glycidyl) compounds which are obtainable by dehydrochlorinating the reaction products of epichlorohydrin with amines which have at least two amine hydrogen atoms, such as aniline, n-butylamine, bis(4-aminophenyl)methane, m-xylylenediamine or bis(4-methylaminophenyl)methane. The poly(N-glycidyl) compounds also include triglycidyl isocyanurates, N,N'-diglycidyl derivatives of alkyleneureas such as ethyleneurea or 1,3-propyleneurea, and the diglycidyl derivatives or hydantoins such as 5,5-dimethylhydantoin.

(iv) Poly(S-glycidyl) compounds such as di-S-glycidyl derivatives which derive from dithiols, such as ethane-1,2-dithiol or bis(4-mercaptomethylphenyl)ether.

(v) Cycloaliphatic epoxy compounds such as bis(2,3-epoxycyclopentyl)ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate; or mixed cycloaliphatic-aliphatic epoxy compounds such as limonene diepoxide.

In certain embodiments, a crosslinking reagent comprises amino groups, isocyanate groups, phenoxy groups, phenolic resin, or combinations thereof. In some embodiments, a crosslinker is selected from benzoguanamine, melamine, and urea-formaldehyde resin. In some embodiments, a crosslinker is selected from novalac resins, resoles, and bisphenol A.

In certain embodiments, a crosslinker comprises blocked isocyanate groups. In some embodiments, a crosslinker is selected from hexamethylene diisocyanate, toluene diisocyanate, isophorone diisocyanate, tetramethylxylene diisocyanate, 3,4-isocyanatomethyl-1-methyl-cyclohexylisocyanate, and dimer and trimers thereof.

In some embodiments, the present disclosure encompasses higher polymers formed with polyol resins of the present invention that additionally comprise a stiffening polymer which comprises (meth)acryloyl and/or vinylaromatic units. The stiffening is obtainable by free-radically polymerizing (meth)acrylic monomers or vinylaromatic monomers. Examples of suitable monomers are styrene, ring-alkylated styrenes with preferably $C_{1-4}$ alkyl radicals such as a-methylstyrene, p-methylstyrene, acrylonitrile, methacrylonitrile, acrylamide or methacrylamide, alkyl acrylates and methacrylates having from 1 to 4 carbon atoms in the alkyl radical, in particular methyl methacrylate. Preference is given to using monomers and monomer mixtures which give rise to a polymer or copolymer having a glass transition temperature of more than +20° C. and preferably more than +50° C. The stiffening polymer may, aside from (meth)acrylic monomers or vinylaromatic monomers, comprise various monomers. The (meth)acrylic monomers or vinylaromatic monomers make up generally at least 20% by weight, preferably at least 50% by weight, in particular at least 70% by weight, of the constituent monomers.

The encompassed higher polymer compositions may additionally comprise customary assistants such as fillers, diluents or stabilizers.

Suitable fillers are, for example, silica, colloidal silica, calcium carbonate, carbon black, titanium dioxide, mica and the like.

Suitable diluents are, for example, polybutene, liquid polybutadiene, hydrogenated polybutadiene, paraffin oil, naphthenenates, atactic polypropylene, dialkyl phthalates, reactive diluents, for example, alcohols and oligoisobutenes.

Suitable stabilizers are, for example, 2-benzothiazolyl sulfide, benzothiazole, thiazole, dimethyl acetylenedicarboxylate, diethyl acetylenedicarboxylate, BHT, butylhydroxyanisole, vitamin E.

Articles of manufacture comprising provided polycarbonate polyol and/or polyurethane compositions can be made using known methods and procedures described in the art. The skilled artisan, after reading the present disclosure, will be able to manufacture such articles using well known protocols and techniques.

In some embodiments, a formulation based on amount of solids comprises:

| | |
|---|---|
| Resin | between 70 and 85 parts |
| Phenolics | between 30 and 15 parts |
| Catalyst | between 0-0.8% |
| Flow additive | approx 0.2% |
| Wax | approx 0.5% |
| Solvents | depending on the desired viscosity of the coating |

Formulation Properties

Compositions (such as coating compositions) that comprise polymers of the present invention may exhibit improved performance as defined herein, for example they may exhibit improved hardness, flexibility, corrosion resistance and/or outdoor durability. The cured coatings that comprise polymers of the present invention may exhibit a broad range of protective properties like one or more of: excellent hardness, flexibility, processability, resistance against solvent, stain, corrosion and/or dirt pick up, hydrolytic stability against humidity and/or sterilization and/or outdoor durability Such improved properties may be in at least one, preferably a plurality, more preferably three of more of those properties labeled numerically below. Preferred polymers and/or compositions and/or coating compositions may exhibit comparable properties in one or more, preferably a plurality, more preferably three or more, most preferably in the rest of those properties labelled numerically herein.

Properties:
1 Hardness (Konig, Persoz and/or pencil hardness measured as described DIN 53157/1-87 (Konig), DIN 53157/11-87 (Persoz) and/or ISO 3270-1984, DIN EN 13523-4, ECCA T4 and/or ISO 15184:1998 (pencil hardness) and/or otherwise as described herein)
2 Flexibility (may be measured using the T-bend test as described in European standard EN 13523-7:2001 and/or otherwise as described herein).
3 Corrosion resistance (measured as described herein) is visually determined as described herein and rated from 1-5
4 Hydrolysis resistance (according to the methods described herein to determine hydrolysis of coatings as described herein)
5 Sterilization resistance (according to the methods described herein to sterilize coatings on cans such as described herein)
6 Outdoor durability (for example with respect to UV-A and UV-B resistance such as in the QUV-test (a laboratory simulation of the damaging forces of weather, for the purpose of predicting the relative durability of coatings/materials exposed to the outdoor environment and described in ASTMG 53-95 and/or otherwise as described herein))
7 Chemical resistance (to methyl ethyl ketone (MEK) in the MEK double rubs test as described herein)

Hydrolysis resistance is a general property useful for all coatings while sterilization is usually only useful for specific types of coatings such as those used to coat cans. Sterilization resistance is a specific type of hydrolysis resistance.

The weight percentages are calculated with respect to initial weight of polymer. Where applicable all of the above properties refer to measurements on a cured polymer. The known reference polymer and/or the composition for these comparisons are:
a) For a polymer-related property, the aliphatic polycarbonate macrodiol derived from 2,2-dialkyl-1,3-propanediol, available commercially from Perstorp under the trademark Oxymer® M-112.
b) For a composition-related property, the composition in which the polymer of the invention has been replaced by the same weight % of Oxymer® M-112

Some properties of the comparative polycarbonate Oxymer® M112 are: Appearance at ambient temperature-clear viscous liquid; Reactive groups 2 hydroxyl; OH-value 112 mg KOH/g; Molecular weight 1,000 g/mol; Viscosity 1.8 mPas (75° C.); Tg (DSC) –23° C.

The percentage differences for improved and comparable properties herein refer to fractional differences between the polymer and/or the composition of the invention and the known polymer and/or composition where the property is measured in the same units in the same way (i.e. if the value to be compared is also measured as a percentage it does not denote an absolute difference).

The polymers of the invention may be used to prepare a coating composition comprising:

a) a thermoset hydroxy functional polycarbonate polymer of the present invention as described herein; and b) a cross-linker capable of curing the polymer.

Examples of suitable crosslinkers include compounds containing amino groups, compounds containing isocyanate groups, compounds containing phenoxy groups, compounds containing a phenolic resin and/or or mixture of any of them. The crosslinker can be selected depending on the desired use.

Examples of suitable amino resin crosslinkers are benzoguanamine, melamine and urea-formaldehyde resins.

Examples of suitable phenolic crosslinkers are novolac resins, resoles and bisphenol A.

Examples of suitable crosslinkers containing blocked isocyanate groups are hexamethylene diisocyanate (HDI), toluene diisocyanate (TDI), isophorone diisocyanate (IPDI), tetramethylxylene diisoycanate (TMXDI), 3,4 isocyanatomethyl-1methyl-cyclohexylisocyanate (IMCI) and their dimers and trimers. Preferably these crosslinkers are blocked.

Coating compositions that comprise polymers of the invention may be substantially free of diluents (such as organic solvent and/or water) or may comprise suitable additional solvents (e.g. organic solvent and/or water).

Preferred coating compositions (when applied in situ after curing) that comprise polymers of the invention have one or more of the following properties:

i) a Konig hardness of at least 100; and/or
ii) a T-bend flexibility of 0.5 to 2.0 T More preferred compositions that comprise polymers of the invention produce coatings having a Konig hardness of from 100 to 250, most preferably 150 to 200.

More preferred compositions that comprise polymers of the invention produce coatings having a flexibility of from 0 to 1.5 T, most preferably 0 to 0.5 T.

Preferred coating compositions that comprise polymers of the invention may be in the form of powders or liquids (e.g. solvent or water based) and/or may be used as coatings and/or adhesives.

Preferred compositions that comprise polymers of the invention may be film forming and/or may cure reactively and/or by radiation.

Preferred end uses of the polymers of the invention are to coat metal surfaces (such as metal cans or coils) and/or as coatings suitable for use in graphic art applications.

Polymers of the present invention may be used in a method for obtaining a cured coated article and/or substrate, the method comprising the steps of:

A) applying a coating composition that comprise polymers of the invention to an article and/or substrate to form a coating thereon;

B) curing said coating to form a cured coated article and/or substrate.

Preferred coatings that comprise polymers of the invention when on said articles and/or substrates (i.e. after curing) have one or more of the following properties:

i) a Konig hardness of at least 210 or at least 150
ii) a T-bend flexibility of at most 0.5 T, The polymers of the invention polymer and/or composition that comprise that comprise polymers of the invention may be used to produce an article and/or substrate having one or more improved properties as described herein obtained and/or obtainable by the methods described herein.

The polymers of the invention may also be used (for example to prepare any of the compositions described herein) in combination with other polycarbonates prepared by any suitable method. Advantageously such other polycarbonates are obtained and/or obtainable as described in any of US 2009-0299032-A, WO 2010-028362, WO 2010-033703, WO 2010-033705, WO 2010-062703, WO 2010-075232 (the contents of each of which are hereby incorporated by reference).

Application Tests

Visual Rating Scale

The degree of damage to a coating in various tests herein is determined visually based on the following ratings where 5 is the best and 0 is the worse:

5=very good: no visible damage or degradation/discoloration;
4=only slight visible damage or haze/blooming;
3=clear haze/blooming or damage;
2=coating partially dissolved;
1=coating is almost completely dissolved;
0=very poor: coating is completely dissolved.

Surface Hardness (Konig Hardness)

König hardness was determined following DIN 53157 NEN5319 using Erichsen hardness measuring equipment. The values are given in seconds and the higher the value is the harder is the coating. A Koenig hardness above 100 and combined with a T-bend of 1 T or lower is considered very good.

Surface Hardness (Pencil Hardness)

Pencil hardness was determined following ISO 15184:1998 using a set of KOH-1-NOR drawing pencils in the following range: 6B-5B-4B-3B-2B—B—HB—F—H-2H-3H-4H-5H-6H (soft to hard). The hardest lead which does not penetrate the coating determines the degree of hardness. The minimum needed hardness is 1H. When at least 3H is obtained combined with a T-bend of IT or lower, this is considered very good.

Flexibility (T-Bend)

May be measured using the T-bend test as described in European standard EN 13523-7:2001. A T-bend of 1 T or lower is considered very flexible. In general a flexibility 1.5 T or lower is aimed for.

Flexibility (Wedgebend)

Flexibility may also be measured using a Wedgebend test. The Wedgebend test is used to measure the flexibility of a coating on a metal substrate by a quick deformation. The bent coated metal substrate is subjected to a prescribed impact force. The non-damaged part of the coating on the bend is decisive. The apparatus used are an Erichsen bend and impact tester, model 471; coated panels, 50 mm×140 mm. The reagents used are copper sulfate solution ($CuSO_4.5H_2O$) 100.0%; Citric acid 50.0%, Hydrochloric acid 37% (1.37%) and demineralized DM-water (1000).

The coated panel is slowly bent over a small bar and an impact tool is attached to the top of the tester. The bent panel is bent over the anvil with one side touching the stop plate. The panel is deformed by the free-falling impact tool. The impact tool is lifted from the anvil, and the deformed panel is removed and dipped into copper sulphate solution for 5 minutes.

The non-damaged part of the coating on the bend is decisive and this is defined as the percentage crack free of a coating which is calculated as follows.

$$\% \text{ crackfree} = \frac{\text{mm. no cracking}}{\text{length of coating on panel (118 mm.)}} \times 100\%$$

A "line of corrosion" is determined as follows. The starting point of measurement is the least sharp bend and the end point of measurement is the end of cracked area (indicated by the red-brown color from the reaction of the copper sulphate with the tinplate.

mm. no cracking =length of panel−length "line of corrosion".

A crack free percentage of greater than 80% is considered very flexible.

Flexibility (Asymmetric Box)

Flexibility may be measured using an Asymetric Box test. A box is stamped out of a sheet so the deformation is different than in the Wedgebend test. In most cases the asymmetric box is also sterilized in different environments, to assess flexibility. It is acceptable for a coating composition suitable for universal application that the sharpest edge of the box can be damaged. Assessment is on a visual scale where 5 denotes that the sharpest edge is not damaged, 4 denotes the sharpest edge is damaged, and 3 denotes that the following edge is also damaged.

Flexibility (Reversed Impact)

Resistance to rapid deformation or Reversed Impact is another flexibility test. It is measured according ECCA-T5. A result of 70 inchpounds, or 8 J, on aluminum panels, is considered good.

Sterilization Resistance and Pasteurization Resistance

Coatings that are intended for direct food contact may be evaluated to assess their resistance. The coatings are exposed to standard solutions and temperatures that simulate real practice pasteurization conditions of filled containers. The apparatus used to assess sterilization resistance are an PBI Beta 25 autoclave and PBI Mini-Matic autoclave. The apparatus used to assess pasteurization resistance are the electronic temperature sensor IKA-Werke ETS-D4 fussy and a hot plate. The reagents used are: Drinking water; 2% lactic acid in (DM) water; 2% citric acid in DM-water; 2% acetic acid in DM-water; 3% acetic acid in DM-water; 3% NaCl in DM-water; 2% NaCl+3% acetic acid in DM-water; and other requested solutions.

Sterilization resistance is tested under the following conditions (1 hour at 130° C., ±1.8 bar) and the method is as follows. Panels (at least 35 mm wide), cups or can ends are prepared for sterilization. An autoclave container with test material is placed in the autoclave. The autoclave is partly filled with water, so that the flat panels are dipped half in the water. Cups should be dipped completely. When using reagents others than water, the autoclave should not be filled (directly) with these solutions. Instead the material is placed in a glass jar, and the jar is placed the autoclave which is then filled with water until same level is reached as the solutions in the jar. The lid and the pressure valve of the autoclave are closed and the power supply connected and the requested sterilization sequence is set and then started. The pressure is released after sterilization by opening the pressure valve, and the container and panels are removed from the autoclave.

Pasteurization resistance is tested under the following conditions (45 minutes at 80° C.) and the method is as follows. Panels (at least 35 mm wide), cups or can ends are prepared for pasteurization. A glass is filled with drinking water which is heated with a hot plate to 80° C. (as measured by the electronic temperature sensor). The test items are placed in the water for 45 minutes and allowed to pasteurize and then the test panels are removed from the water.

Both sterilization and pasteurization are evaluated visually in the same manner. The panels are removed from the warm solution and rinsed with tap water immediately and then wiped dry immediately and placed with the coated side down onto a towel. The vapour and liquid phase are evaluated as are blushing, blisters, colour differences, softening and adhesion. Blushing, spots, corrosion and adhesion are each separately evaluated using the visual scale described herein (5=best, 1=worst). Can ends are evaluated only for the liquid phase. Porosity (small cracks) of the coating is also measured before and after sterilisation by measuring electric current.

For Can end, Porosity initially and after sterilization <10 mA.

For Can end Corrosion >4, adhesion >4, Blush >4.

For Flat plate in the gas phase >4.5.

For Flat plate in the liquid phase >4 for all environments.

Chemical Resistance (MEK Rubs)

The degree of cross-linking of a coating is determined by means of its resistance against wiping a cloth which is wetted with a strong organic solvent. The apparatus used is a DJH Designs MEK rub test machine and Greenson 4×4 pads. The reagent used is methyl ethyl ketone (MEK). The coated panel to be tested is at least 13×3 cm and is taped or clamped onto the machine. The pad is wetted automatically with approx 2 mL MEK. The wet pad is moved automatically over a length of about 12 cm forwards and backward in one movement, which is repeated continuously with a pressure of 3 kg and a cycle time of about 1 second. One double rub is one cycle and the procedure is repeated for 100 cycles or until the coating is ruptured or dissolved and the bare metal (or the primer layer) becomes visible. Matt coatings become glossy during the MEK test but this is not rated as coating damage. After the test the coating is visually examined in the middle of the rubbed area and given a rating from 5 to 1 as indicated above. To be acceptable for use in many applications typically coatings have chemical resistance of at least 100 MEK double rubs. For coating cans MEK resistance is not a relevant criteria.

Outdoor Durability (QUV Test)

The QUV-test is a laboratory simulation of the damaging forces of weather, for the purpose of predicting the relative durability of coatings/materials exposed to the outdoor environment according to ASTMG 53-95. Apparatus used is a Q.U.V. accelerated weathering tester and eight fluorescent UV-B 313 lamps. Reagent used is demineralised water. Test panels/materials of 75×150 mm size were coated with the test coatings and exposed to test cycles for four hours of UV radiation at 50° C., relative humidity 40%. The test panels/materials are mounted in the specimen racks with the test surfaces facing the UV lamps. Empty spaces are filled with blank panels to maintain the test conditions within the chamber. The total time of exposure is measured by the apparatus. The gloss 20°, 60° and L*, a*, b* values are measured and the test is finished when for high gloss coatings: 20° gloss is <20% and for semi gloss coatings: 60° gloss is 50% of original gloss. According to ECCA T10, 2000 hrs QUV-A is obtained for a good outdoor durable system. According to ECCA T10, 1000 hrs QUV-B is obtained for a good outdoor durable system.

Salt Spray Test

The resistance to salt spray fog was tested using ECCA testmethod T8. A neutral saltspray spray fog of 5% NaCL solution was used. The sample was designed according Option 2 in the test method. The back and edges of the panel were protected by adhesion tape. After 1000 hrs the panels were checked for adhesion loss, creep and blistering. Passing a Salt Spray test of 1000 hrs is considered good.

Tested Polymers

Certain polymers denoted PC 1 to PC 36 were tested and the test data for some of these polymers is provided (polymers PC2 and PC9 were also tested similarly to achieve similar results although the data is not shown below)

Polymers suitable for coating metal can or coil

The following polymers may also be formulated in any of the coating compositions described herein, to produce improved compositions that may be particularly suitable for coating the interior of a metal can and/or a metal coil or metal can exterior.

Table 1.

| Entry | Example | Initiator | f | Mn(g/mol) | PDI (M$_w$/M$_n$) | Tg (° C.) | Theor. OH# | Acid # | mol %[1] PPC | mol %[1] PC |
|---|---|---|---|---|---|---|---|---|---|---|
| 1 | PC15 | DPG | 2 | 1500 | 1.03 | 15 | 74.8 | <1 | 98% | 1% |
| 2 | PC4 | DPG | 2 | 2400 | 1.05 | 10 | 47 | 2 | 97% | 2% |
| 3 | PC16 | DPG | 2 | 2700 | 1.07 | 9 | 42 | 1 | 97% | 2% |
| 4 | PC17 | DPG | 2 | 2900 | 1.04 | 14 | 39 | <1 | 97% | 2% |
| 5 | PC18 | DPG | 2 | 3000 | 1.04 | −17 | 37 | <1 | 87% | 5% |
| 6 | PC19 | DPG | 2 | 3000 | 1.04 | 4 | 37 | <1 | 96% | 1% |
| 7 | PC1 | DPG | 2 | 3000 | 1.04 | 11 | 37 | <1 | 97% | 1% |
| 8 | PC14 | Aldrich PEG 400 diol | 2 | 3000 | 1.05 |  | 37 | <1 | 98% | 2% |
| 9 | PC20 | DPG | 2 | 3100 | 1.05 | 3 | 36 | 1 | 98% | 1% |
| 10 | PC21 | DPG | 2 | 3100 | 1.08 | 6 | 36 | 1 | 97% | 2% |
| 11 | PC22 | DPG | 2 | 3151 | 1.04 | −13 | 36 | <1 | 89% | 4% |
| 12 | PC3 | DPG | 2 | 3370 | 1.03 | 15 | 33 | <1 | 98% | 1% |
| 13 | PC23 | DPG | 2 | 3700 | 1.6 | 7 | 30 | <1 |  | 1% |
| 14 | PC6 | DPG | 2 | 5800 | 1.03 | 22 | 19 | <1 |  | <1% |
| 15 | PC7 | DPG | 2 | 11700 | 1.02 | 27 | 10 | <1 |  | <1% |
| 16 | PC24 |  | 3 | 1500 | 1.05 | '15 | 112 | <1 |  |  |
| 17 | PC8 | Polyol 3611 | 3 | 1900 | 1.05 | −4 | 89 | 1 | 95% | 4% |
| 18 | PC8r | Polyol 3611 | 3 | 1900 | 1.05 |  | 89 | <1 | 99% | 1% |
| 19 | PC25 | glycerol propoxylate | 3 | 2000 | 1.06 | 0 | 84 | <1 | 98% | 2% |
| 20 | PC10 | Polyol 3611 | 3 | 2800 | 1.07 | 3 | 60 | <1 | 97% | 2% |
| 21 | PC5 | Polyol 3611 | 3 | 4000 | 1.05 | 3 | 42 | 1 | 94% | 4% |
| 22 | PC12 | Polyol 3165 | 3 | 4300 | 1.05 | −8 | 39 | <1 | 97% | 2% |
| 23 | PC26 | Polyol 3611 | 3 | 6300 | 1.03 | 22 | 27 | <1 |  | <1% |
| 24 | PC27 | Polyol 3611 | 3 | 11200 | 1.02 | 23 | 15 | <1 |  | <1% |
| 25 | PC28 | Polyol 4640 | 4 | 2000 | 1.06 | −6 | 112 | <1 | 97% | 3% |
| 26 | PC29 | Polyol 4640 | 4 | 2000 | 1.06 |  | 112 | <1 | 99% | <1% |
| 27 | PC11 | Polyol 4640 | 4 | 2900 | 1.09 | 4 | 77 | <1 | 98% | 2% |
| 28 | PC30 | Polyol 4640 | 4 | 3900 | 1.05 | 0 | 58 | 1 | 94% | 4% |
| 29 | PC13 | Polyol 4290 | 4 | 4100 | 1.08 | −2 | 55 | <1 | 96% | 2% |
| 30 | PC31 |  | 4 | 6500 | 1.06 | 8 | 35 |  |  |  |
| 31 | PC32 |  | 4 | 8500 | 1.06 | 12 | 26 |  |  |  |
| 32 | PC33 | Polyol R6405 | 6 | 3100 | 1.2 | −7 | 109 |  | 96% | 2% |
| 33 | PC34 | Polyol R6405 | 6 | 3400 | 1.2 | −2 | 99 |  | 97% | 3% |
| 34 | PC35 |  | 6 | 5000 | 1.1 | 4 | 67.3 |  |  |  |
| 35 | PC36 |  | 6 | 8500 | 1.2 | 8 | 39.6 |  |  |  |

[1]Residual solvent accounts for any remaining percentage of material not accounted for by mol % PPC + mol % PC.

Tested Coatings Compositions

EXAMPLE 1

Coating Composition 39.8 solid parts by weight of Novomer resin PC8 were dissolved in 17.1 parts by weight of a mixture of solvent Naphtha 150/Di basic ester (in a weight ratio 1:1), 10.2 solid parts by weight phenolic resin, 0.17 solid parts by weight phosphoric acid as catalyst and 24.5 parts by weight solvent (Methoxy Propylacetate\Dibasic ester 1:1).

Comparative Coating

EXAMPLE A 31.8 solid parts by weight of Uralac SH978 was dissolved in 31.8 parts by weight of a mixture of Solvent Naphtha 100/Dibasic ester (in a weight ratio 1:1), 7.9 solid parts by weight phenolics resin, 0.2 solid parts by weight phosphoric acid as catalyst and 4.5 parts by weight solvent (Solvent Naphtha 150/Dibasic ester 1:1)

These coatings were applied with a roller-coater to ETP material used to make metal cans. The stoving conditions and coating weight are given in Table 2 below:

TABLE 2

|  | Example1 | Example A |
|---|---|---|
| Viscosity, Din cup 4 (DIN norm 53211) | 100" | 110" |
| Solids Content: | 50% | 50% |
| Stoving conditions: | 10 min at 200° C. | 10 min at 200° C. |
| Coating weight mg/cm$^2$ | 7-8 | 7-8 |

The properties of these coatings are given in Table 3.

TABLE 3

|  | Example 1 | Example A |
|---|---|---|
| Film appearance | OK | OK |
| MEK double rubs | 55 | 20 |
| Wedgebend % crackfree | 80 | 100 |
| Flexibility DSM cup (before/after ster) | 5/5− | 5/5 |
| Ster. tapwater (liquid phase/gas phase) | 4.5sp/5− | 5/5 |
| 3% Nacl (liquid phase/gas phase) | 5/5 | 5bl/5sp bl |
| 2% Lactic acid (liquid phase/gas phase) | 5bl/4+ | 4bl/5sp |
| 3% Ac.acid/2%/NaCl(liquid phase/gas phase) | 5bl4.5 | 5bl/5 |

Each coating was sterilized for 1 hour at a temperature of 130° C. in the different media. The sterilization properties were assessed visually where 1=very bad, 5=excellent. Sp denotes spots on the coating, bl denotes blush.

The resins of the invention can be cured with phenolic resins to obtain coatings which can be used to coat the interior of metal cans.

Clear Coating Composition

The polymers of the invention were diluted with a mixture of Solvesso 150 ND and Di-Basic Esters (DBE) to a solids content of 60%. The resin solution thus obtained (77.1 parts) was mixed with 8.2 parts by weight of the melamine cross linker Cymel 303, 0.5 parts by weight of the 50% thinned flow agent Urad dd27, 0.5 parts of the dinonylnaphtalene disulfonic acid catalyst Nacure 155 and 13.7 parts by weight of a mixture of the solvents Solvesso 150 ND and DBE to produce a clear coating composition which was used in the following tests.

The clear coating composition was applied to an aluminum panel with a wire bar and cured in an oven to a peak metal temperature (PMT) of 216° C. The following properties were determined:

TABLE 4

Clear coating PCarb./HMMM ratio 85/15

| | Ctg based on | | |
|---|---|---|---|
| | A416 | A41E | M112 |
| Dry Film Thickness | 12 mu | 12 mu | 11 mu |
| MEK-res | 100-4 | 100-4 | 100-3 |
| Koenig Hardness | 239 | 244 | 31 |
| T-Bend | 0.5 T | 1 T | 0-0.5 T |

| | Ctg based on | | | |
|---|---|---|---|---|
| | A482 | F954F | A4E0 | A530 |
| Dry Film Thickness | 27 mu | 26 mu | 25 mu | 24 mu |
| MEK-res | 100/3 | 100/3 | 100/4 | 100/2 |
| Koenig Hardness | 217 | 211 | 218 | 235 |
| T-Bend | 0.5 T | 0.5 T | 0.5 T | 0.5 T |
| Pencil Hardness | 4H | 3H | 3H | 3H |

Preparation a Clear Coating Composition with Polycarbonate/Isocyanate

A 60% poly-carbonate resin solution was mixed with the HDI cross linker Uradur YB147. The amount of this cross linker was determined stoichiometric based on the OH-number of the resin and the NCO-content of the isocyanate. To this mixture the flow agent Urad DD27 and the Di-n-butyltindilaurate type of catalyst Metatin 712 ES were added. The mixture thus obtained was dissolved with a 1:1 mixture of Solvesso 150 ND and DBE to from a coating composition having 55% solids content. The coating was tested as described herein.

Preparation of a White Coating.

A pigment paste was made on labscale by grinding with glass pearls in a glass jar with the use of a high speed stirrer (Dispermat). The paste comprised: a 60% solution of the resin to be tested, $TiO_2$ pigment (Kronos 2160), dispersion aid (Disperbyk 180) and solvent (Solvent nafta 150 ND and DBE). After grinding the paste was separated from the glass pearls with a sieve to produce a ground paste.

A letdown vehicle was prepared by mixing: 60% solution of the resin to be tested, a cross linker (either the HMMM crosslinker Cymel 303 or the isocyanate crosslinker Uradur YB 147) an acid catalyst (either the dinonylnaphtalene disulfonic acid catalyst Nacure 155 or a DBTDL catalyst Metatin 712 ES) and solvent (Solventnaphtha 150 ND and DBE).

The letdown vehicle was added to the ground paste and stirred to produce a homogeneous mixture resulting in a glossy white coating composition used in the tests described herein. To produce semi-gloss coatings a matting agent (Syloid C809) was added to the stirred coating composition to form a homogeneous mixture.

TABLE 5

| | Polyester White topcoat PE/ HMMM | Polycarbonate White topcoat Polycarb./ HMMM | Polycarbonate White topcoat Polycarb./ NCO |
|---|---|---|---|
| Paste | | | |
| Uralac SN841 S2G3-60 ND | 19.2 | — | — |
| Novomer Polycarbonate A482(60%) | — | 18.5 | 15.6 |
| Kronos 2160 | 34.5 | 33.3 | 28.0 |
| Urad DD27 (50% in K176/S12 3/1) | 0.3 | — | — |
| Disperbyk 180 | 0.0 | 2.6 | 0.8 |
| Solvent Naphta 150 ND | 4.7 | 3.9 | 3.3 |
| Butylglycol | 1.6 | — | — |
| DBE | — | 3.9 | 3.3 |
| | 60.3 | 62.2 | |

The paste was ground for 15 minutes at 2000 rpm and 10 minutes at 1000 rpm

| Letdown vehicle | | | |
|---|---|---|---|
| Uralac SN841 S2G3-60 ND | 28.9 | — | — |
| Novomer Polycarbonate A482(60%) | — | 28.7 | 24.1 |
| Cymel 303 | 5.2 | 5.0 | — |
| Uradur YB147 | — | — | 13.6 |
| Nacure 1419 | 0.3 | — | — |
| Nacure 155 | — | 0.3 | — |
| Metatin 712 ES | — | — | 0.4 |
| Syloid C809 | (1.5) | (1.5) | (1.5) |
| Solvent nafta 150 ND | 4.1 | — | — |
| Butyl glycol | 1.4 | 1.9 | 5.5 |
| DBE | — | 1.9 | 5.5 |
| Total weight | 100.0 | 100.0 | 100.0 |

The white coatings were applied to aluminum substrate with a wirebar. The polyester systems were cured at a peak mean temperature (PMT) of 232° C. and the polycarbonate systems were cured at 210° C.

TABLE 6

Properties of white topcoatings on aluminium.

|  | A482/HMMM | A482/NCO | SN841/HMMM | A482/HMMM | A482/NCO | SN841/HMMM |
|---|---|---|---|---|---|---|
|  | Without matting agent | | | With matting agent | | |
| Ratio Bind./CL | 85/15 | 70/30 | 85/15 | 85/15 | 70/30 | 85/15 |
| Pigment/Binder | 1 | 1 | 1 | 1 | 1 | 1 |
| PMT | 210° C. | 210° C. | 232° C. | 210° C. | 210° C. | 232° C. |
| Dry film thickn. | 23 micron | 20 micron | 21 micron | 23 micron | 22 micron | 21 micron |
| MEK-res. | >100 DR | >100 DR | >100 DR | >100 DR | >100 DR | >100 DR |
| Koenig Hardness | 157 | 144 | 134 | 125 | 123 | 129 |
| Pencil Hardness | 5 H | 3H | H | 3H | 2H | 2H |
| T-Bend | 1 T | 1 T | 0.5 T | 1 T | 1 T | 1 T |

Preparation of a Primer

A pigment primer paste was prepared from the following ingredients: a part of the binder resin, a TiO2 pigment (Kronos 2190), an anti-corrosion pigment (Heucophos SRPP), a filler (Talc AT 1), a matting agent (Aerosil R972) and solvent. These ingredients were ground with glasspearls in a high speed stirrer (Dispermat). After grinding the glasspearls were separated from the paste by a sieve.

A letdown vehicle was prepared form the following ingredients: the remaining part of the binder resin, a melamine cross linker (Cymel 303) a flow agent (Urad DD27), catalysts (epoxy blocked phosphoric acid and/or sulphonic acid co catalyst) and solvent. The letdown vehicle was added to the paste and the mixture was stirred homogeneously.

TABLE 7

|  | Polyester Primer | Polycarbonate Primer |
|---|---|---|
| Paste | | |
| Uralac SN989 | 18.1 | |
| Novomer A462 | | 18.55 |
| Kronos 2190 | 7.5 | 7.68 |
| Heucophos SRPP | 5.1 | 5.20 |
| Talc AT1 | 2.1 | 2.18 |
| Aerosil R972 | 0.9 | 0.92 |
| Solv.150/BG 3/2 | 8.0 | 0.00 |
| Solv.150/DBE 1/1 | | 8.25 |
|  | 41.72 | 42.79 |
| Paste was ground for 15 minutes at 2000 rpm and 10 minutes at 1000 rpm | | |
| Letdown vehicle | | |
| Uralac SN989 | 29.4 | — |
| Novomer A462 | — | 30.16 |
| Cymel 303 | 5.0 | 5.14 |
| Epoxy blocked phosphoric acid | 9.6 | 9.82 |
| Sulphonic acid co catalyst | 2.3 | 2.33 |
| Urad dd27 | 0.5 | 0.46 |
| Solv.150/BG 3/2 | 11.6 | 0.00 |
| Solv.150/DBE 1/1 | | 9.30 |
| Total weight | 100 | 100 |

| Epoxy blocked phosphoric acid | | Sulphonic Acid co catalyst | |
|---|---|---|---|
| Solvesso 150 | 34.50 | Solvesso 150 | 42.75 |
| Butyl Glycol | 23.00 | Butyl Glycol | 28.5 |
| Epikote 828 | 22.20 | Epikote 828 | 8.72 |
| Phosphorzuur 85% | 9.10 | Cycat 600* | 20.03 |
| n-Butanol | 11.20 | | |
|  | 100.00 | | 100.00 |

Cycat 600 = 70% in Isopropylalcohol

Properties of primer in a system with Polyester topcoat

TABLE 8

| Substrate | HDG Steel | | Galfan Steel | |
|---|---|---|---|---|
| Primer based on | SN989 | Novomer A482 | SN989 | Novomer A482 |
| White SG Topcoat | PE | PE | PE | PE |
| PMT primer | 216° C. | 216° C. | 216° C. | 216° C. |
| PMT topcoat | 241° C. | 241° C. | 241° C. | 241° C. |
| DFT Primer | 4-6µ | 4-6µ | 4-6µ | 4-6µ |
| DFT Topcoat | +/−20µ | +/−20µ | +/−20µ | +/−20µ |
| MEK-res. System | >100 DR | >100 DR | 100 DR | 100 DR |
| Koenig Hardness | 150 | 153 | 140 | 144 |
| T-bend | 1 T | 1 T | 0 T | 0.5 T |
| 1000 hrs Salt-spray | + + | + + | − − | + + |

Certain polymers denoted PC1a to PC12a herein were tested in Examples I to XV to illustrate the invention

TABLE 9

| Polymer | Initiator | f | Mn[1] (g/mol) | PDI ($M_w/M_n$) | Tg[2] (° C.) | Theor. OH# | w % PPC[3] | w % PC[4] |
|---|---|---|---|---|---|---|---|---|
| PC1a | DPG | 2 | 3000 | 1.04 | 11 | 37 | 97% | 1% |
| PC2a | DPG | 2 | 2400 | 1.05 | 10 | 47 | 97% | 2% |
| PC3a | DPG | 2 | 3370 | 1.03 | 15 | 33 | 98% | 1% |
| PC4a | Perstorp Polyol 3611 | 3 | 4000 | 1.05 | 3 | 42 | 94% | 4% |
| PC5a | DPG | 2 | 11700 | 1.02 | 27 | 10 | | <1% |
| PC6a | Hexanediol | 2 | 2800 | 1.08 | 9 | 40 | 98% | 2% |
| PC7a | Butanediol | 2 | 3000 | 1.04 | 8 | 37 | 98% | <1% |
| PC8a | Perstorp Polyol 3611 | 3 | 1900 | 1.05 | −4 | 89 | 95% | 4% |
| PC9a | Perstorp Polyol 4640 | 4 | 2900 | 1.09 | 4 | 77 | 98% | 2% |

TABLE 9-continued

| Polymer | Initiator | f | Mn[1] (g/mol) | PDI (M$_w$/M$_n$) | Tg[2] (° C.) | Theor. OH# | w % PPC[3] | w % PC[4] |
|---|---|---|---|---|---|---|---|---|
| PC10a | Perstorp Polyol 4290 | 4 | 4100 | 1.08 | −2 | 55 | 96% | 2% |
| PC11a | Perstorp Polyol R6405 | 6 | 3400 | 1.2 | −2 | 99 | 97% | 3% |
| PC12a | PE1700[5] | 3 | 3100 | 1.7 | −14 | 36 | 96% | 4% |

[1]Molecular weight Mn as measured with Gel Permeation Chromatography using a polystyrene standard
[2]Glass transition temperature as measured with Mettler Toledo DSC1 Differential Scanning Calorimeter, using two heat cycles of 20° C./min from 25-180° C. and measuring the glass transition onset temperature of the second heat cycle.
[3,4]Polypropylene carbonate polyol (PPC) and cyclic propylene carbonate (PC) are measured in relevance using $^1$H NMR. The PPC peak is the methine (broad multiplet, 1 H) at 5.0 ppm; the diagnostic cyclic carbonate peak is a diasterotopic methylene peak (triplet, 1H) at 4.55 ppm. PPC + PC is not usually 100% because a small percentage of solvent is also present but not mentioned here.
[5]PE1700 is a polyester consisting of 16 mol % diethylene glycol, 28 mol % hexanediol, 14 mol % trimethylolpropane, 21 mol % terephthalic acid and 21 mol % isophthalic acid, and having a molecular weight Mn of 1700 g/mol.

Tested Coatings Compositions

EXAMPLE I to V

Clear Coating Composition

Polymer PC1a, PC2a, PC3a, PC4a or PC5a of the invention was diluted with a mixture of Solvesso 150 ND (Exxon) and Di-Basic Esters (DBE, Rhodia) to a solids content of 60% by weight. The resin solution thus obtained (77.1 parts) was mixed with 8.2 parts by weight of the melamine cross linker Cymel 303LF (Cytec), 0.5 parts by weight of the 50% thinned in Solvesso 150 ND flow agent Urad dd27 (DSM), 0.5 parts of the dinonylnaphtalene disulfonic acid catalyst Nacure 155 (King Industries) and 13.7 parts by weight of a mixture of the solvents Solvesso 150 ND and DBE to produce a clear coating composition.

COMPARATIVE EXAMPLE A

Clear Coating Composition

A clear coating composition was made according to the procedure, amounts, and materials of Example I to V, where PC1a, PC2a, PC3a, PC4a, or PC5a was replaced by polymer M112 (Perstorp).

The clear coating composition was applied to an chromated aluminum panel with a wire bar and cured in an oven to a peak metal temperature (PMT) of 216° C. The following properties were determined:

TABLE 10

Clear coating properties of clear coating compositions of Examples I to V, and comparative example A.

| | Example | | | | | |
|---|---|---|---|---|---|---|
| | A | I | II | III | IV | V |
| Ctg based on | M112 | PC1a | PC2a | PC3a | PC4a | PC5a |
| Dry Film Thickness | 11 mu | 12 mu | 26 mu | 26 mu | 25 mu | 24 mu |
| MEK-res | 100/3 | 100/4 | 100/3 | 100/3 | 100/4 | 100/2 |
| Koenig Hardness | 31 | 239 | 211 | 211 | 218 | 235 |
| T-Bend | 0-0.5T | 0.5T | 0.5 T | 0.5 T | 0.5 T | 0.5 T |
| Pencil Hardness | | | 3H | 3H | 3H | 3H |

Example I shows in comparison with Comparative Example A that poly(propylene carbonate) polyol PC1a has a much improved Koenig hardness.

Example II to V shows that poly(propylene carbonate) polyol PC2a, PC3a, PC4a, PC5a, which vary in molecular weight Mn from 2400 to 11700, and vary in Tg from 3 to 27° C., and vary in A (as depicted above) of dipropylene glycol and trimethylolpropane, have excellent hardness and flexibility properties.

Examples I to V lead to properties that make poly(propylene carbonate) polyol of the current invention very suitable for coil coating applications.

EXAMPLE VI

White Coating Composition

A pigment paste was made by grinding with glass pearls in a glass jar with the use of a high speed stirrer (Dispermat). The paste comprised: a 60% in DBE solution of PC3a, $TiO_2$ pigment (Kronos 2160), dispersion aid Disperbyk 180 (BYK), Solvesso 150ND, and DBE. After grinding the paste was separated from the glass pearls with a sieve to produce a ground paste.

A letdown vehicle was prepared by mixing: 60% in DBE solution of PC3a to be tested, an isocyanate crosslinker Uradur YB147 (DSM), catalyst Metatin 712 ES (Rohm and Haas), Solvesso 150ND, butylglycol (DOW) and DBE.

The letdown vehicle was added to the ground paste and stirred to produce a homogeneous mixture resulting in a glossy white coating composition used in the tests described herein.

EXAMPLE VII

White Coating Composition

A white coating composition was made from PC3a in a similar manner as described in example VI, with the exception of the crosslinker, catalyst and the amounts. As crosslinker Cymel 303LF was used and as catalyst Nacure 155. The amounts used are listed in Table 11.

EXAMPLE VIII

White Coating Composition

A polypropylene carbonate mixture was made containing PC6a and containing 20% of PC6a that was modified with succinic acid anhydride. To obtain the modified PC3a, 3.5% by weight of succinic acid anhydride was reacted to PC6a at 85° C. during 2 hours and using 0.1% by weight of 1,1,3,3-Tetramethylguanidine. The modified PC3a had an theoretical acid value of 20 mg KOH/g.

A pigment paste was made by grinding with glass pearls in a glass jar with the use of a high speed stirrer. The paste comprised: a 60% in DBE solution of polypropylene carbonate polyol mixture, Kronos 2160, and 1 methoxy-2-propylacetate (MPA, BASF). After grinding the paste was separated from the glass pearls with a sieve to produce a ground paste.

A letdown vehicle was prepared by mixing: 60% in DBE solution of polypropylene carbonate polyol mixture, a melamine crosslinker Cymel 303LF, catalyst Nacure 155, and DBE. The letdown vehicle was added to the ground paste and stirred to produce a homogeneous mixture resulting in a glossy white coating composition used in the tests described herein

EXAMPLE IX

White Coating Composition

A white coating composition was made from PC7a in a similar manner as described in example VIII, and where PC6a was exchanged for PC7a.

The white coatings compositions were applied to aluminium substrate with a wirebar and cured at a peak metal temperature (PMT) of 232° C. for Example VIII an IX and 210° C. for Example VI and VII.

TABLE 11

White coating composition and coating properties

| | Example | | | |
|---|---|---|---|---|
| | VI | VII | VIII | IX |
| Composition based on Paste | PC3a | PC3a | PC6a mix | PC7a mix |
| Polycarbonatepolyol (60%) | 15.6 | 18.5 | 19.8 | 19.8 |
| Kronos 2160 | 28.0 | 33.3 | 35.6 | 35.6 |
| Disperbyk 180 | 0.8 | 2.6 | — | — |
| Solvesso 150ND | 3.3 | 3.9 | — | — |
| MPA | — | — | 8.3 | 8.3 |
| DBE | 3.3 | 3.9 | — | — |
| The paste was ground for 15 minutes at 2000 rpm and 10 minutes at 1000 rpm | | | | |
| Letdown vehicle | | | | |
| Polycarbonatepolyol (60%) | 24.1 | 28.7 | 30.7 | 30.7 |
| Cymel 303LF | — | 5.0 | 5.4 | 5.3 |
| Uradur YB147 | 13.6 | — | — | — |
| Nacure 155 | — | 0.35 | 0.13 | 0.15 |
| Metatin 712 ES | 0.4 | — | — | — |
| Butyl glycol | 5.5 | 1.9 | — | — |
| DBE | 5.5 | 1.9 | — | — |
| Total weight | 100 | 100 | 100 | 100 |
| Coating properties | | | | |
| Dry Film Thickness | 22µ | 23µ | 22µ | 24µ |
| MEK-res | >100 DR | >100 DR | >100 DR | >100 DR |
| Koenig Hardness | 144 | 157 | 137 | 155 |
| T-Bend | 1T | 1T | 0.5T | 0.5T |
| Pencil Hardness | 3H | 5H | 4H | 6H |
| Reversed Impact 70 inchpound | | small cracks | pass | pass |
| QUV-A | | | 2000 hrs | |
| QUV-B | | | 2170 hrs | |

Example VI shows that the polypropylene carbonate polyol in a white coating compositions can be cured with an isocyanate as crosslinker obtaining a flexible coating with a high hardness.

Example VII, VIII and IX show that the different chain transfer agents dipropylene glycol, butanediol, and hexanediol, in a white coating compositions lead to an excellent flexibility and hardness combination.

Example VIII shows that polypropylene carobonate polyol PC6a based on the QUV results is very suitable for exterior applications, which in this example is an exterior Coil application.

Example VIII and IX show that omittting a dispersing agent, changing the solvent type and addition of succinic acid anhydride modified polypropylene carbonate polyol, shows also a very good combination of flexibility and hardness. These examples show that differences in formulation are possible and the combination of flexibility and hardness remain very good.

EXAMPLE X to XIII

Can Coating Composition 31.3 solid parts by weight of resin PC8a, PC9a, PC10a or PC11a was dissolved in 13.4 parts by weight of DBE. A 40% solids curing composition was obtained by adding 12 parts by weight phenolic resin (SFC112-65 65% solid, SI Group), 0.2 parts by weight phosphoric acid (85%, Hoechst) as catalyst, 0.1 parts by weight Resiflow FL2 (Worlée), and 40.6 parts by weight of a 62.5:37.5 solvent mixture of MPA and butanol.

EXAMPLE XIV

Can Coating Composition

A Can coating composition was made from PC12a, in a similar manner as in Examples X to XIII. Instead of the solvent mixture MPA and butanol, DBE was used.

These coating compositions were applied with a rollercoater to Electrolitic Tin Plate (ETP, T52 E2.8/2.8 stone finish) in a layer thickness of 30µ. The applied compositions were cured using stoving conditions 12 minutes 200° C. The resulting properties are listed in Table 12.

TABLE 12

Can coating properties

| | Example | | | | |
|---|---|---|---|---|---|
| | X | XI | XII | XIII | XIV |
| Polypropylene carbonate polyol | PC8a | PC9a | PC10a | PC11a | PC12a |
| Film appearance | OK | OK | OK | OK | OK |
| MEK double rubs | 55 | | | | 100/1 |
| Wedgebend % crackfree | 80 | 82 | 91 | 82 | 82 |
| Asymetric box (before/after sterilization) | 5/5– | 5–/5– | 5–/5– | 4+/4+ | 4/ |
| Sterilization tapwater (liquid phase/gas phase) | 4.5sp/5– | 5/5 | 5/5 | 5/5 | 5/5 |
| Sterilization 3% NaCl (liquid phase/ gas phase) | 5/5 | 5/5 | 5/5 | 5/5 | 5/5bl |
| Sterilization 2% Lactic acid (liquid phase/gas phase) | 5bl/4bl | 5– bl/4+ru | 4.5slbl/ 4.5slru | 5slbl/ 4.5slru | 4bl/5 |

TABLE 12-continued

Can coating properties

| | Example | | | | |
|---|---|---|---|---|---|
| | X | XI | XII | XIII | XIV |
| Sterilization 3% Citric acid/2% NaCl (liquid phase/gas phase) | 5bl/4.5 | 4.5bl/5 | 5slbl/5 | 4.5slbl/5 | 5bl/5 | bl denotes blush,
sp denotes spots,
sl denotes slightly, and
ru denotes rust

Examples X to XIII show that polypropylene carbonate polyols ranging in molecular weight Mn from 1900 to 4100 gr/mol, and the different chain transfer agents ethoxylated trimethylolpropane, ethoxylated pentaerythritol, polyester PE1700 and ethoxylated dipentaerythritol, show good sterilization properties and good flexibility and are suitable to be used in Can coating applications.

EXAMPLE XV

Primer Coating Composition

A pigment primer paste was prepared as follows. 18.6 parts by weight of a 60% PC3a solution in DBE, 7.7 parts by weight of a TiO$_2$ pigment (Kronos 2190), 5.2 parts by weight of an anti-corrosion pigment (Heucophos SRPP, Heubach), 2.1 parts by weight of a filler (Micro talc AT1, Norwegian talc), 0.9 parts by weight of a matting agent (Aerosil R972, Evonik), and 8.3 parts by weight of a 1:1 Solvesso 150 ND:DBE solvent mixture. These ingredients were ground 15 minutes at 2000 rpm and 10 minutes at 1000 rpm with glasspearls in a high speed stirrer (Dispermat). After grinding the glasspearls were separated from the paste by a sieve.

A letdown vehicle was prepared form the following ingredients: 30.2 parts by weight of a 60% PC3a solution in DBE, 5.1 parts by weight of a melamine cross linker (Cymel 303LF), 0.5 parts by weight of the 50% thinned in Solvesso 150 ND flow agent Urad dd27, 9.3 parts by weight of a 1:1 Solvesso 150 ND:DBE solvent mixture, and 12.1 parts by weight of a catalysts solution. The catalyst solution consist of 4.4 parts by weight Solvesso 150 ND, 2.9 parts by weight butyl glycol, 2.4 parts by weight Epikote 828 (Shell), 0.95 parts by weight phosphoric acid, 1.1 parts by weight n-butanol, and 0.46 parts by weight Cycat 600 (Cytec).

The letdown vehicle was added to the paste and the mixture was stirred homogeneously.

A white topcoat was prepared in a similar manner. The paste consisted of: 19.2 parts by weight of polyester SN844 (DSM), 34.5 parts by weight Kronos 2160, 0.3 parts by weight of the 50% thinned in Solvesso 150 ND flow agent Urad dd27, 4.7 parts by weight Solvesso 150 ND, and 1.6 parts by weight of butyl glycol. After grinding, a letdown vehicle was prepared form the following ingredients: 28.9 parts by weight SN844, 5.1 parts by weigh Cymel 303LF, 0.25 Nacure 1419 (King Industries), 4.1 parts by weight Solvesso 150 ND, and 1.4 parts by weight of butyl glycol. The letdown vehicle was added to the paste and the mixture was stirred homogeneously.

The primer composition was applied on Galfan steel pre-treated with Bonder1303 and on Hot dipped Galavinised steel (HDG) with a wirebar and cured at a PMT of 216° C. After this the topcoat was applied with a wirebar and cured at PMT 241° C.

TABLE 13

Properties of the polypropylene carbonate polyol primer using a polyester topcoat

| Substrate | HDG steel | Galfan steel |
|---|---|---|
| Dry film thickness primer | 4-6μ | 4-6μ |
| Dry film thickness topcoat | 20μ | 20μ |
| MEK resistance | >100 DR | >100 DR |
| Koenig Hardness | 153 | 144 |
| T-bend | 1 T | 0.5 T |
| 1000 hrs Salt Spray | Pass | Pass |

This example shows that using PC3a is suitable for use in a primer composition offering good corrosive resistant properties and showing a excellent hardness/flexibility balance.

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A poly(propylene carbonate) polyol composition characterized in that the composition has:
   i. at least 95% —OH end groups;
   ii. a glass transition temperature (Tg) from about −20° C. to about 60° C.;
   iii. a polydispersity index (PDI) less than 2;
   iv. a Mn less than 15 kDa; and
   v. greater than 95% carbonate linkages between adjacent monomer units in the polycarbonate chains.

2. The poly(propylene carbonate) polyol composition of claim 1 comprising polymer chains denoted $P^1$ having the formula T-Y-A-(Y-T)$_n$ wherein:
   each -T is a polycarbonate chain having a formula independently selected from the group consisting of:

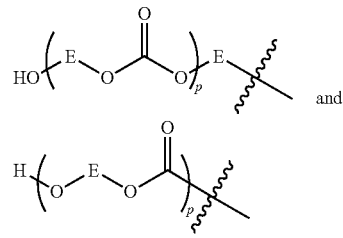

wherein:
   E is a C$_3$ unit derived from propylene oxide;
   p ranges from about 5 to about 75;
   each Y group is independently the bound form of a functional group capable of initiating chain growth of epoxide CO$_2$ copolymers, optionally comprising one or multiple repeating units of a bivalent C$_{2-5}$, straight or branched, saturated hydrocarbon chain, wherein one methylene unit of each hydrocarbon group is replaced with —O—;
   -A- is a covalent bond, a heteroatom, or a multivalent moiety; and
   n is from 1 to 10 inclusive.

3. The poly(propylene carbonate) polyol composition of claim 2, wherein n is 1.

4. The poly(propylene carbonate) polyol composition of claim 3, wherein -A- is oxygen.

5. The poly(propylene carbonate) polyol composition of claim 3, wherein -A- is a covalent bond.

6. The poly(propylene carbonate) polyol composition of claim 4, wherein each Y group comprises one unit of propylene glycol.

7. The poly(propylene carbonate) polyol composition of claim 6, wherein the P¹ polymer chains have the formula:

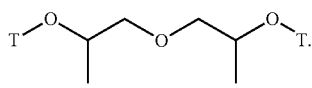

8. The poly(propylene carbonate) polyol composition of claim 3, wherein each Y group comprises one or more repeating units of ethylene glycol.

9. The poly(propylene carbonate) polyol composition of claim 8, wherein the P¹ polymer chains have the formula:

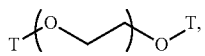

wherein z is from 1 to 10, inclusive.

10. The poly(propylene carbonate) polyol composition of claim 9, wherein the repeating units of ethylene glycol corresponds to PEG 400.

11. The poly(propylene carbonate) polyol composition of claim 2, wherein n is from 2 to 10, inclusive, and -A- is a multivalent moiety.

12. The poly(propylene carbonate) polyol composition of claim 11, wherein the —Y-A-(Y—)$_n$ moiety is derived from a polyol having three, four, five, or six hydroxyl groups.

13. The poly(propylene carbonate) polyol composition of claim 12, wherein each Y group comprises one more repeating units of ethylene glycol.

14. The poly(propylene carbonate) polyol composition of claim 13, wherein the P¹ polymer chains have the formula:

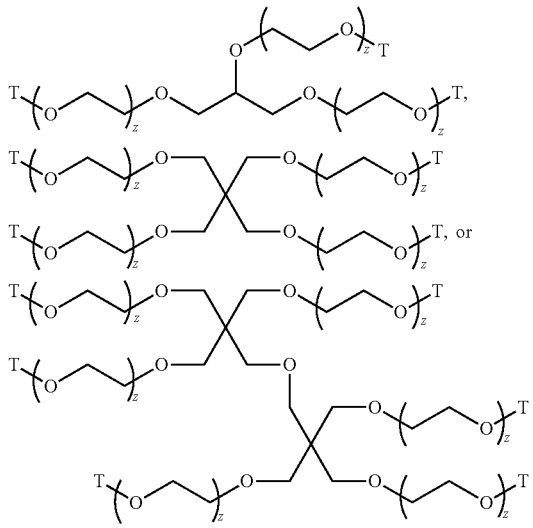

wherein each z is independently from 1 to 10.

15. The poly(propylene carbonate) polyol composition of claim 1, characterized in that the weight percentage of poly(propylene carbonate) in the composition is greater than 90%.

16. The poly(propylene carbonate) polyol composition of claim 15, characterized in that the weight percentage of poly(propylene carbonate) in the composition is greater than 92%.

17. The poly(propylene carbonate) polyol composition of claim 16, characterized in that the weight percentage of poly(propylene carbonate) in the composition is greater than 93%.

18. The poly(propylene carbonate) polyol composition of claim 17, characterized in that the weight percentage of poly(propylene carbonate) in the composition is greater than 95%.

19. The poly(propylene carbonate) polyol composition of claim 18, characterized in that the weight percentage of poly(propylene carbonate) in the composition is greater than 97%.

20. The poly(propylene carbonate) polyol composition of claim 19, characterized in that the weight percentage of poly(propylene carbonate) in the composition is greater than 98%.

21. The poly(propylene carbonate) polyol composition of claim 20, characterized in that the weight percentage of poly(propylene carbonate) in the composition is greater than 99%.

22. The poly(propylene carbonate) polyol composition of claim 1, characterized in that the weight percentage of propylene carbonate in the composition is less than 10%.

23. The poly(propylene carbonate) polyol composition of claim 22, characterized in that the weight percentage of propylene carbonate in the composition is less than 5%.

24. The poly(propylene carbonate) polyol composition of claim 23, characterized in that the weight percentage of propylene carbonate in the composition is less than 3%.

25. The poly(propylene carbonate) polyol composition of claim 24, characterized in that the weight percentage of propylene carbonate in the composition is less than 2%.

26. The poly(propylene carbonate) polyol composition of claim 25, characterized in that the weight percentage of propylene carbonate in the composition is less than 1%.

27. The poly(propylene carbonate) polyol composition of claim 1, characterized in that the composition has a Tg from about −20° C. to about 30° C.

28. The poly(propylene carbonate) polyol composition of claim 27, characterized in that the composition has a Tg from about 0° C. to about 30° C.

29. The poly(propylene carbonate) polyol composition of claim 27, characterized in that the composition has a Tg from about −10° C. to about 20° C.

30. The poly(propylene carbonate) polyol composition of claim 29, characterized in that the composition has a Tg from about 5° C. to about 15° C.

31. The poly(propylene carbonate) polyol composition of claim 1, characterized in that the composition has a PDI less than 1.7.

32. The poly(propylene carbonate) polyol composition of claim 31, characterized in that the composition has a PDI less than 1.5.

33. The poly(propylene carbonate) polyol composition of claim 32, characterized in that the composition has a PDI less than 1.4.

34. The poly(propylene carbonate) polyol composition of claim 33, characterized in that the composition has a PDI less than 1.3.

35. The poly(propylene carbonate) polyol composition of claim 34, characterized in that the composition has a PDI less than 1.2.

36. The poly(propylene carbonate) polyol composition of claim 35, characterized in that the composition has a PDI less than 1.1.

37. The poly(propylene carbonate) polyol composition of claim 36, characterized in that the composition has a PDI less than 1.05.

38. The poly(propylene carbonate) polyol composition of claim 1, characterized in that the composition has a Mn less than 10 kDa.

39. The poly(propylene carbonate) polyol composition of claim 38, characterized in that the composition has a Mn from about 1 kDa to about 8 kDa.

40. The poly(propylene carbonate) polyol composition of claim 39, characterized in that the composition has a Mn of about 3 kDa.

41. The poly(propylene carbonate) polyol composition of claim 2, having the structure:

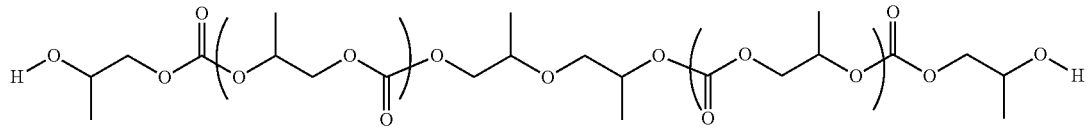

wherein the Mn of the composition is in the range from about 2.5 kDa to about 4 kDa.

42. The poly(propylene carbonate) polyol composition of claim 2, having the structure:

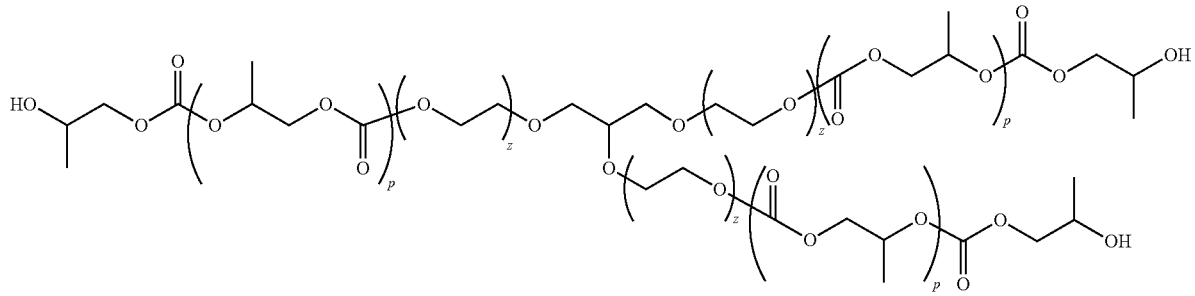

wherein each z is independently from 1 to 10, each p is independently about 5 to about 75, and the Mn of the composition is in the range from about 2.5 kDa to about 6 kDa.

43. The poly(propylene carbonate) polyol composition of claim 2, having the structure:

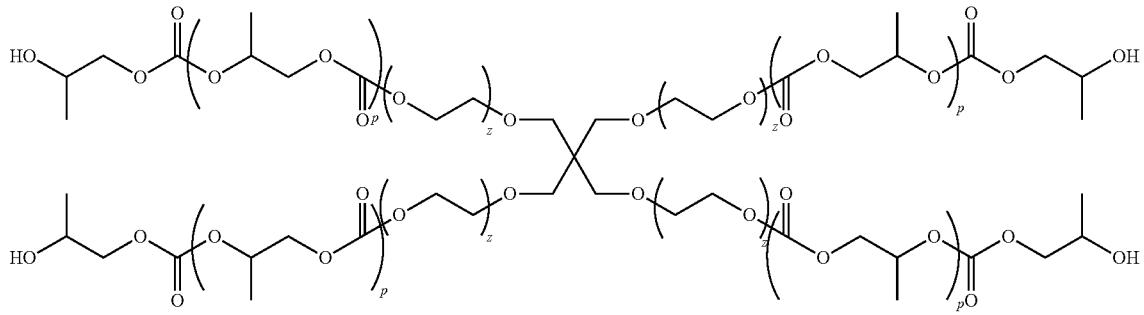

wherein each z is independently from 1 to 10, each p is independently about 5 to about 75, and the Mn of the composition is in the range from about 2.5 kDa to about 6 kDa.

44. The poly(propylene carbonate) polyol composition of claim 2, having the structure:
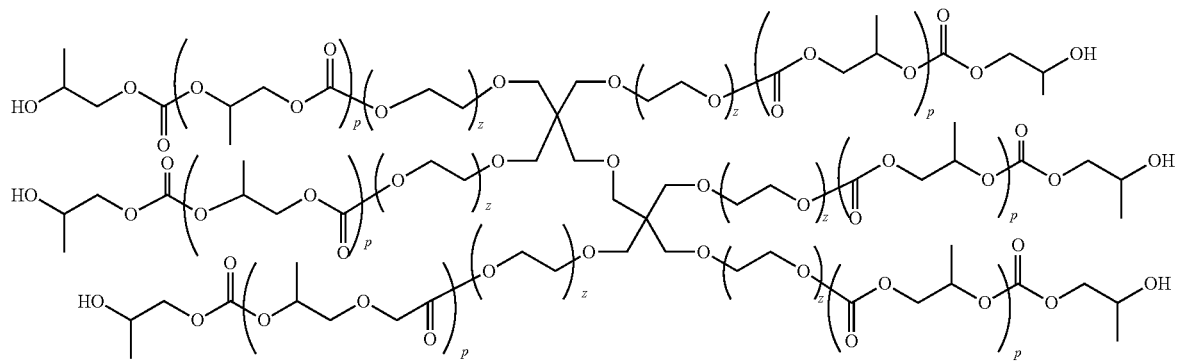
wherein each z is independently from 1 to 10, each p is independently about 5 to about 75, and the Mn of the composition is in the range from about 2.5 kDa to about 6 kDa.